United States Patent
Domm et al.

(10) Patent No.: US 11,095,946 B2
(45) Date of Patent: Aug. 17, 2021

(54) USER INTERFACES FOR RECOMMENDING AND CONSUMING CONTENT ON AN ELECTRONIC DEVICE

(71) Applicant: Apple Inc., Cupertino, CA (US)

(72) Inventors: Drew R. Domm, Oakland, CA (US); Erik Lindholm, San Francisco, CA (US); Fredric Vinna, San Francisco, CA (US); Uli M. Schöberl, San Francisco, CA (US); Matthew J. Cielak, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,547

(22) Filed: Sep. 28, 2018

(65) Prior Publication Data

US 2019/0342616 A1 Nov. 7, 2019

Related U.S. Application Data

(60) Provisional application No. 62/667,904, filed on May 7, 2018.

(51) Int. Cl.
| | |
|---|---|
| *H04N 21/466* | (2011.01) |
| *G06F 3/0482* | (2013.01) |
| *G06F 3/0485* | (2013.01) |
| *G06F 16/583* | (2019.01) |
| *H04N 21/442* | (2011.01) |
| *G06F 16/683* | (2019.01) |

(52) U.S. Cl.
CPC ....... *H04N 21/4668* (2013.01); *G06F 3/0482* (2013.01); *G06F 3/0485* (2013.01);
(Continued)

(58) Field of Classification Search
CPC . G06F 3/00; G06F 3/041; G06F 3/048; G06F 16/00; G06F 16/68; H04L 51/32; G06Q 30/02; H04N 21/46; H04N 21/04
See application file for complete search history.

(56) References Cited

U.S. PATENT DOCUMENTS

| 5,483,261 A | 1/1996 | Yasutake |
|---|---|---|
| 5,488,204 A | 1/1996 | Mead et al. |

(Continued)

FOREIGN PATENT DOCUMENTS

| JP | 2000-163031 A | 6/2000 |
|---|---|---|
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Jennifer N To
*Assistant Examiner* — Qi Wan
(74) *Attorney, Agent, or Firm* — Kubota & Basol LLP

(57) ABSTRACT

In some embodiments, an electronic device presents information about, and facilitates consumption of, content in a content delivery application, including utilizing content consumption activities of the user's friends to do so. In some embodiments, an electronic device facilitates presentation of a friends content mix corresponding to content selected based on content consumption activity of one or more friends of a user of the electronic device. In some embodiments, an electronic device facilitates presentation of a plurality of content items included in the friends content mix that includes a representation of a first content item of the plurality of content items displayed in association with a representation of a first friend, of the one or more friends of the user, that is associated with the first content item.

33 Claims, 51 Drawing Sheets

(52) U.S. Cl.
CPC .......... *G06F 16/583* (2019.01); *G06F 16/685* (2019.01); *H04N 21/44204* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,978,828 A * | 11/1999 | Greer | G06F 16/957 709/224 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,543,928 B2 * | 9/2013 | Stovicek | G06Q 10/10 379/201.12 |
| 8,977,948 B1 * | 3/2015 | Balfe | G06F 16/337 715/206 |
| 9,348,458 B2 | 5/2016 | Hotelling et al. | |
| 9,933,937 B2 | 4/2018 | Lemay et al. | |
| 10,165,108 B1 * | 12/2018 | Douglas | G06Q 30/0643 |
| 2002/0015024 A1 | 2/2002 | Westerman et al. | |
| 2002/0075328 A1 * | 6/2002 | Letzelter | G06F 3/0481 715/854 |
| 2003/0050909 A1 * | 3/2003 | Preda | G06F 16/951 |
| 2003/0191753 A1 * | 10/2003 | Hoch | G11B 27/105 |
| 2005/0168780 A1 * | 8/2005 | Kobashi | G06F 17/248 358/1.18 |
| 2005/0190059 A1 | 9/2005 | Wehrenberg | |
| 2006/0017692 A1 | 1/2006 | Wehrenberg et al. | |
| 2006/0020686 A1 * | 1/2006 | Liss | H04L 41/0206 709/219 |
| 2006/0033724 A1 | 2/2006 | Chaudhri et al. | |
| 2006/0197753 A1 | 9/2006 | Hotelling | |
| 2006/0242277 A1 * | 10/2006 | Torrence | H04L 41/082 709/221 |
| 2006/0248185 A1 * | 11/2006 | Morris | G06Q 10/109 709/224 |
| 2006/0282858 A1 * | 12/2006 | Csicsatka | G06F 3/0485 725/52 |
| 2007/0204222 A1 * | 8/2007 | Rogan | G06F 16/957 715/210 |
| 2007/0297009 A1 * | 12/2007 | Kikuchi | G06F 17/217 358/1.18 |
| 2008/0250312 A1 * | 10/2008 | Curtis | G06Q 10/00 715/700 |
| 2009/0222551 A1 * | 9/2009 | Neely | G06F 16/951 709/224 |
| 2009/0228486 A1 * | 9/2009 | Kuehr-McLaren | G06Q 10/10 |
| 2010/0070884 A1 * | 3/2010 | Bromenshenkel | G06F 3/0481 715/757 |
| 2010/0071000 A1 * | 3/2010 | Amento | H04N 7/173 725/39 |
| 2010/0205538 A1 * | 8/2010 | Han | G06F 3/0482 715/752 |
| 2010/0302594 A1 * | 12/2010 | Chapman | G06T 11/60 358/1.18 |
| 2011/0004519 A1 * | 1/2011 | Aleong | G06Q 10/10 705/14.53 |
| 2011/0078184 A1 * | 3/2011 | Song | G06Q 10/107 707/770 |
| 2011/0246383 A1 * | 10/2011 | Gibson | G06Q 10/10 705/319 |
| 2012/0009903 A1 * | 1/2012 | Schultz | H04M 1/72519 455/412.2 |
| 2012/0041907 A1 * | 2/2012 | Wang | G06Q 30/02 706/12 |
| 2012/0088477 A1 * | 4/2012 | Cassidy | G11B 27/102 455/414.1 |
| 2012/0117026 A1 * | 5/2012 | Cassidy | G06F 16/4387 707/634 |
| 2012/0173308 A1 * | 7/2012 | Brown | G06Q 30/0207 705/14.1 |
| 2012/0271882 A1 * | 10/2012 | Sachdeva | H04N 21/26258 709/204 |
| 2013/0033428 A1 * | 2/2013 | Choi | G06F 3/017 345/158 |
| 2013/0042263 A1 * | 2/2013 | Reynolds | G06Q 30/0207 725/23 |
| 2013/0165234 A1 * | 6/2013 | Hall | A63F 13/00 463/42 |
| 2013/0265284 A1 * | 10/2013 | Yun | G06F 3/0416 345/175 |
| 2013/0268543 A1 * | 10/2013 | Andler | G06F 16/435 707/748 |
| 2013/0339374 A1 * | 12/2013 | Skeen | G06F 16/639 707/754 |
| 2014/0059040 A1 * | 2/2014 | Cha | G06Q 30/0241 707/722 |
| 2014/0108929 A1 | 4/2014 | Garmark et al. | |
| 2014/0289000 A1 * | 9/2014 | Hutchings | G06Q 30/0201 705/7.29 |
| 2014/0297516 A1 * | 10/2014 | Brown | G06F 3/04817 705/39 |
| 2015/0067505 A1 * | 3/2015 | Metcalf | G06F 16/958 715/716 |
| 2015/0067724 A1 * | 3/2015 | Johnson | H04N 21/4668 725/32 |
| 2015/0193061 A1 * | 7/2015 | Stekkelpak | G06F 3/048 715/716 |
| 2015/0242497 A1 * | 8/2015 | He | G06F 16/958 707/738 |
| 2015/0278367 A1 * | 10/2015 | Chang | G06F 16/9535 707/723 |
| 2015/0304268 A1 * | 10/2015 | Byttow | H04L 51/32 709/206 |
| 2016/0110064 A1 | 4/2016 | Shapira | |
| 2016/0132198 A1 * | 5/2016 | Sinclair | G06F 3/0482 715/739 |
| 2016/0300594 A1 * | 10/2016 | Allen | G11B 27/031 |
| 2016/0346690 A1 * | 12/2016 | Ramachandran | A63F 13/12 |
| 2017/0161665 A1 * | 6/2017 | Iwata | G06Q 50/10 |
| 2017/0163591 A1 * | 6/2017 | Jimenez Pazmino | H04L 67/1095 |
| 2017/0286915 A1 * | 10/2017 | Yamaguchi | G06Q 30/02 |
| 2017/0310629 A1 * | 10/2017 | Liu | H04L 51/32 |
| 2017/0344553 A1 * | 11/2017 | Evnine | G06Q 30/0269 |
| 2017/0357421 A1 | 12/2017 | Dye et al. | |
| 2018/0189391 A1 * | 7/2018 | IP | G06F 16/639 |
| 2018/0376178 A1 * | 12/2018 | Cormican | H04N 5/44543 |

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(56) References Cited

OTHER PUBLICATIONS

Rubine, D.H. (May 1992). "Combining Gestures and Direct Manipulation," CHI' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Danish Search Report dated Oct. 1, 2018, for DA Application No. PA 2018 70353, four pages.
Ting. (2014). "Spotify Just Made It Easier to Discover Top Tracks Your Friends Are Listening to," Vulcan Post, Dec. 12, 2014; located at https://vulcanpost.com/106221/spotify-just-made-easier-discover-top-tracksfriends- listening/ entire document, last visited on Oct. 26, 2018, seven pages.
International Search Report and Written Opinion received for PCT Patent Application No. PCT/US2019/030728, dated Jun. 17, 2019, 10 pages.
Office Action received for Danish Patent Application No. PA 201870353, dated Mar. 18, 2020, 2 pages.
Arbelaez, Andres, "What if Spotify had Stories?", Prototypr.io, Available online at: <https://blog.prototypr.io/what-if-spotify-had-stories-9471a1464bd1>, Feb. 1, 2018, 10 pages.
Mostazo, Lucas, "Qué es y tomo usar Spotify (2017)", Youtube, Availabe online at: <https://www.youtube.com/watch?v=KNcZb-m7OVw>, Jan. 9, 2015, 3 pages (in Foreign Language). See communication under 37 CFR § 1.98(a) (3).
Seppala, Timothy J. , "Spotify's Latest Playlist Collects Your Top 100 Tracks From 2017", Engadget, Available online at: <https://www.engadget.com/2017/12/05/spotify-unwrapped-ed-sheeran-in-2017/>, Dec. 5, 2017, 9 pages.

\* cited by examiner

USER INTERFACES FOR RECOMMENDING AND CONSUMING CONTENT ON AN ELECTRONIC DEVICE

CROSS-REFERENCE TO RELATED APPLICATIONS

This application claims priority to U.S. Provisional Patent Application Ser. No. 62/667,904, filed May 7, 2018, which is hereby incorporated by reference in its entirety for all purposes.

FIELD OF THE DISCLOSURE

This relates generally to electronic devices that allow for browsing and consuming content in a content delivery application, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, content is accessible on such a device, and user interaction with such a device entails browsing and consuming such content on the device. Enhancing these interactions improves the user's experience with the device and decreases user interaction time, which is particularly important where input devices are battery-operated.

SUMMARY OF THE DISCLOSURE

Some embodiments described in this disclosure are directed to an electronic device that presents information about, and facilitates consumption of, content in a content delivery application, including utilizing content consumption activities of the user's friends to do so, and one or more operations related to the above that the electronic device optionally performs. Some embodiments described in this disclosure are directed to an electronic device that facilitates presentation of a friends content mix corresponding to content selected based on content consumption activity of one or more friends of a user of the electronic device. Some embodiments described in this disclosure are directed to an electronic device that facilitates presentation of a second content mix corresponding to content selected based on criteria different than the content consumption activity of the one or more friends of the user. Some embodiments described in this disclosure are directed to an electronic device that facilitates presentation of a plurality of content items included in the friends content mix that includes a representation of a first content item of the plurality of content items displayed in association with a representation of a first friend, of the one or more friends of the user, that is associated with the first content item. Some embodiments described in this disclosure are directed to an electronic device that facilitates presentation of a plurality of representations of partially-consumed content items that the user of the electronic device has partially consumed. Some embodiments described in this disclosure are directed to an electronic device that facilitates presentation of a plurality of representations of recommended friends for the user of the electronic device. Some embodiments described in this disclosure are directed to an electronic device that facilitates presentation of a plurality of representations of playlists published by friends of the user of the electronic device. Some embodiments described in this disclosure are directed to an electronic device that facilitates presentation of a plurality of representations of content items associated with a particular artist. Some embodiments described in this disclosure are directed to an electronic device that facilitates presentation of a plurality of representations of content items selected based on a time-related characteristic associated with the electronic device. Some embodiments described in this disclosure are directed to an electronic device that facilitates presentation of a plurality of representations of content items having mixed content types organized by genre. Some embodiments described in this disclosure are directed to an electronic device that facilitates presentation of a plurality of representations of trending artists selected based on popularity of the artists within a content delivery service corresponding to the user interface. Some embodiments described in this disclosure are directed to an electronic device that facilitates presentation of a plurality of representations of playlists selected based on popularity of the playlists within a content delivery service corresponding to the user interface.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
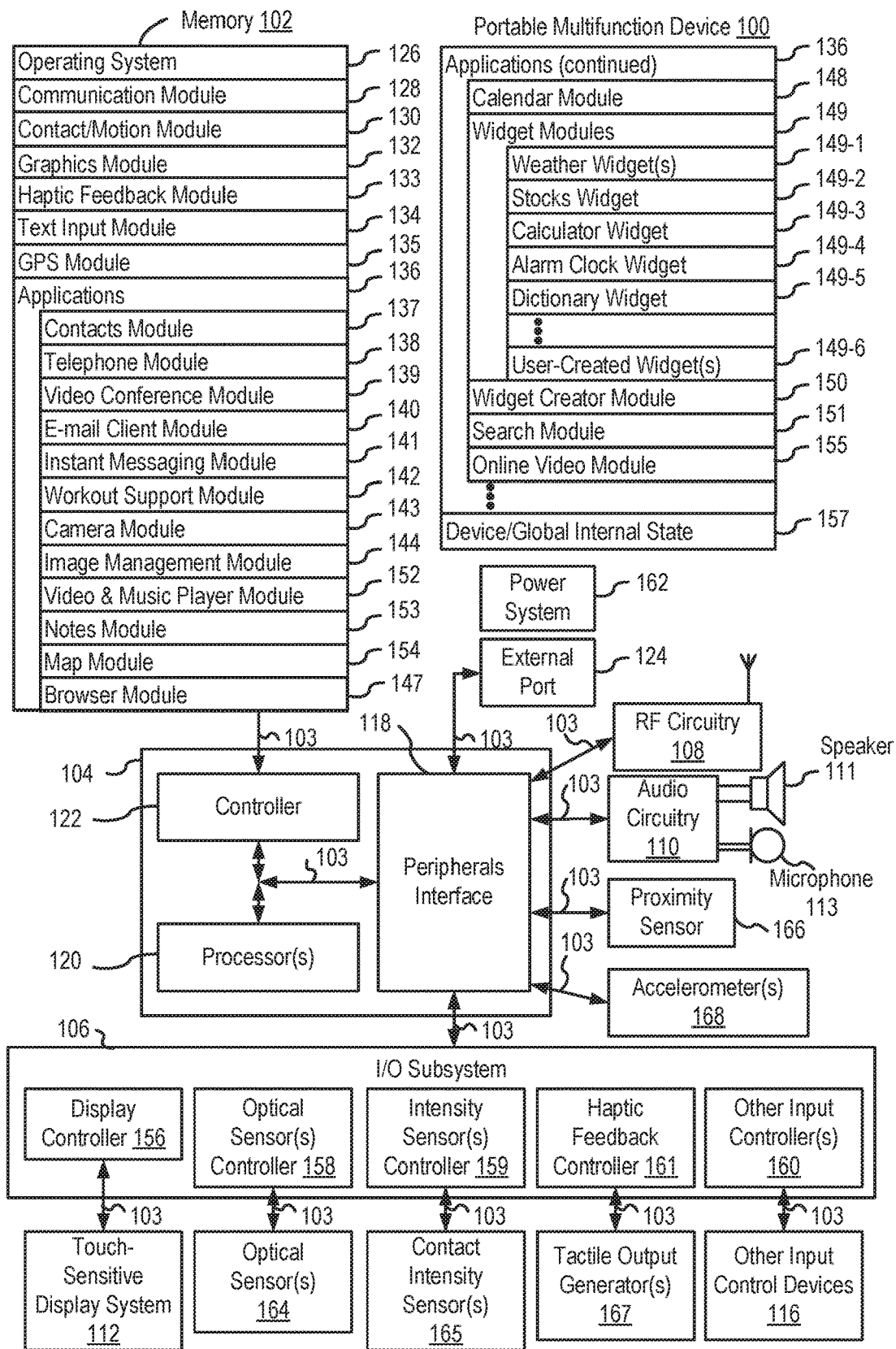
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for presenting information about, and facilitating consumption of, content in a content delivery application. Such techniques can reduce the cognitive burden on a user who browses and/or consumes content, thereby enhancing productivity. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
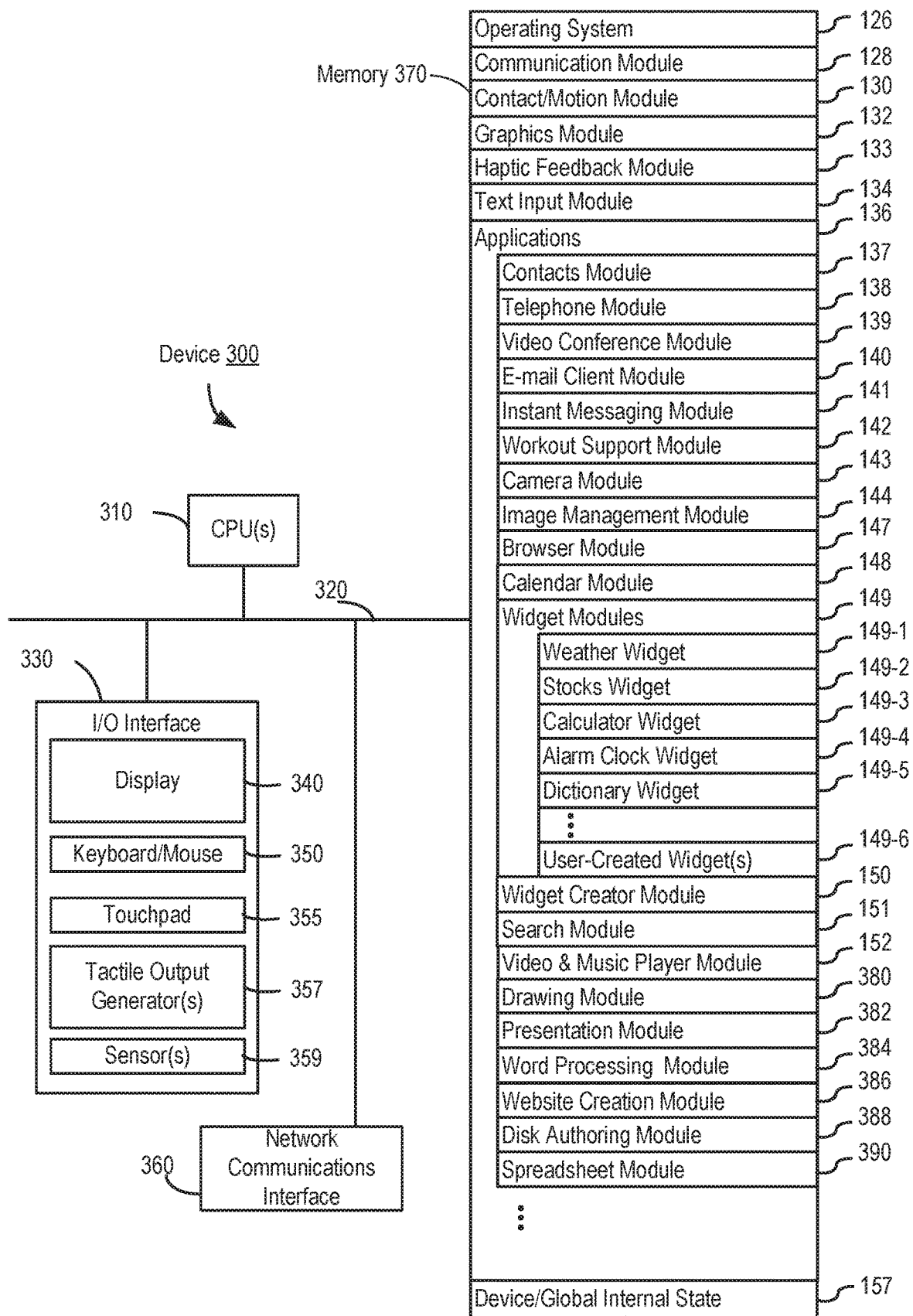
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
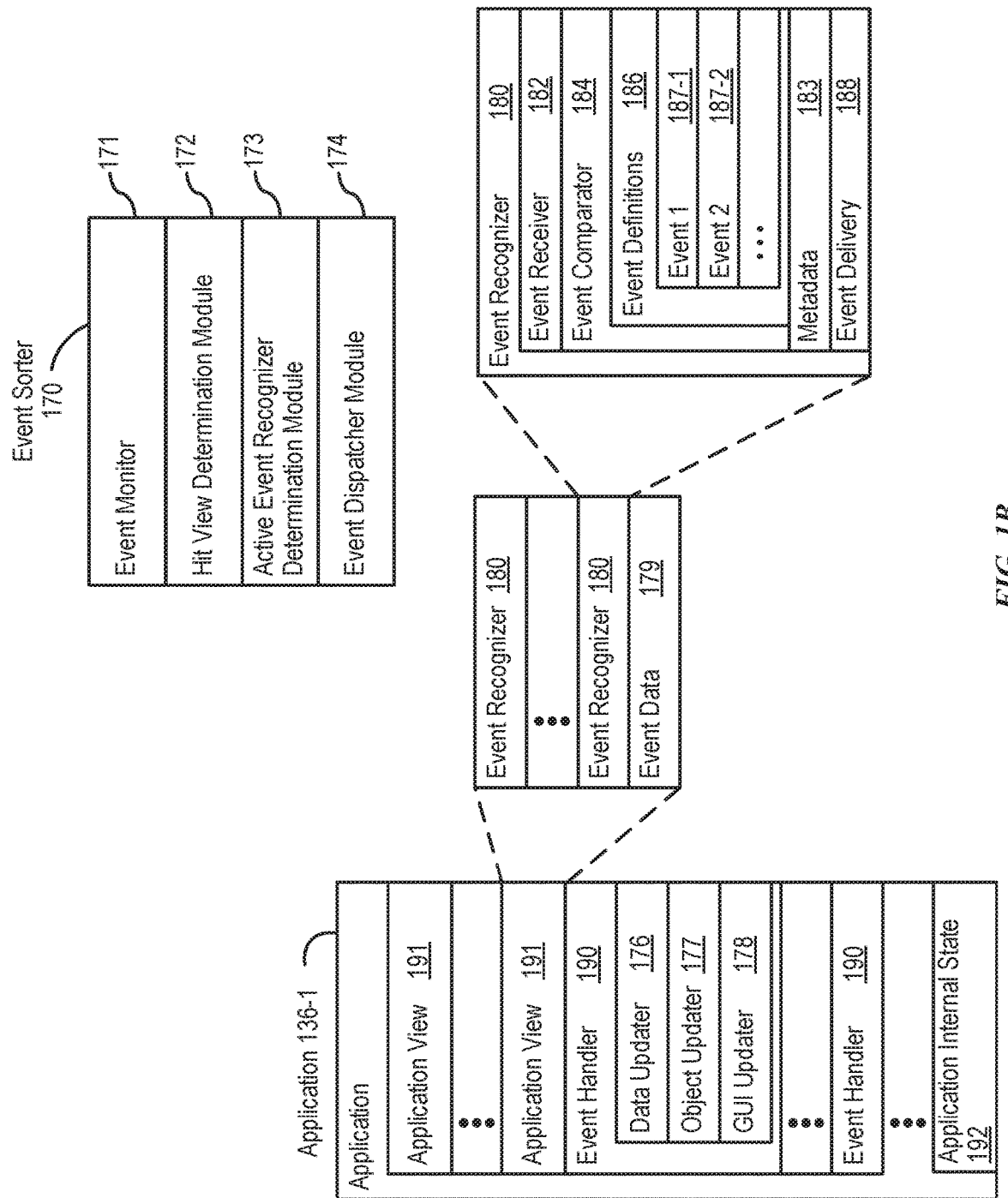
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
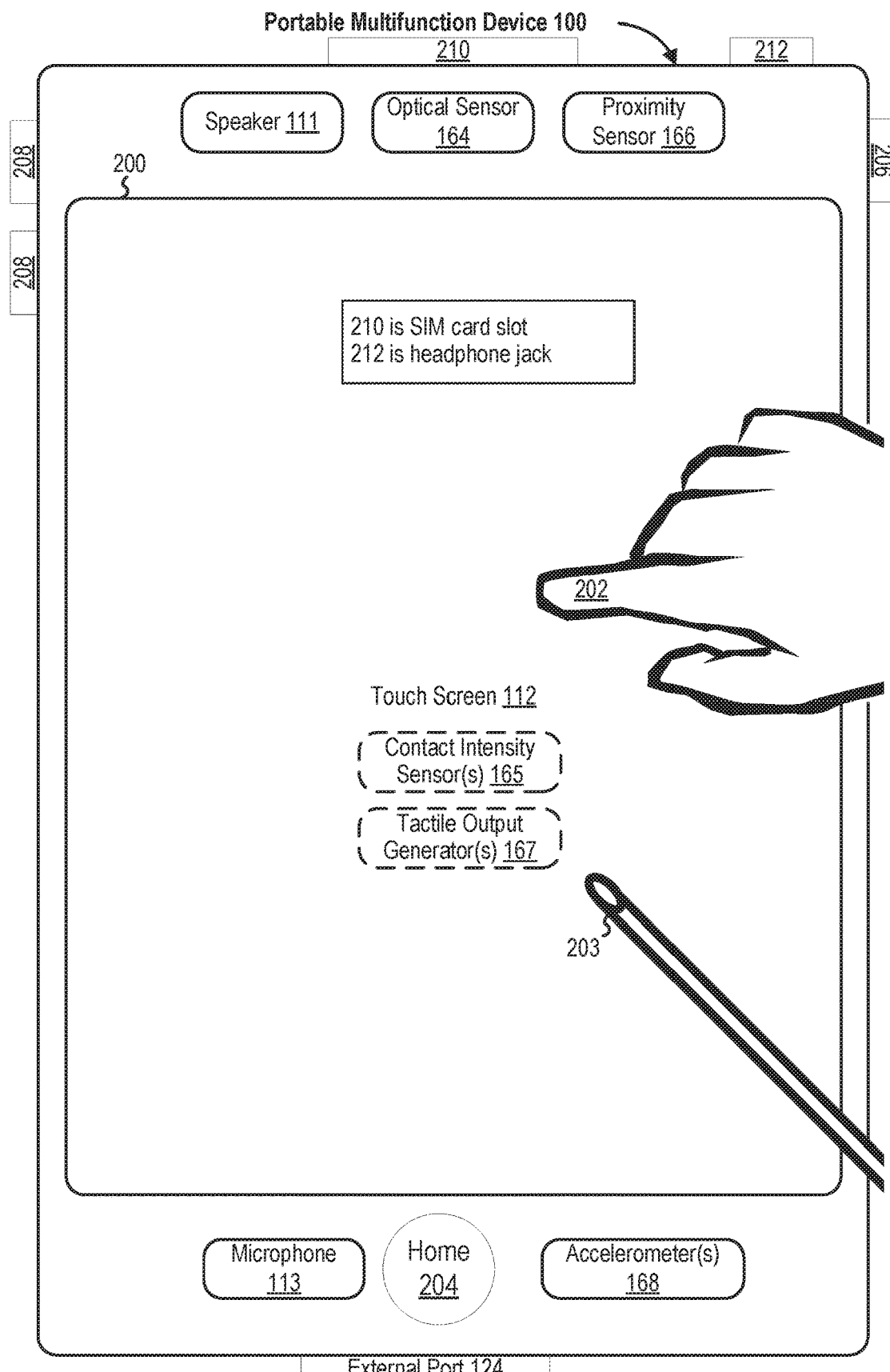
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
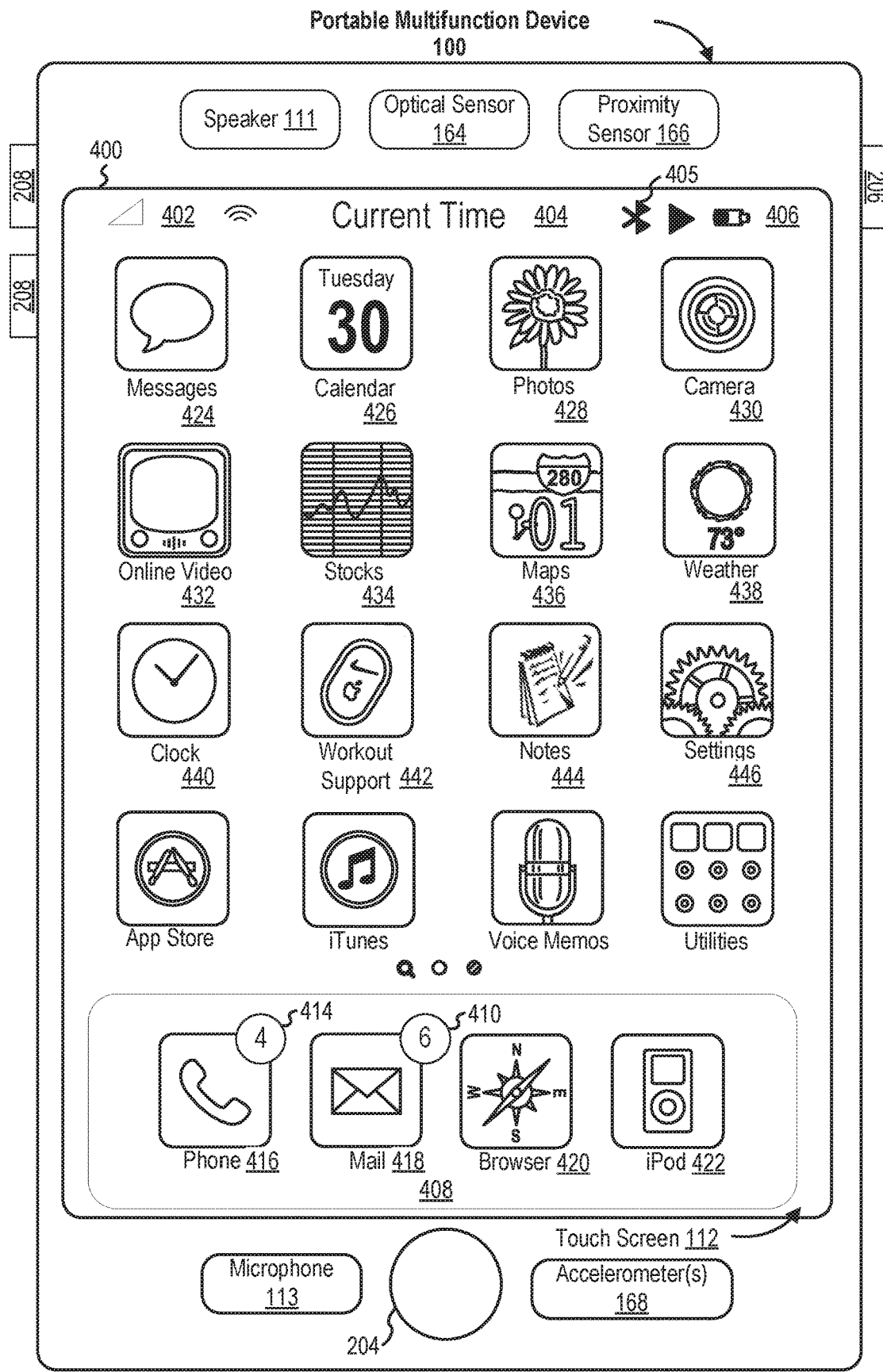
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:
- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
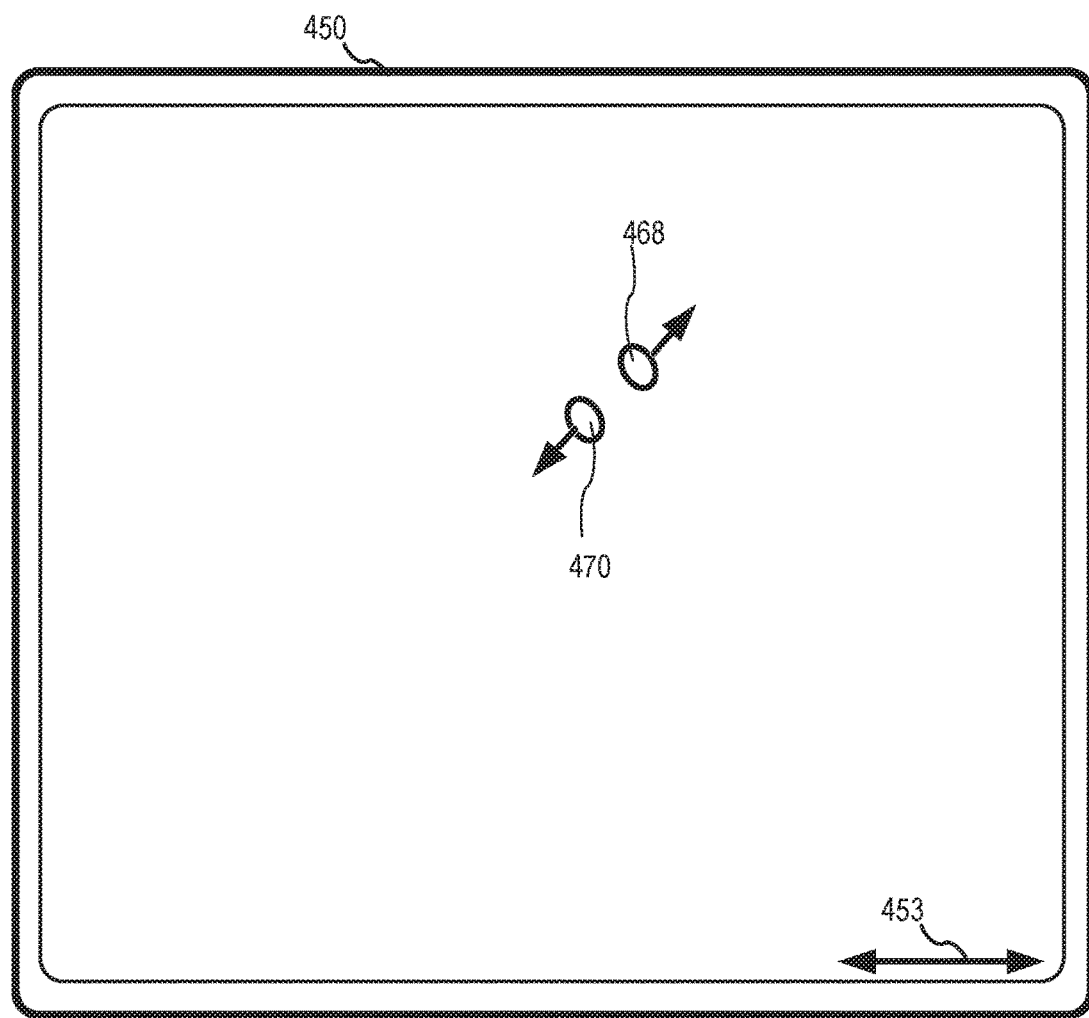
FIG. 4B illustrates an exemplary user interface for a multifunction device with a touch-sensitive surface that is separate from the display in accordance with some embodiments.
Figure 4B:
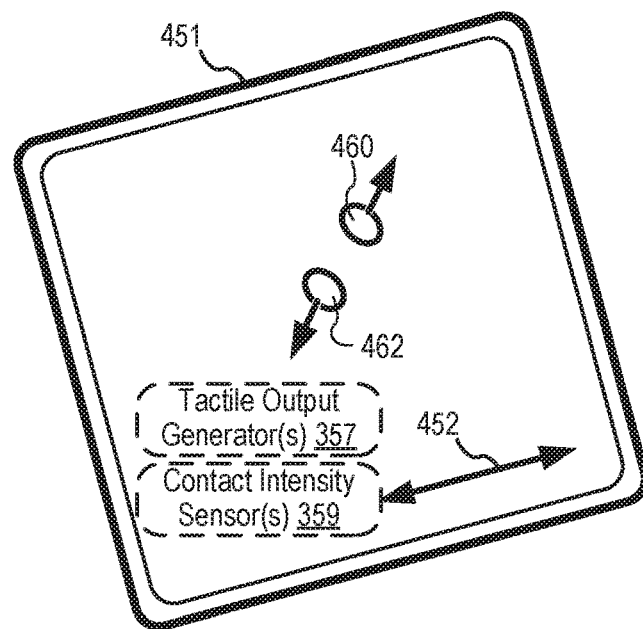

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
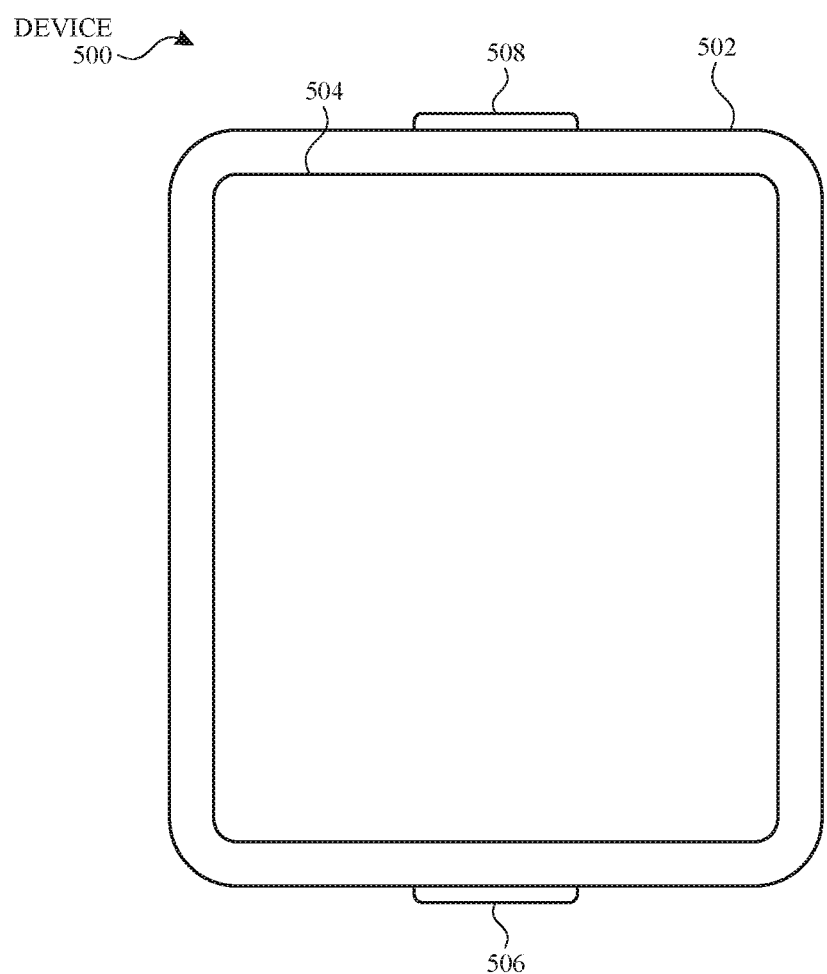
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
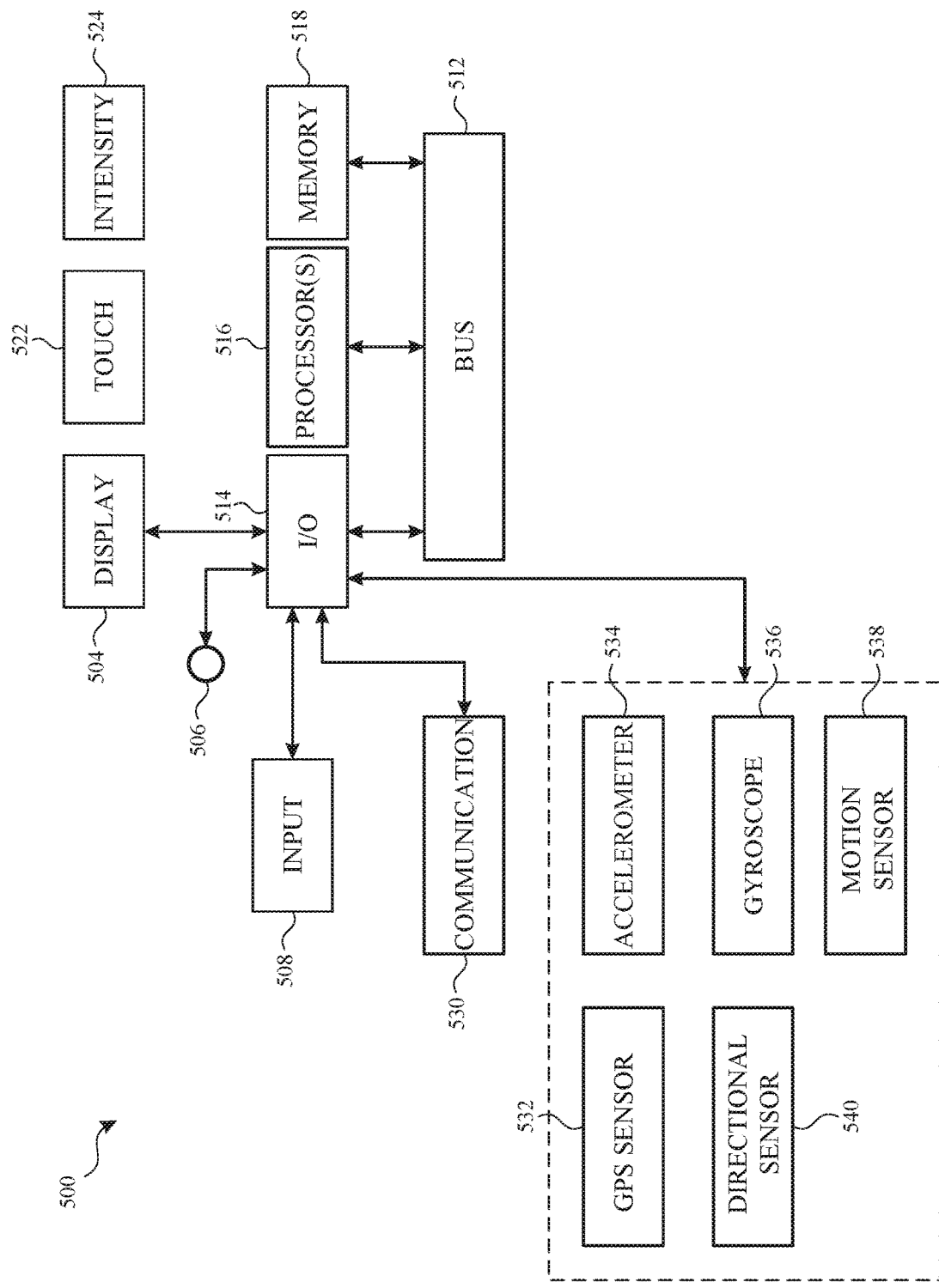
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
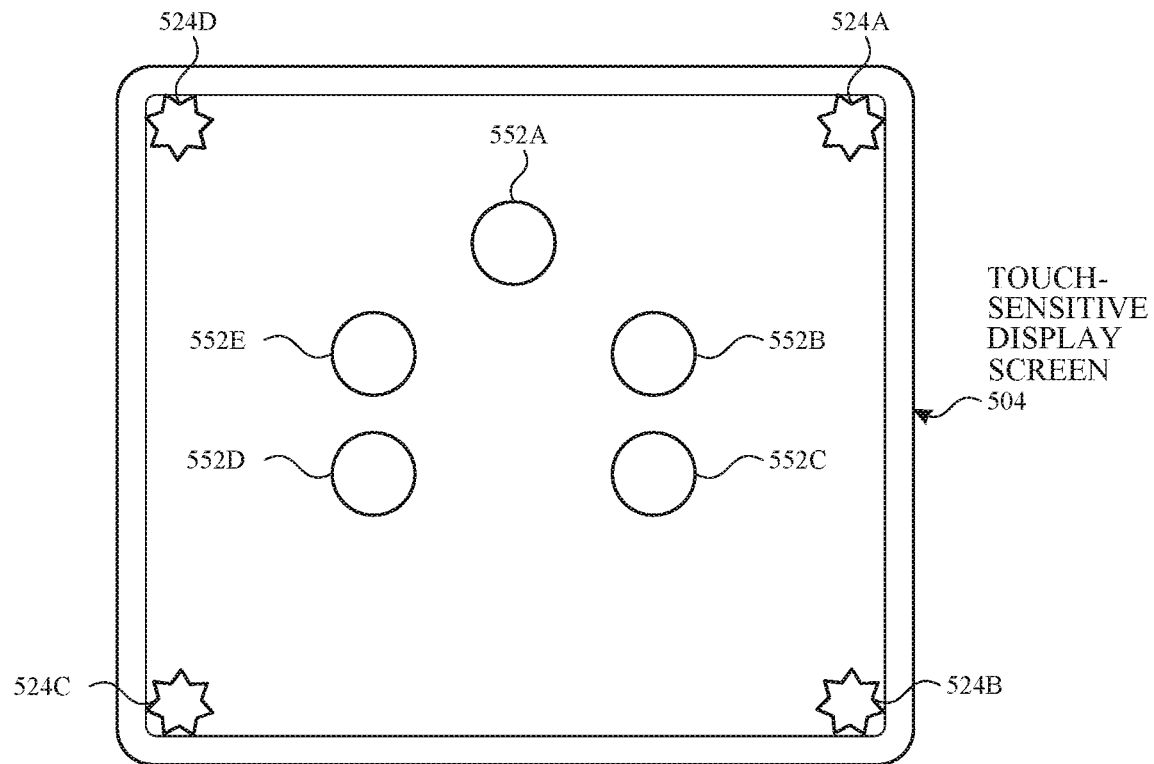
FIGS. 5C-5D illustrate exemplary components of a personal electronic device having a touch-sensitive display and intensity sensors in accordance with some embodiments.
Figure 5C:
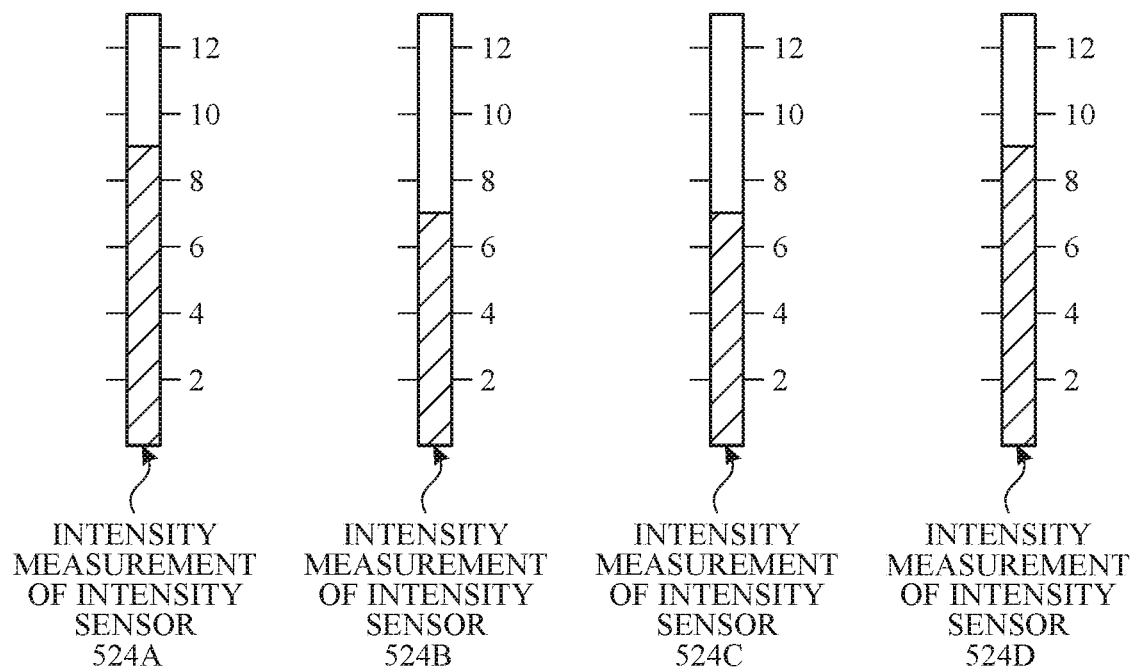
Figure 5D:
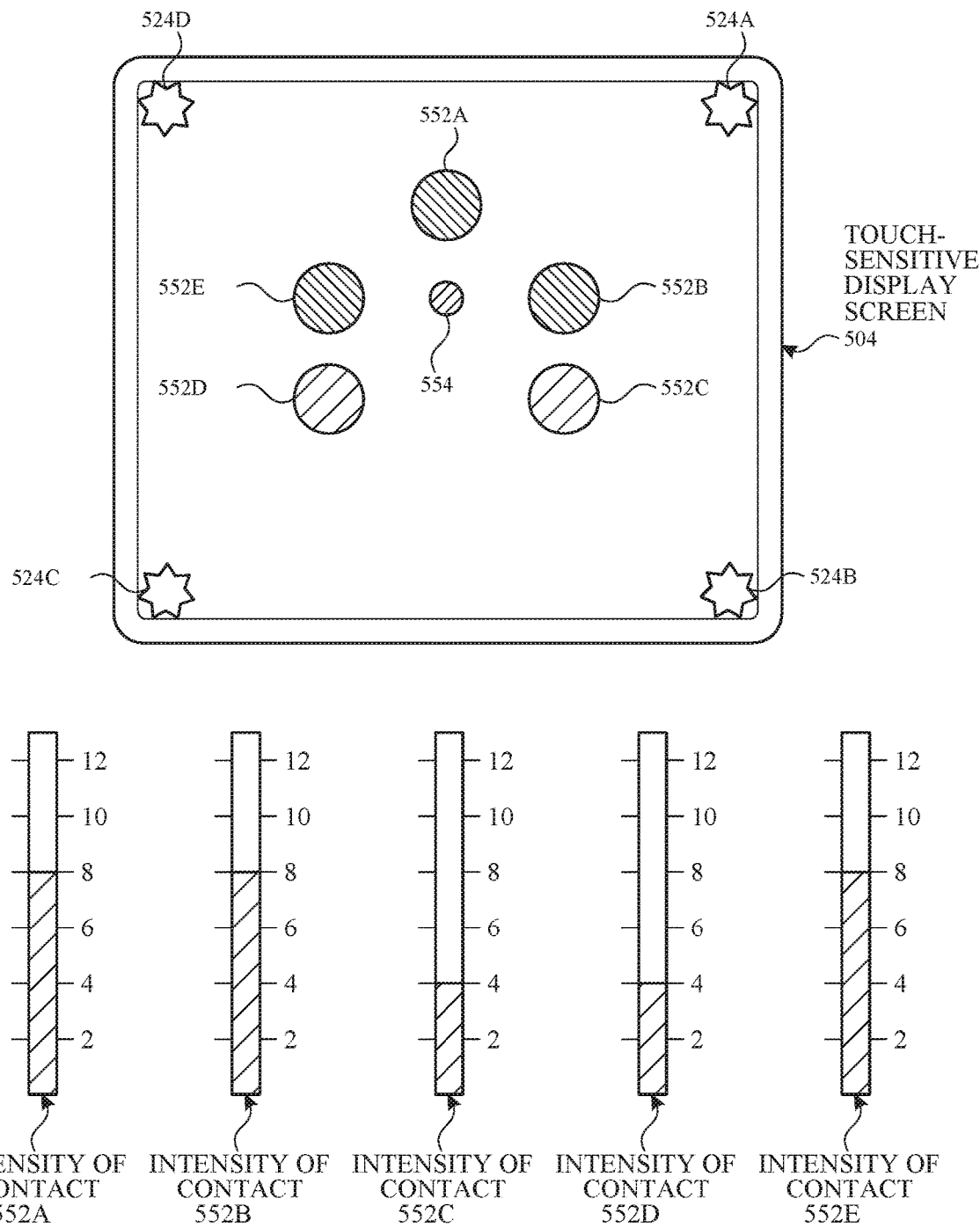

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
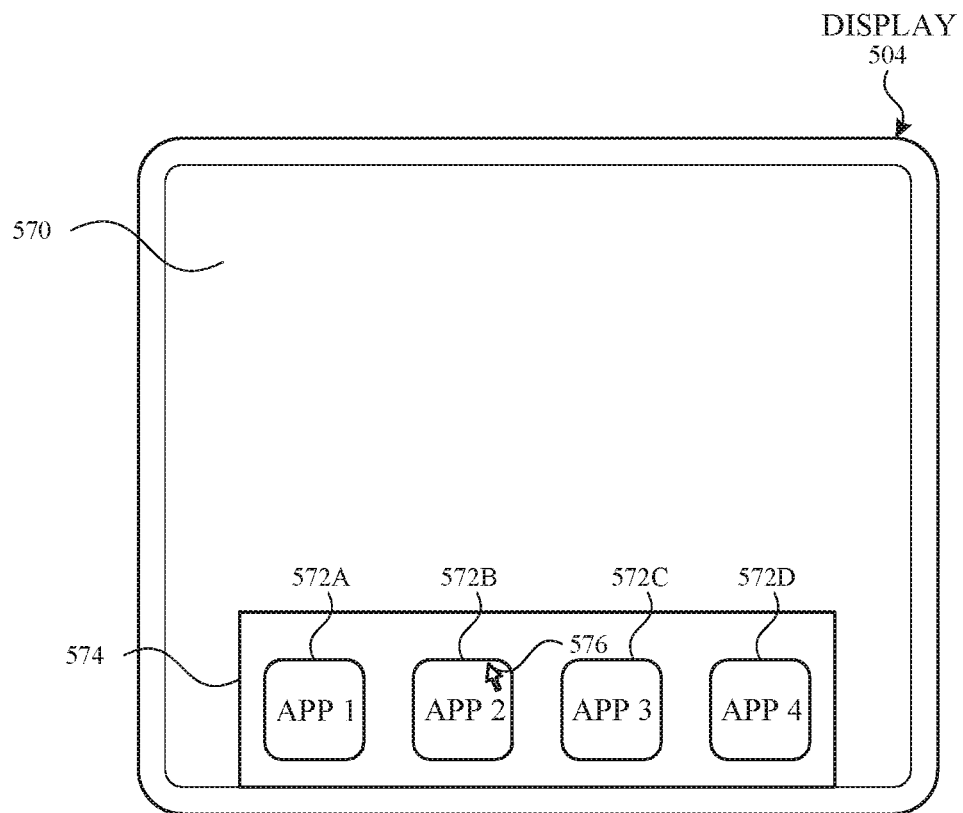
FIGS. 5E-5H illustrate exemplary components and user interfaces of a personal electronic device in accordance with some embodiments.
Figure 5E:
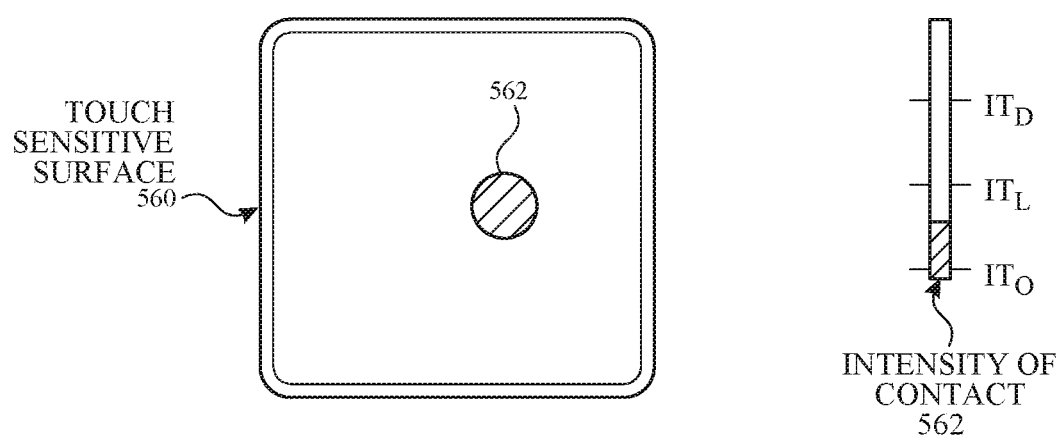
Figure 5F:
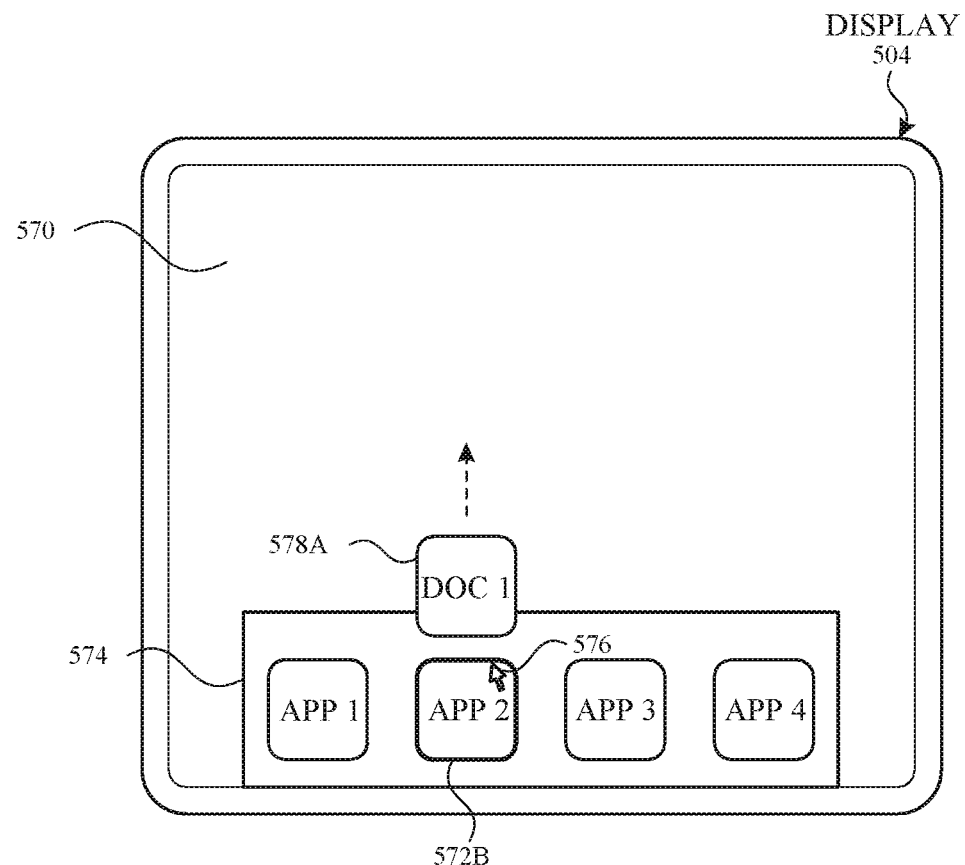
Figure 5F:
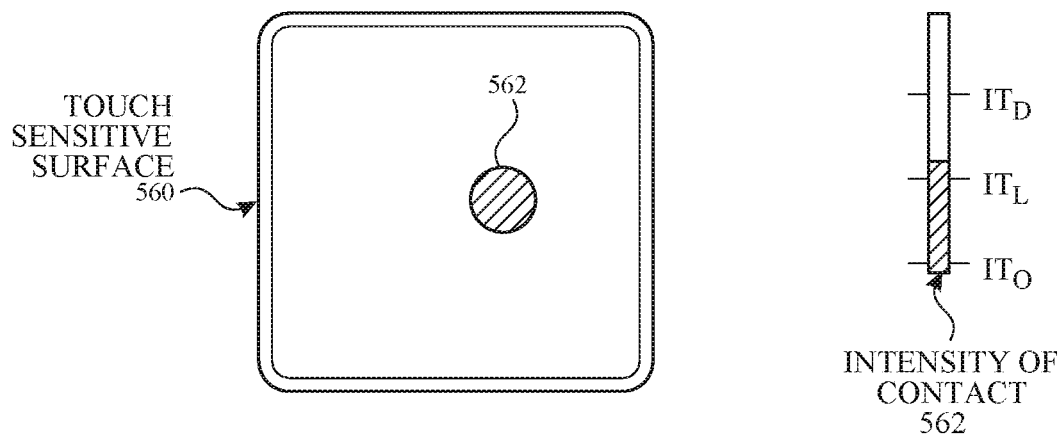
Figure 5G:
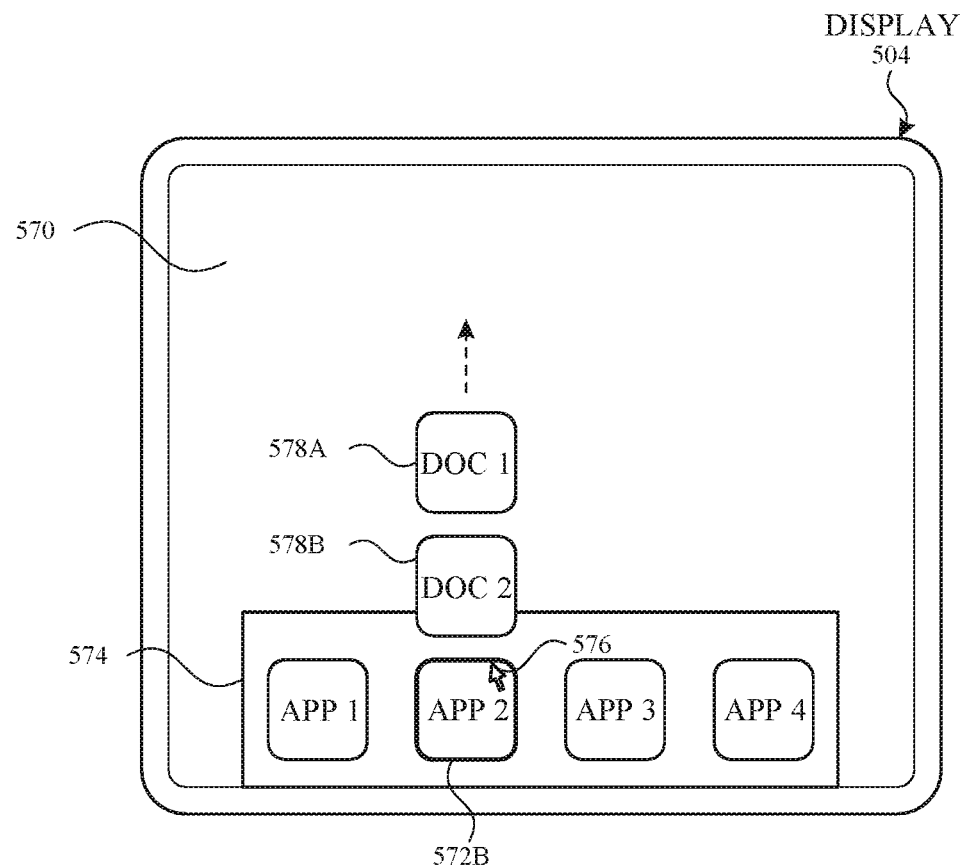
Figure 5G:
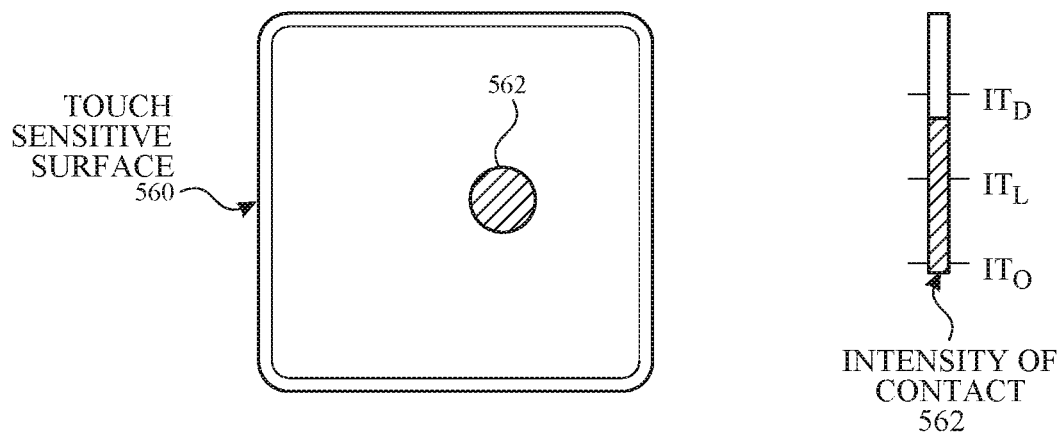
Figure 5H:
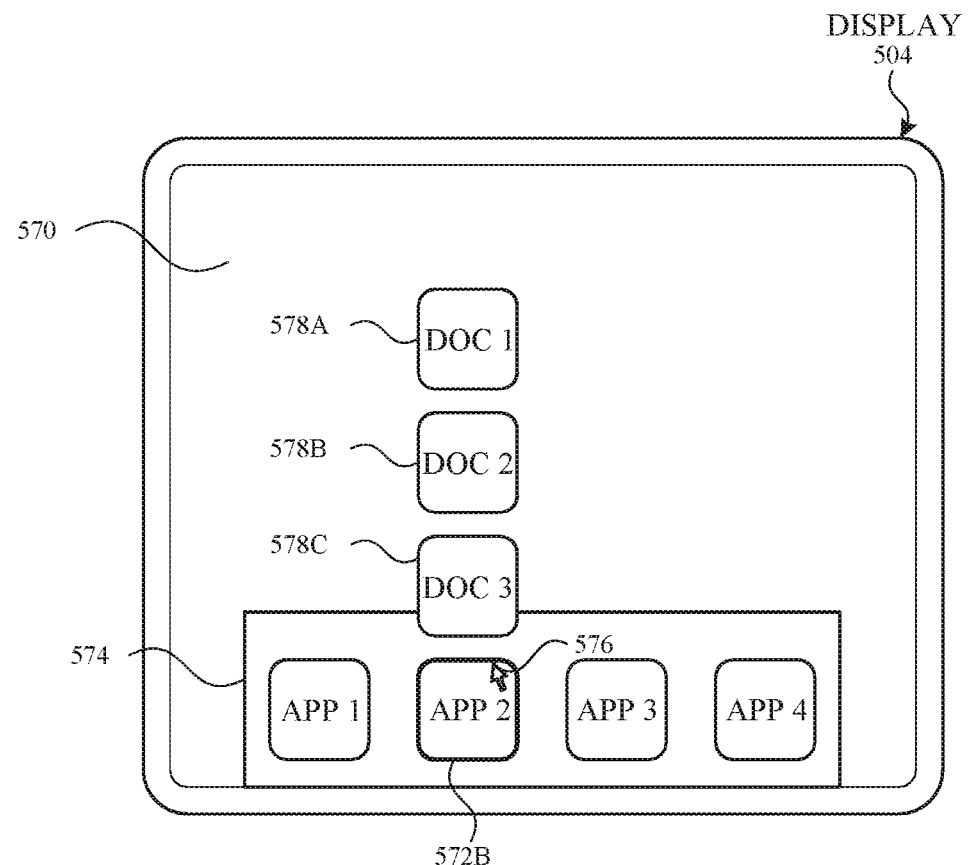

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Recommended-Content Browsing User Interface

Users interact with electronic devices in many different manners, including browsing content that may be available (e.g., available for purchase and/or download) on the electronic devices. For example, a user may browse content in a content delivery application for consuming content (e.g., music, videos, songs, podcasts, interviews, playlists, etc.) on an electronic device. However, in some circumstances, the number and the variety of the content available in the content delivery application makes it difficult for the user to find or identify content of potentially greater interest to the user. The embodiments described below provide ways in which an electronic device presents information about, and facilitates consumption of, content in a content delivery application, including utilizing content consumption activities of the user's friends to do so, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
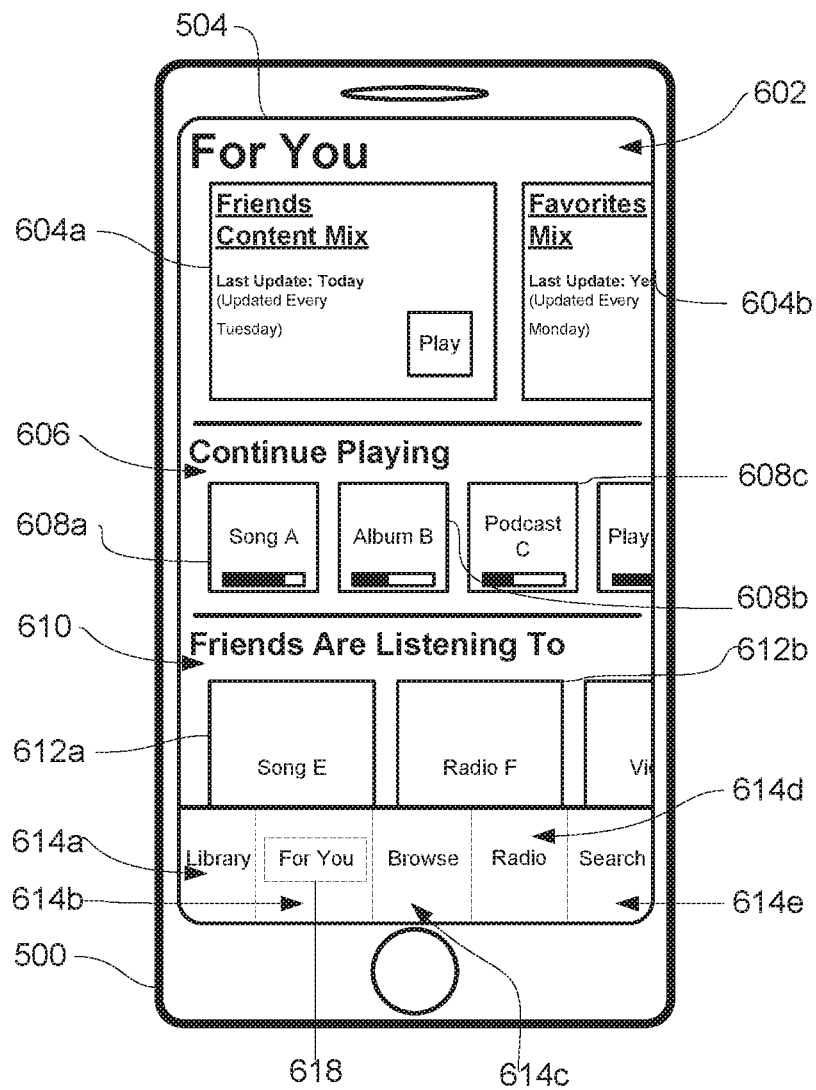
FIGS. 6A-6X illustrate exemplary ways in which an electronic device presents information about, and facilitates consumption of, content in a content delivery application, including utilizing content consumption activities of the user's friends to do so, in accordance with some embodiments of the disclosure.
Figure 6B:
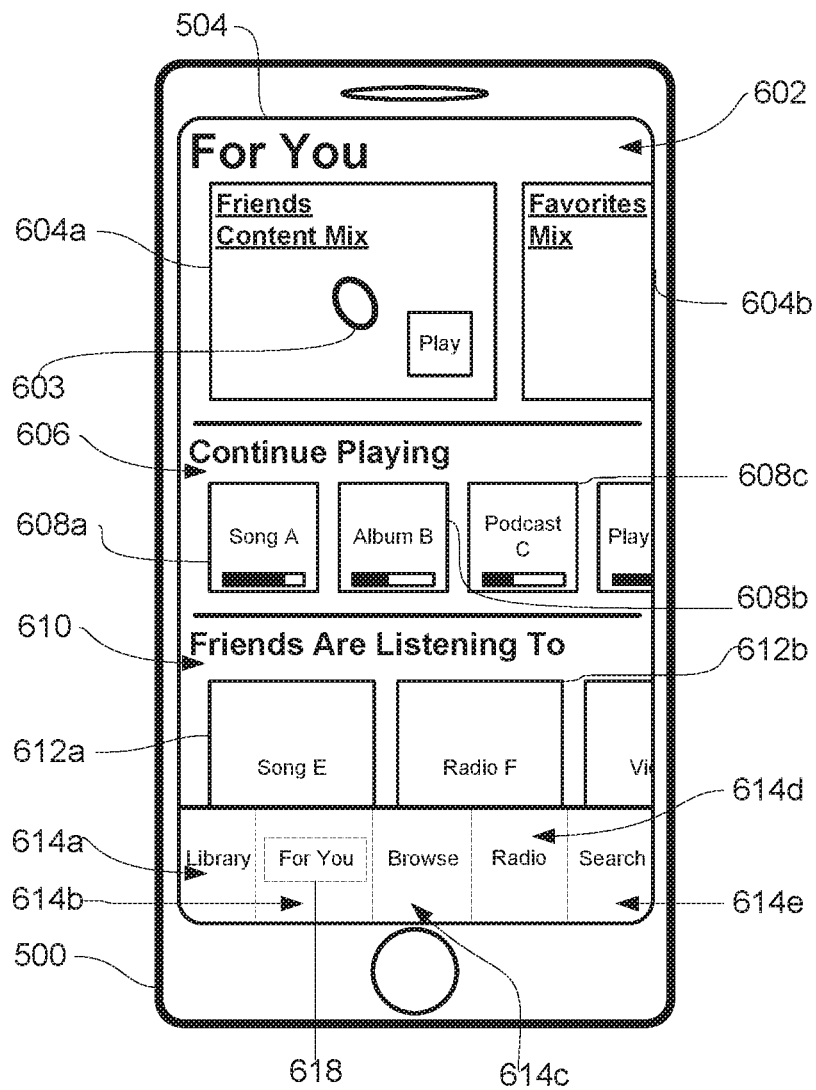
Figure 6C:
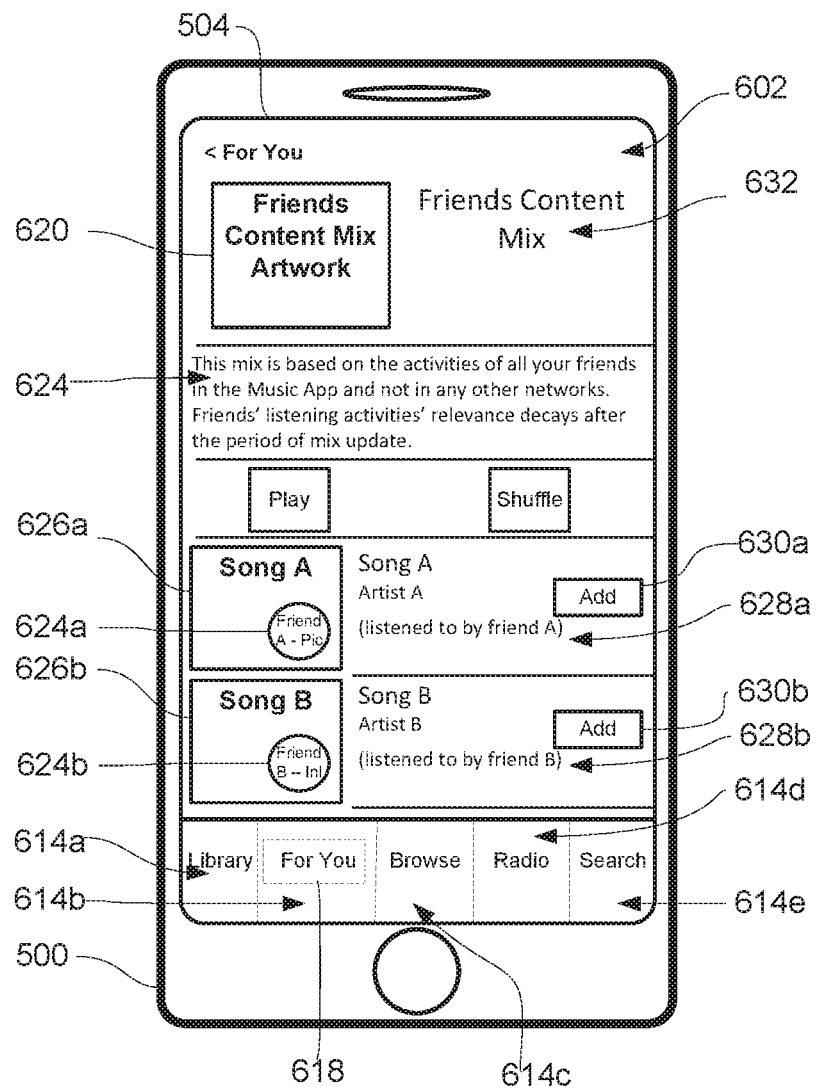
Figure 6D:
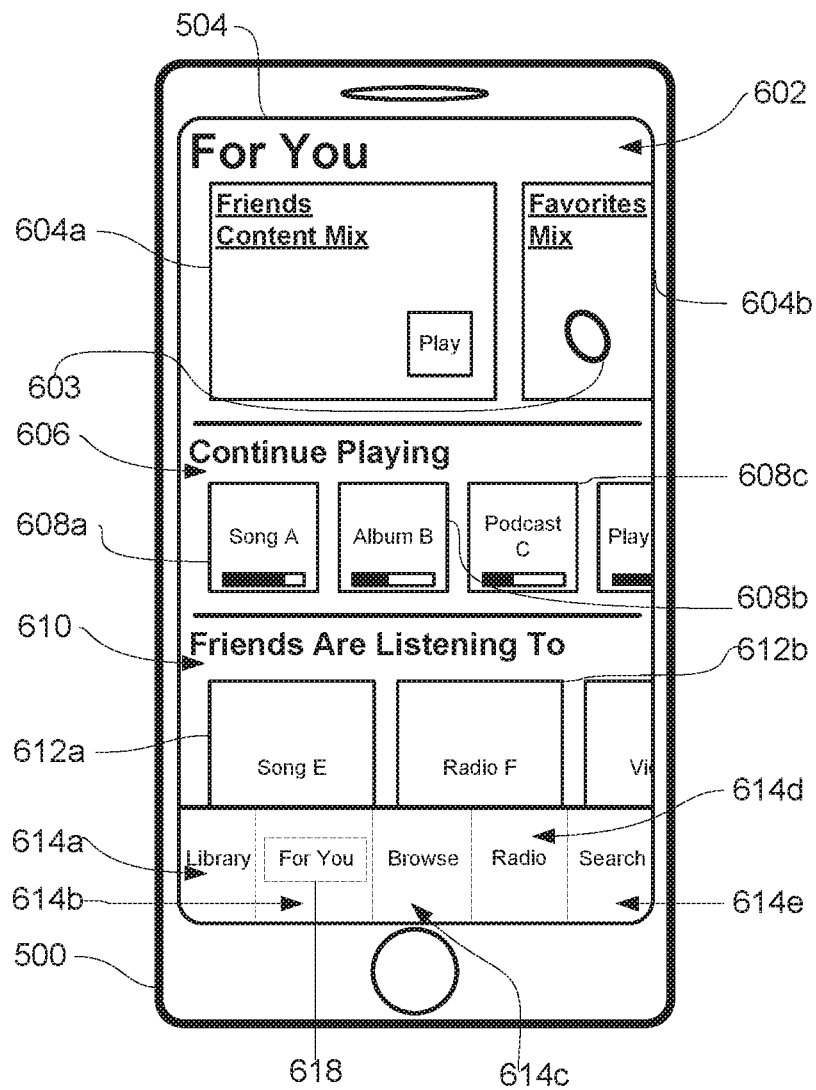
Figure 6E:
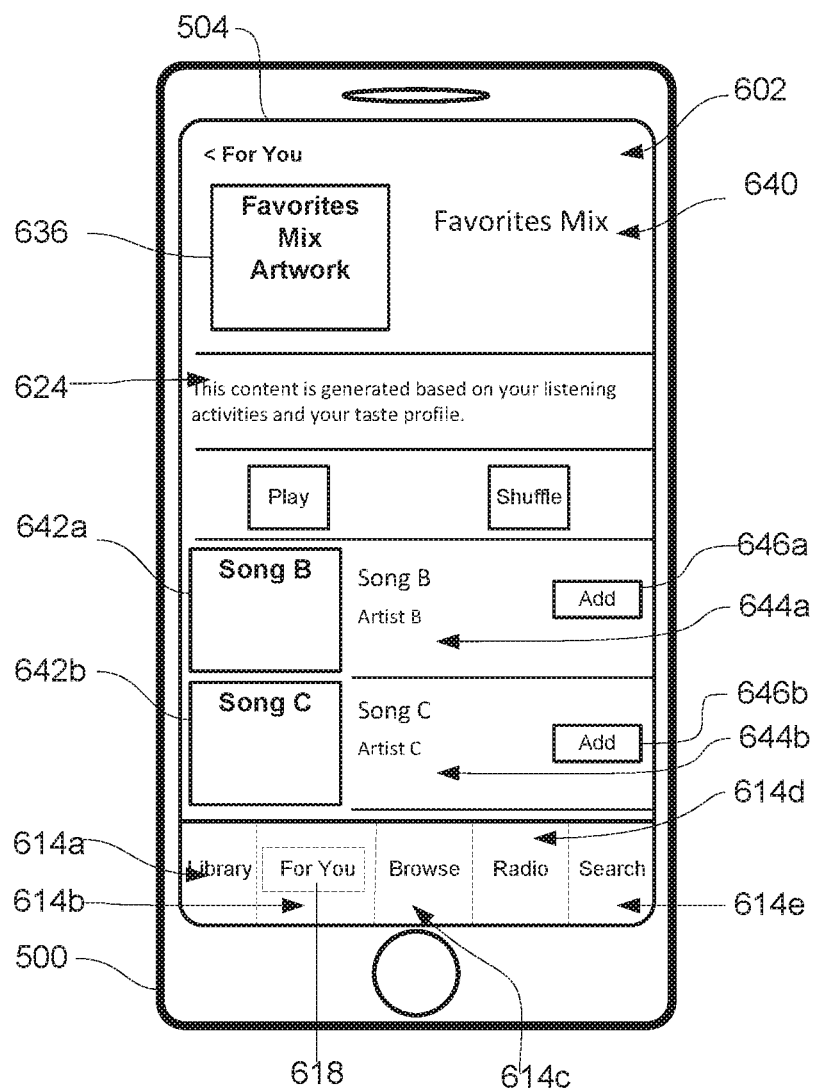
Figure 6F:
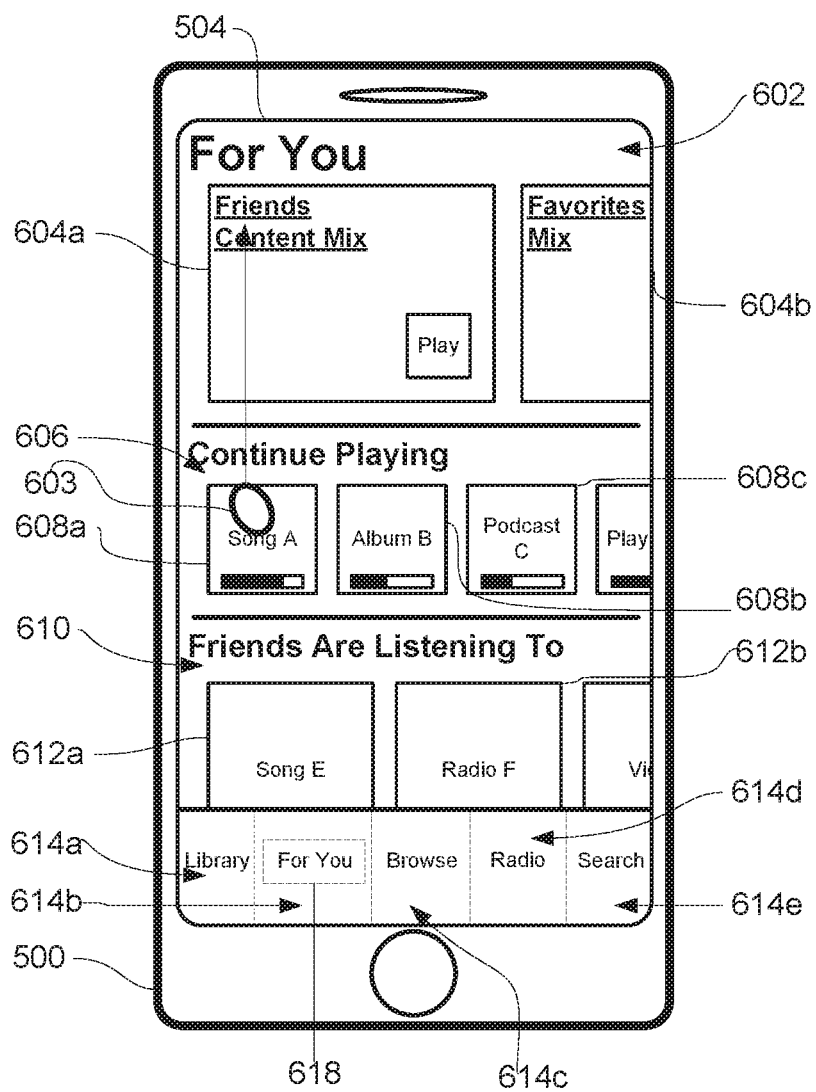
Figure 6G:
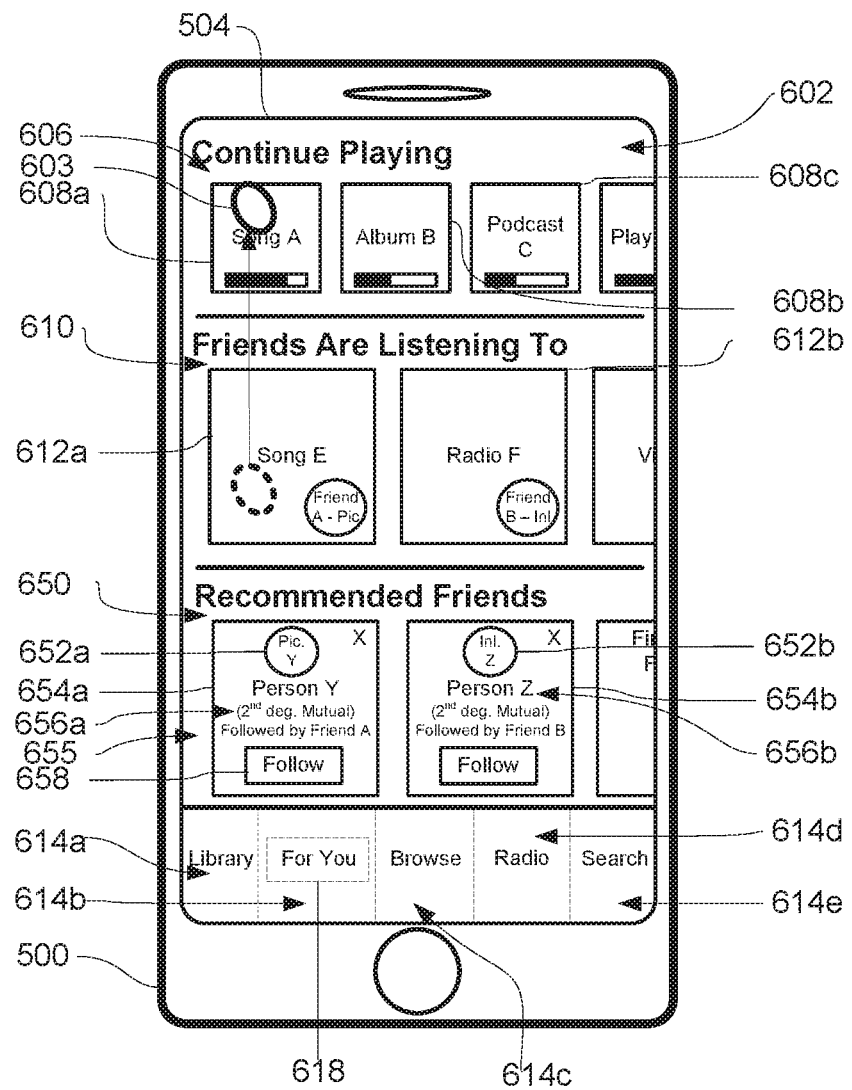
Figure 6H:
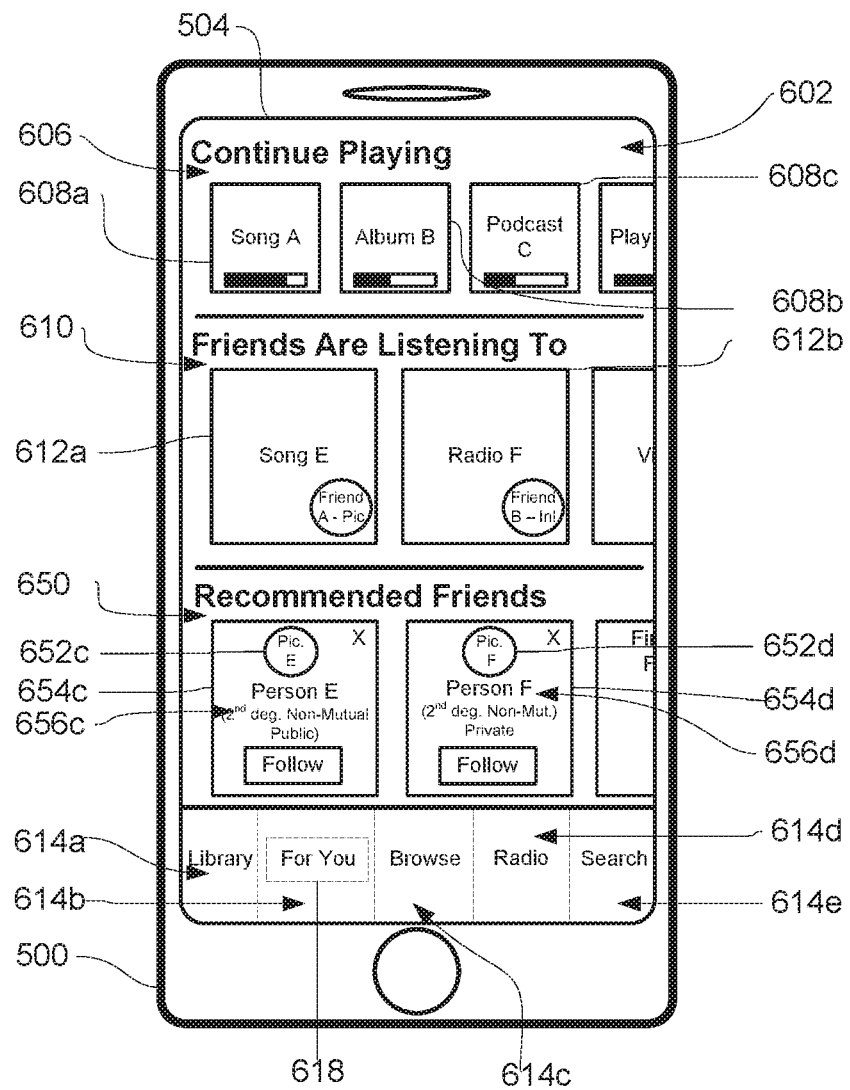
Figure 6I:
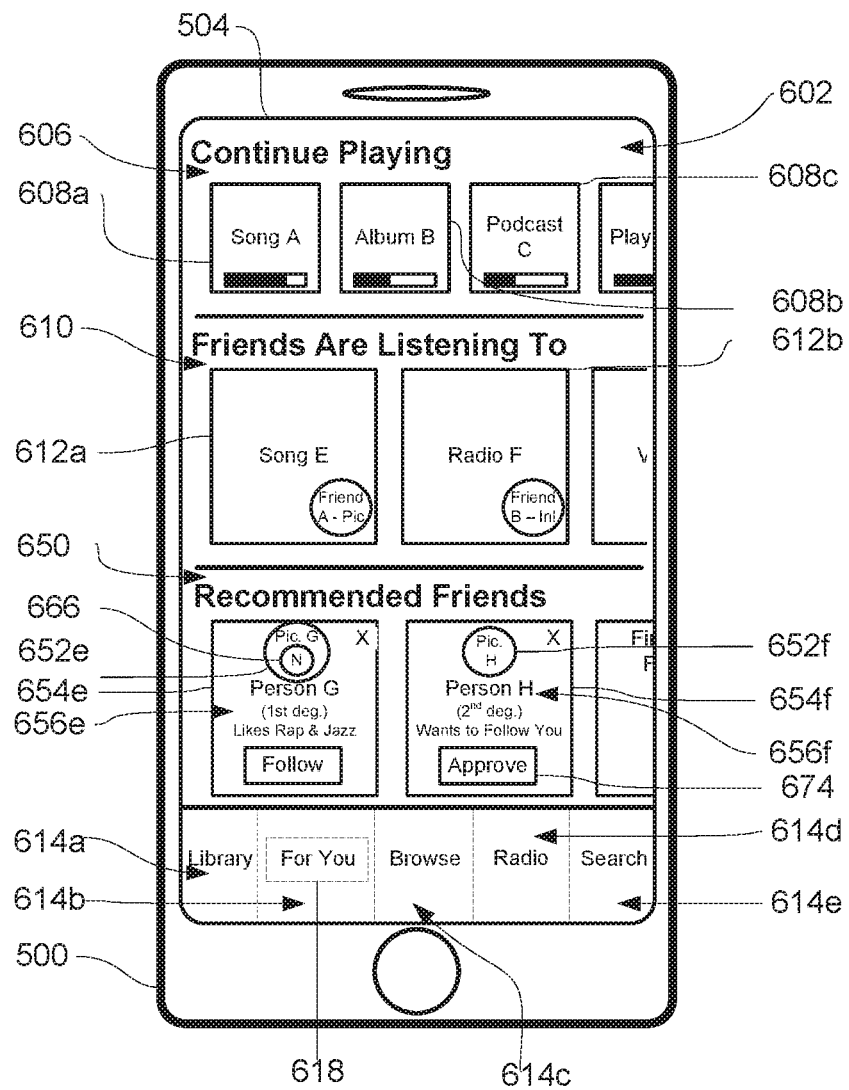
Figure 6J:
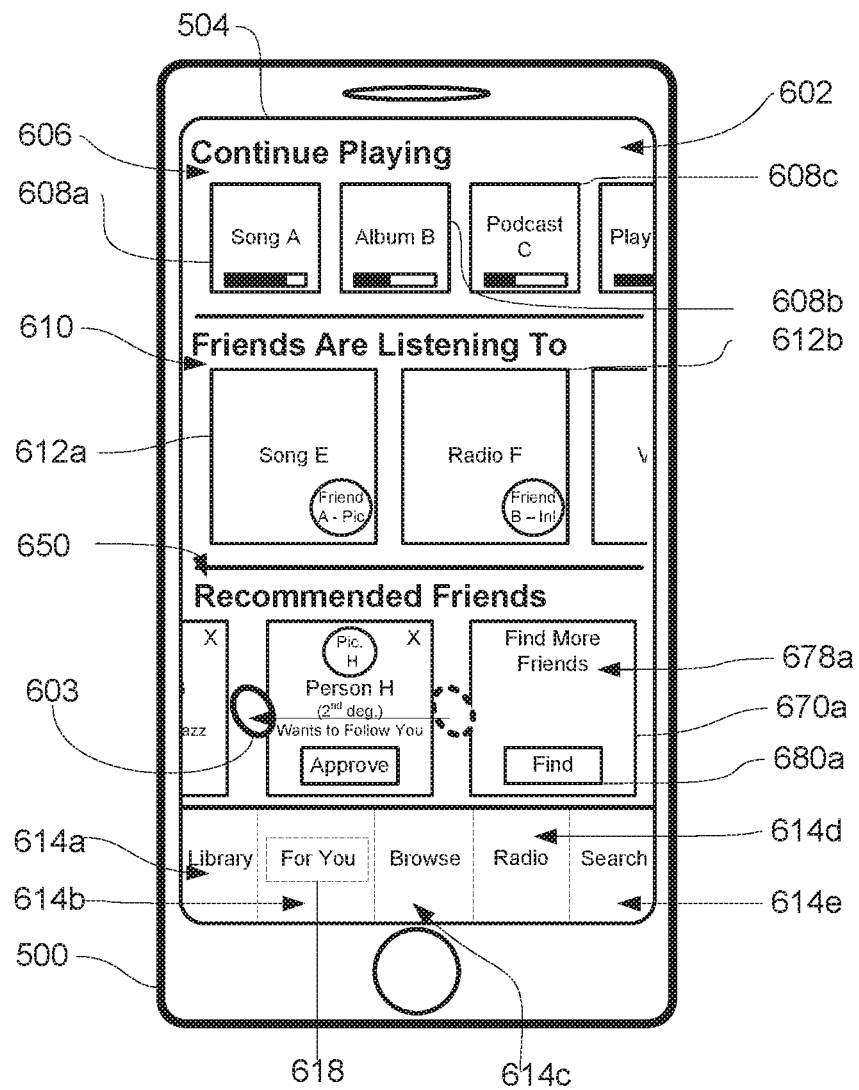
Figure 6K:
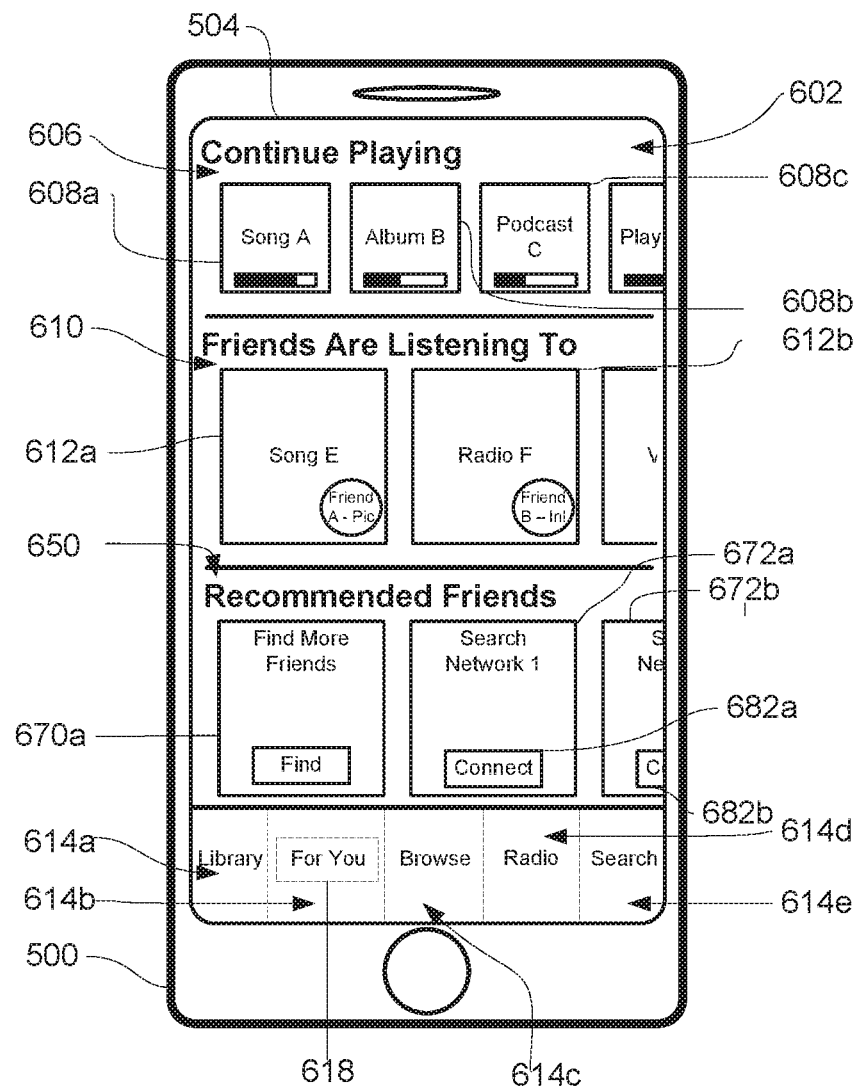
Figure 6L:
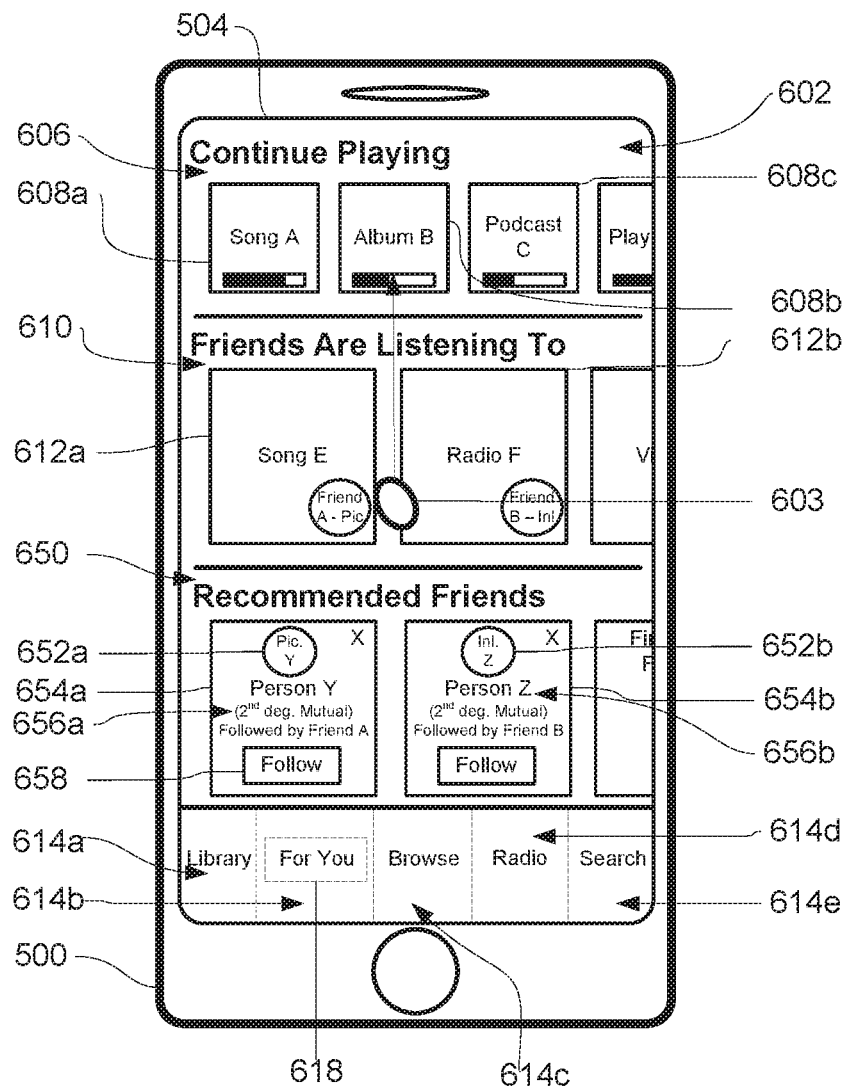
Figure 6M:
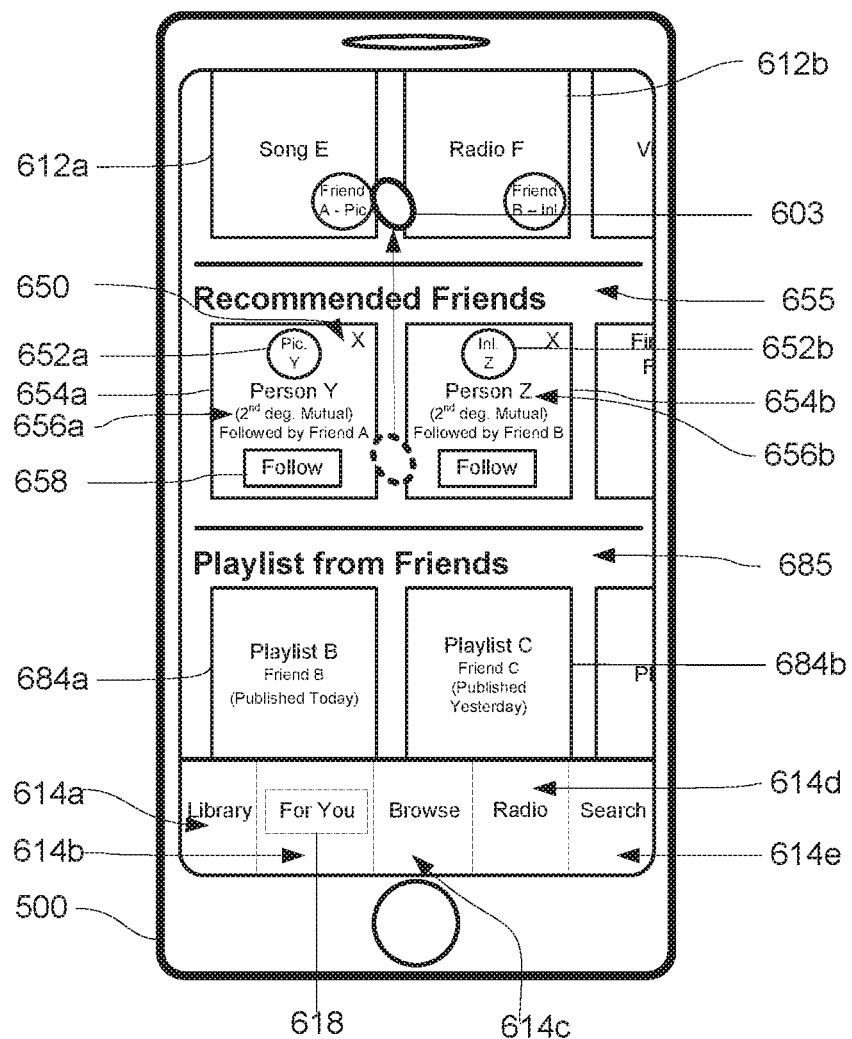
Figure 6N:
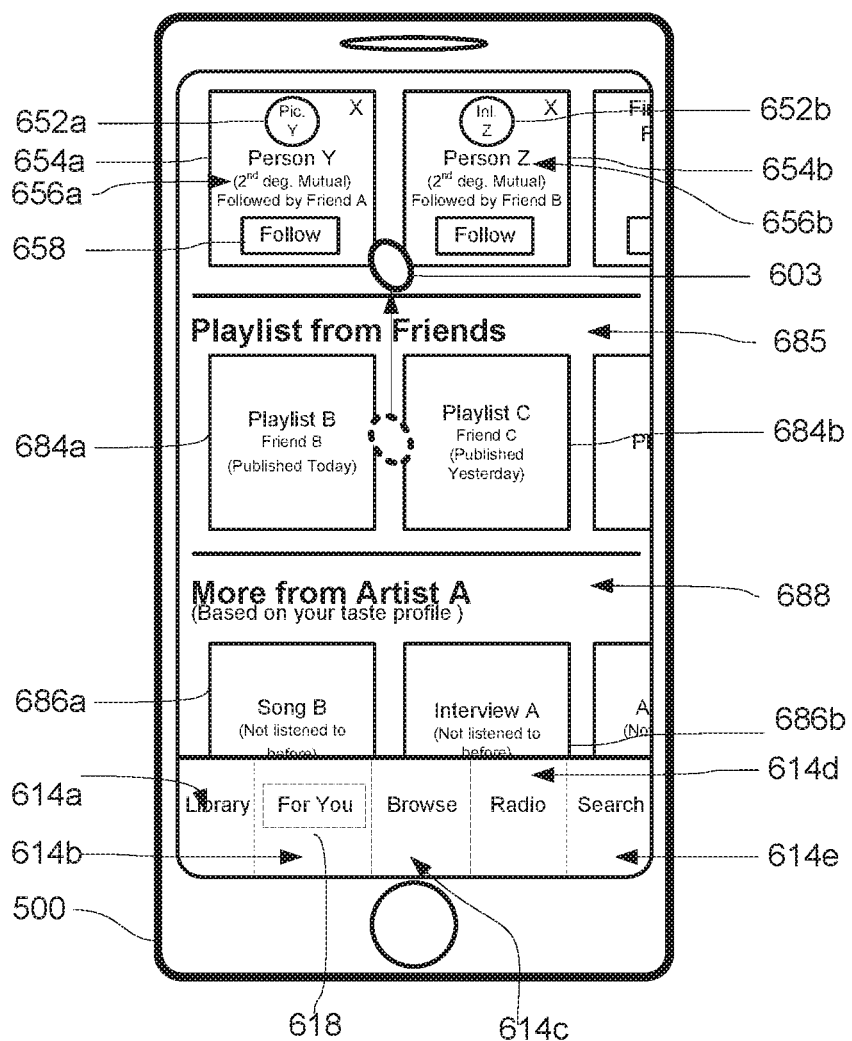
Figure 6O:
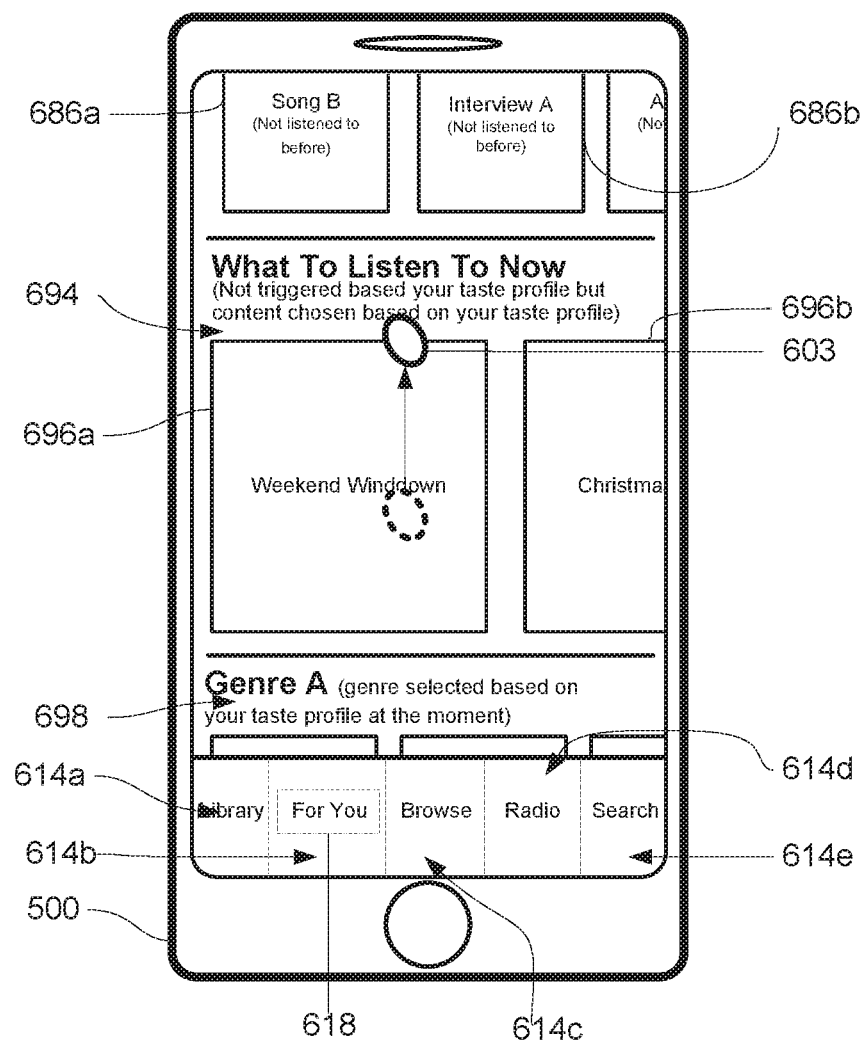
Figure 6P:
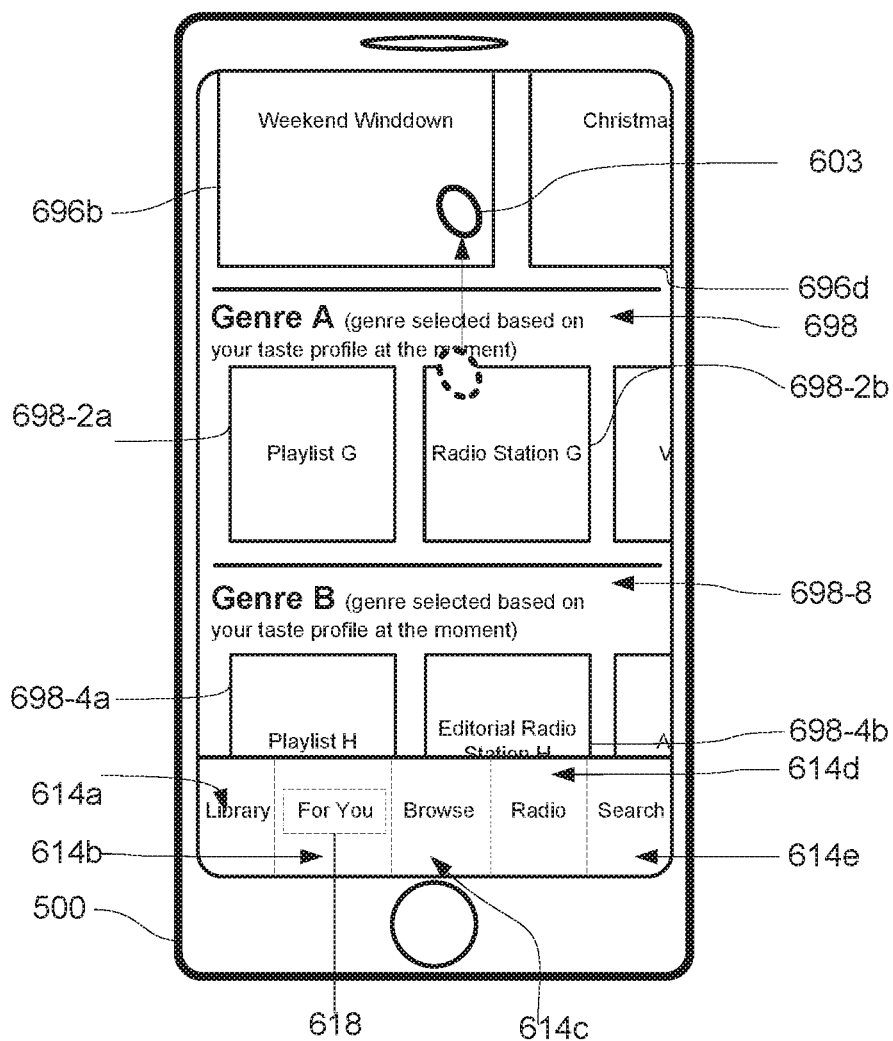
Figure 6Q:
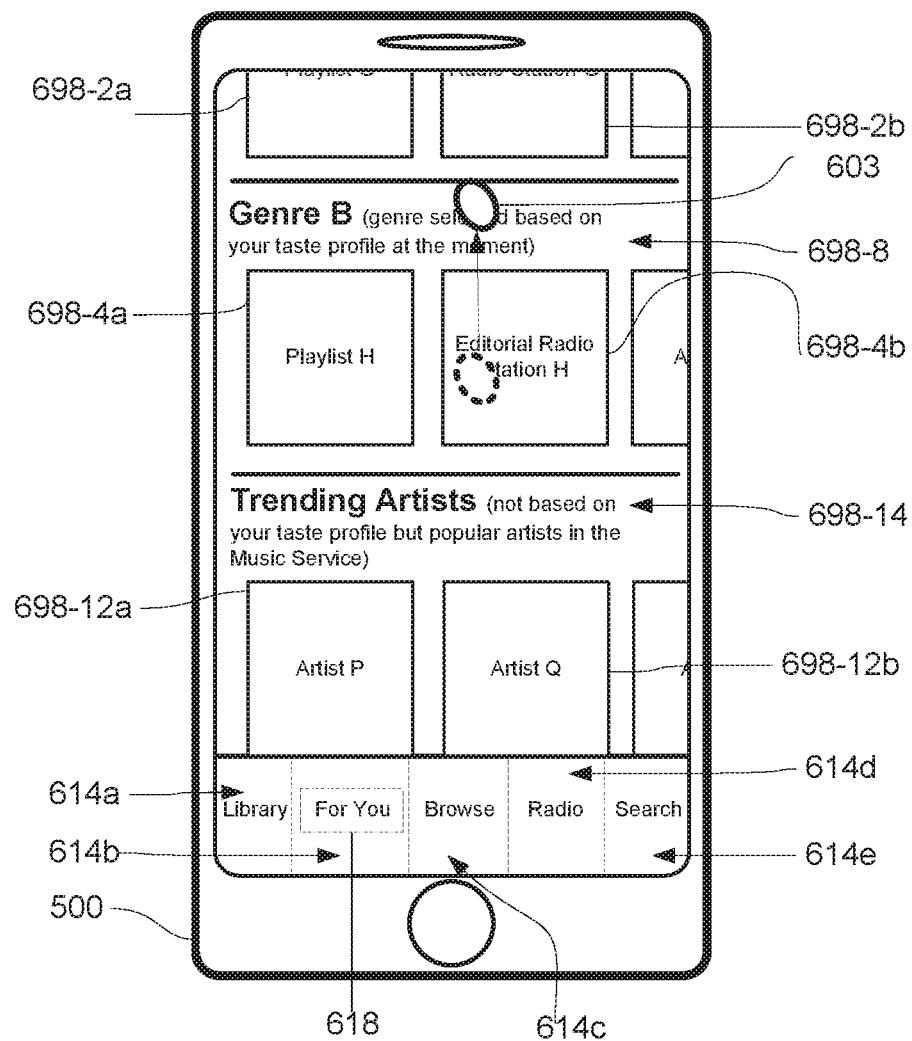
Figure 6R:
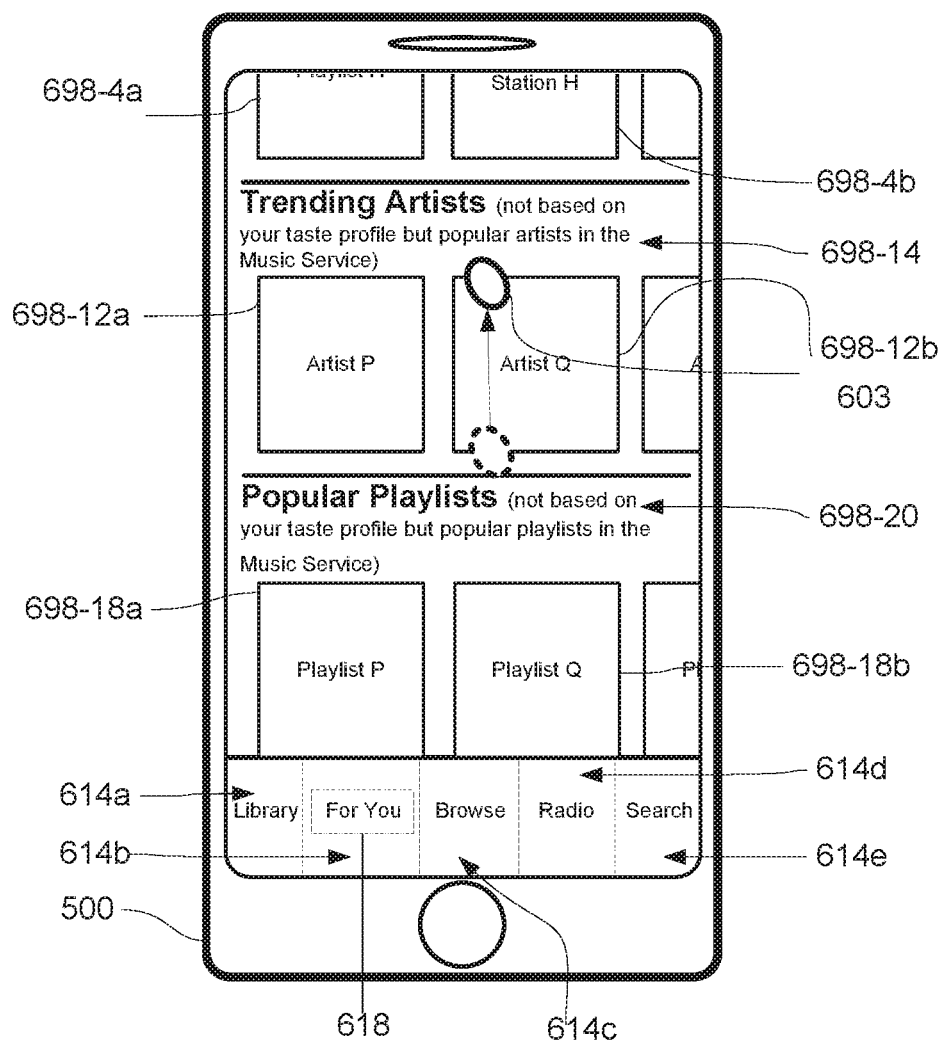
Figure 6S:
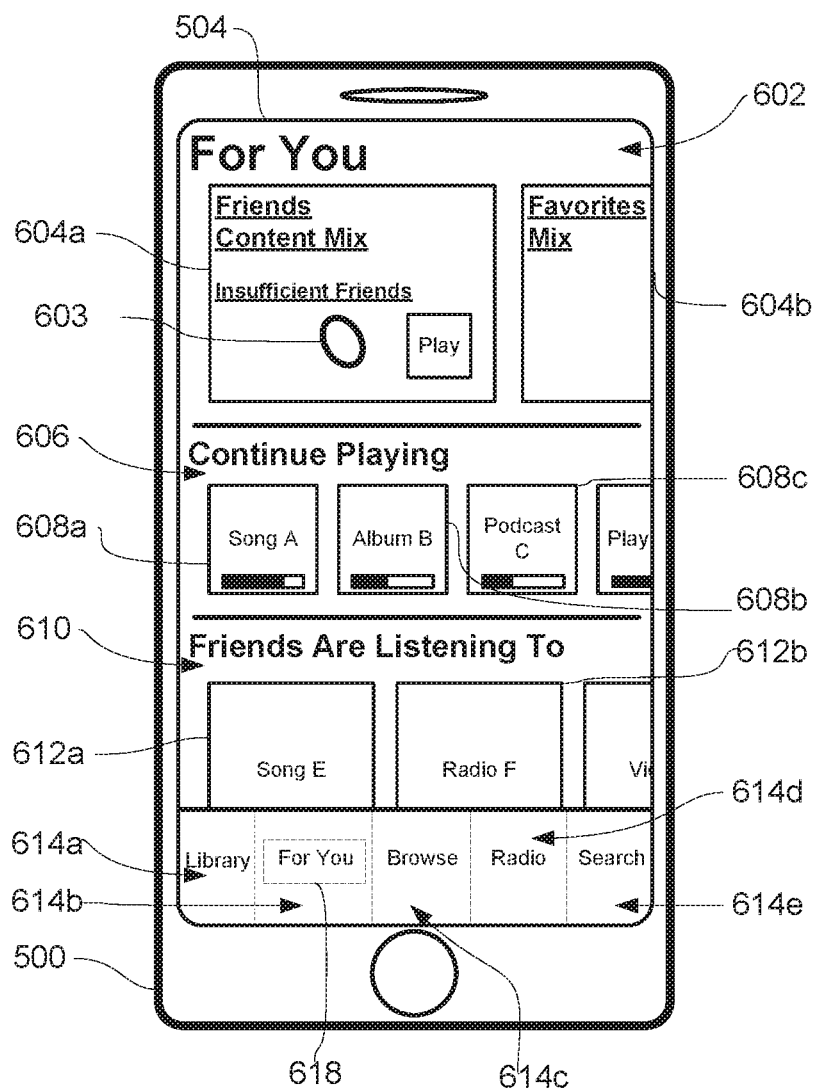
Figure 6T:
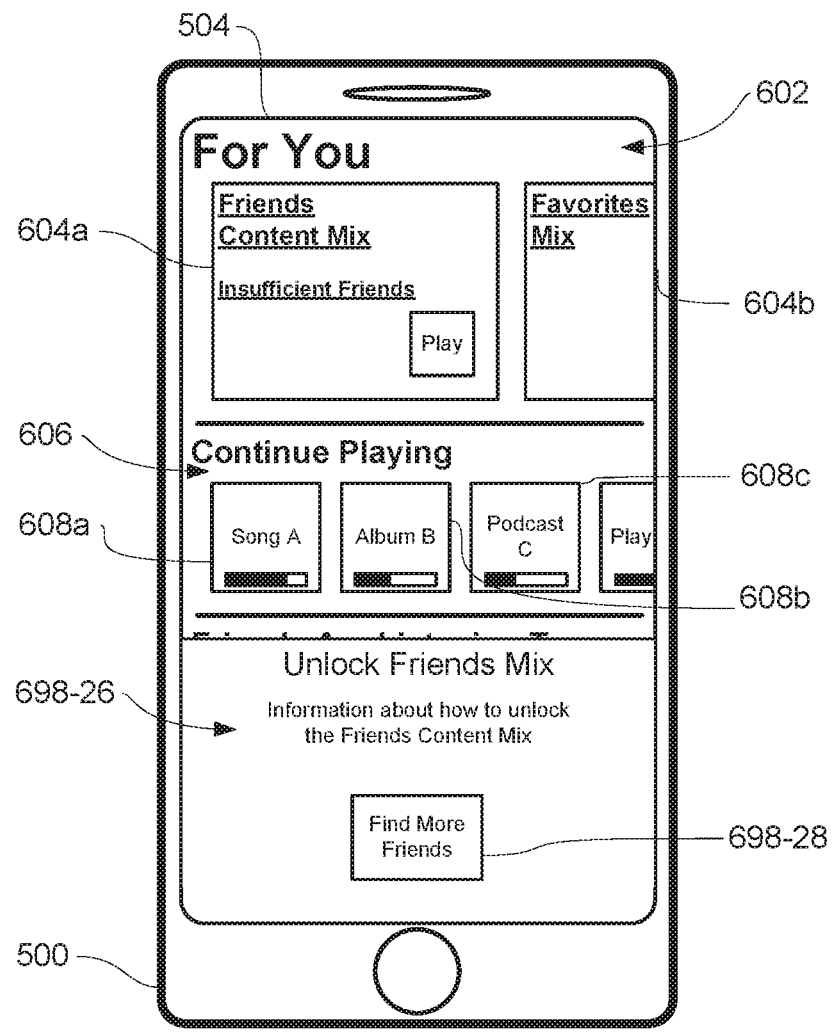
Figure 6U:
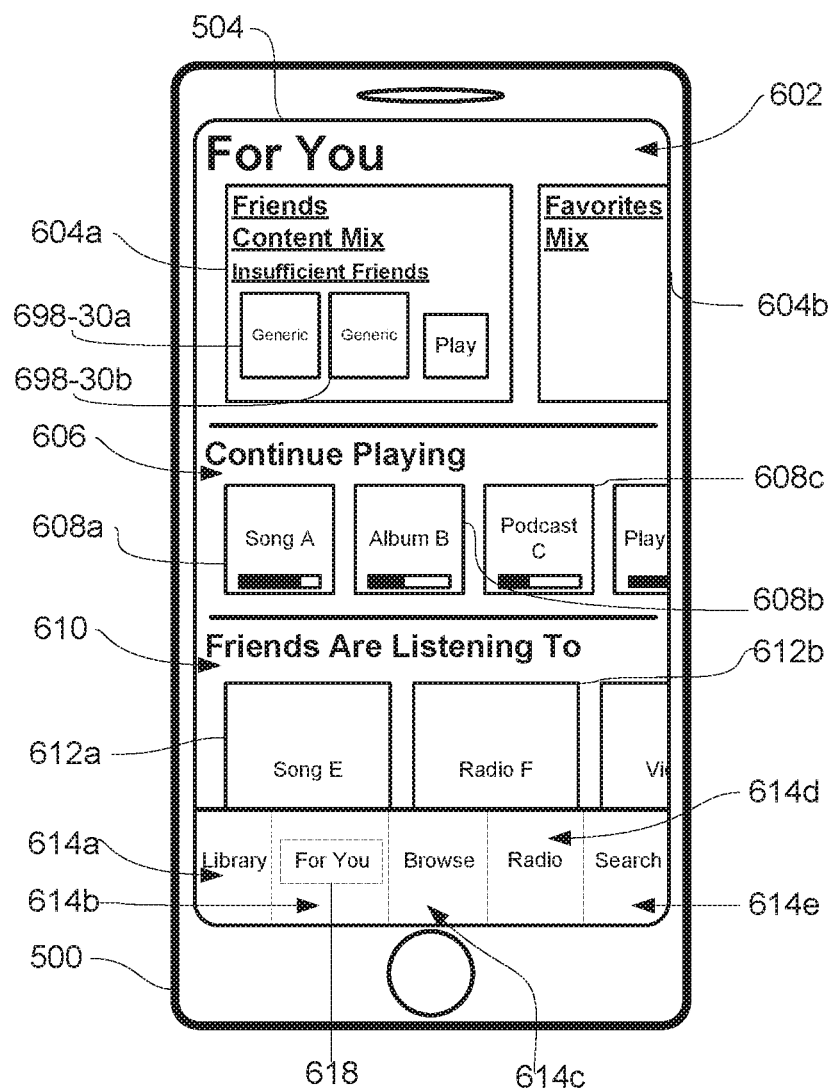
Figure 6V:
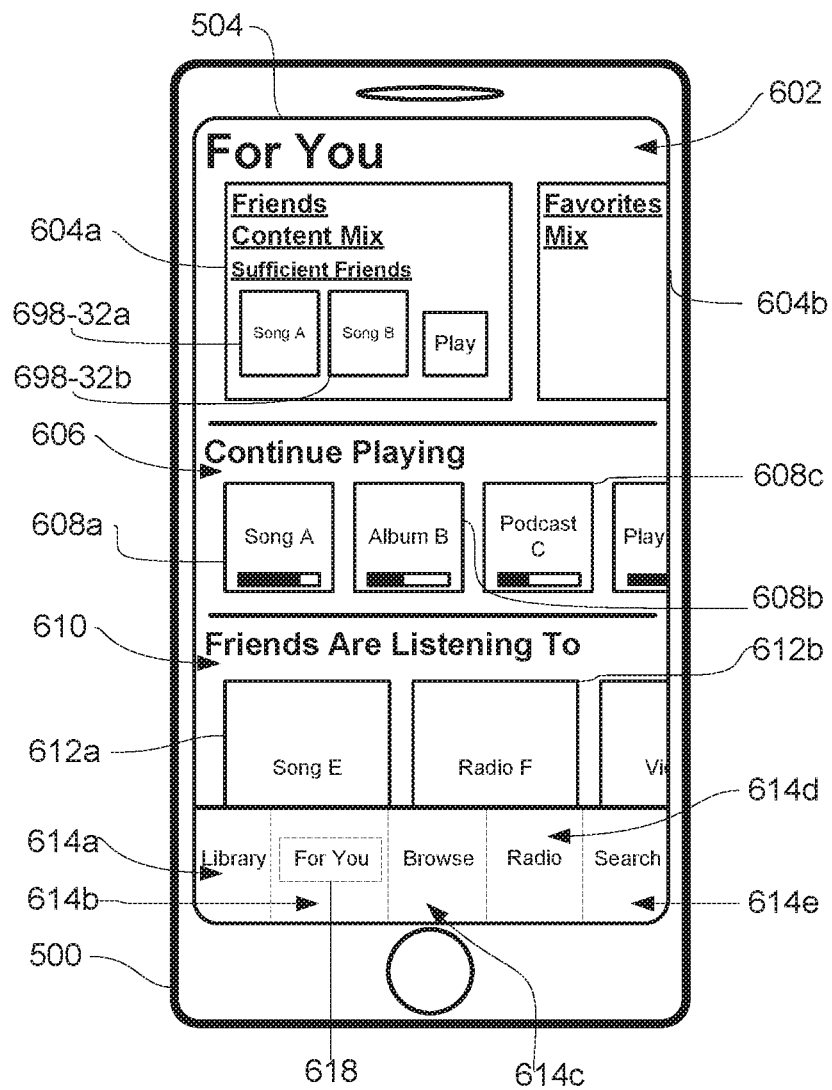
Figure 6W:
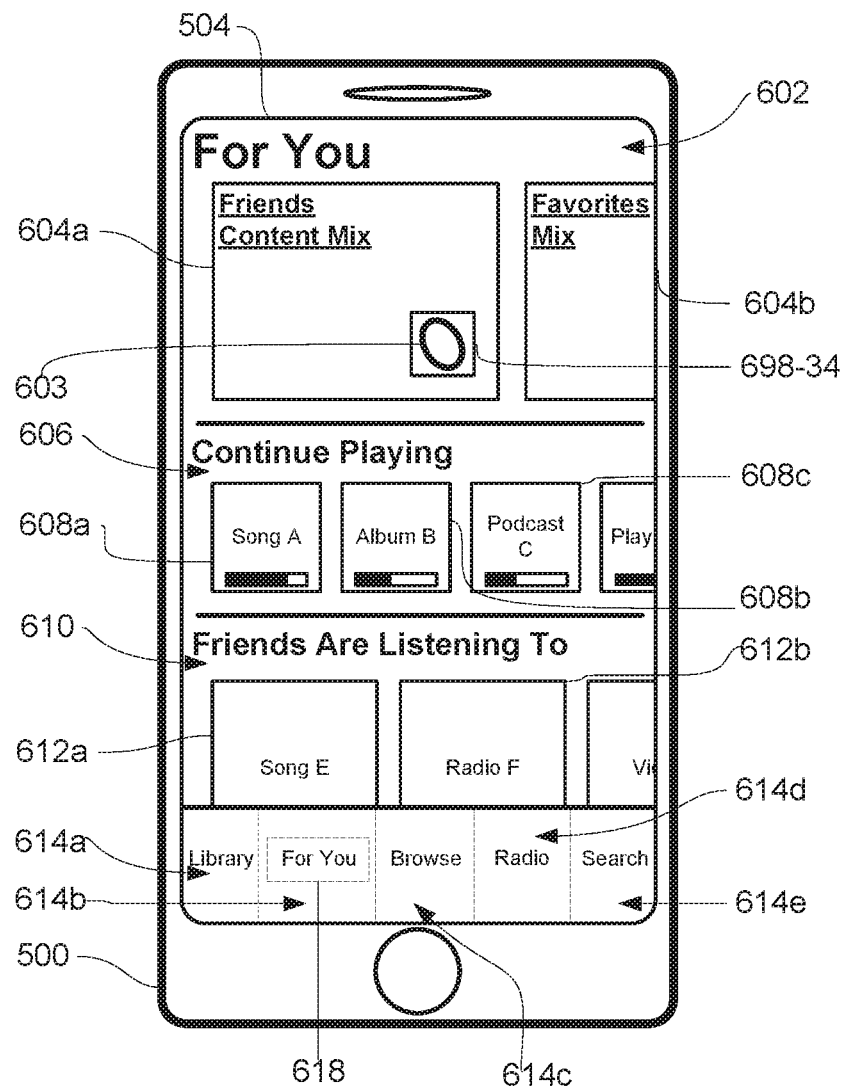
Figure 6X:
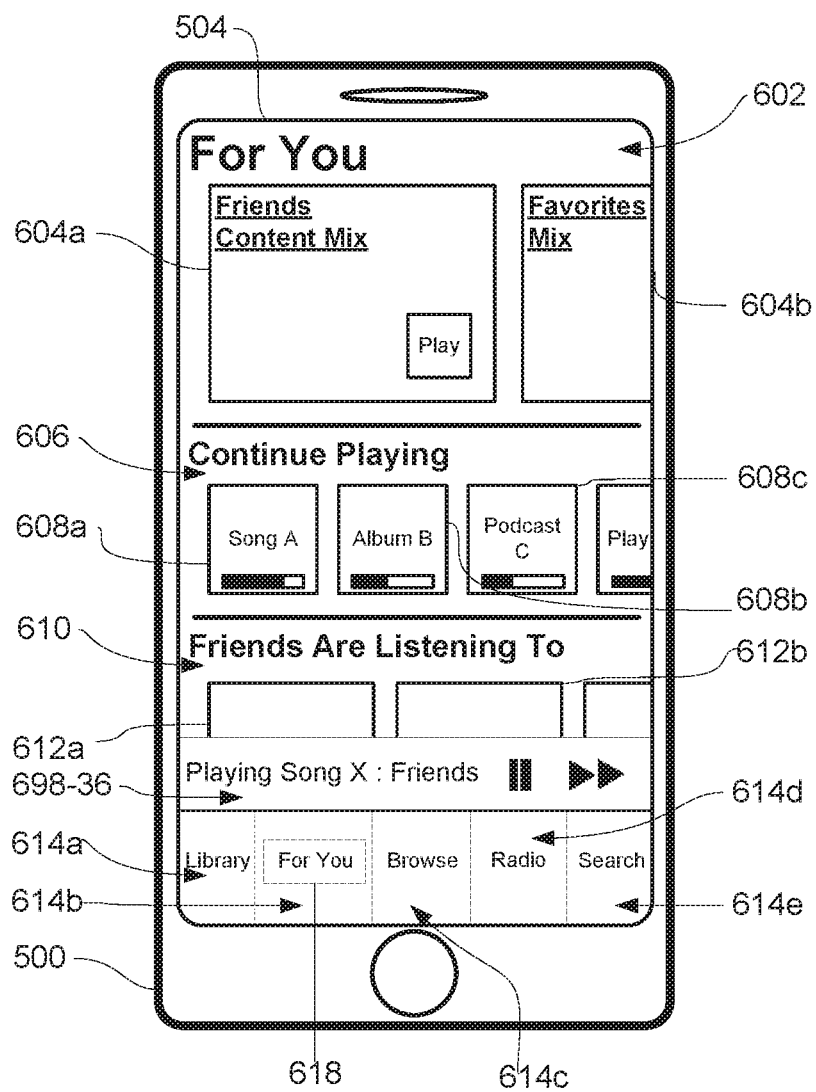
Figure 7A:
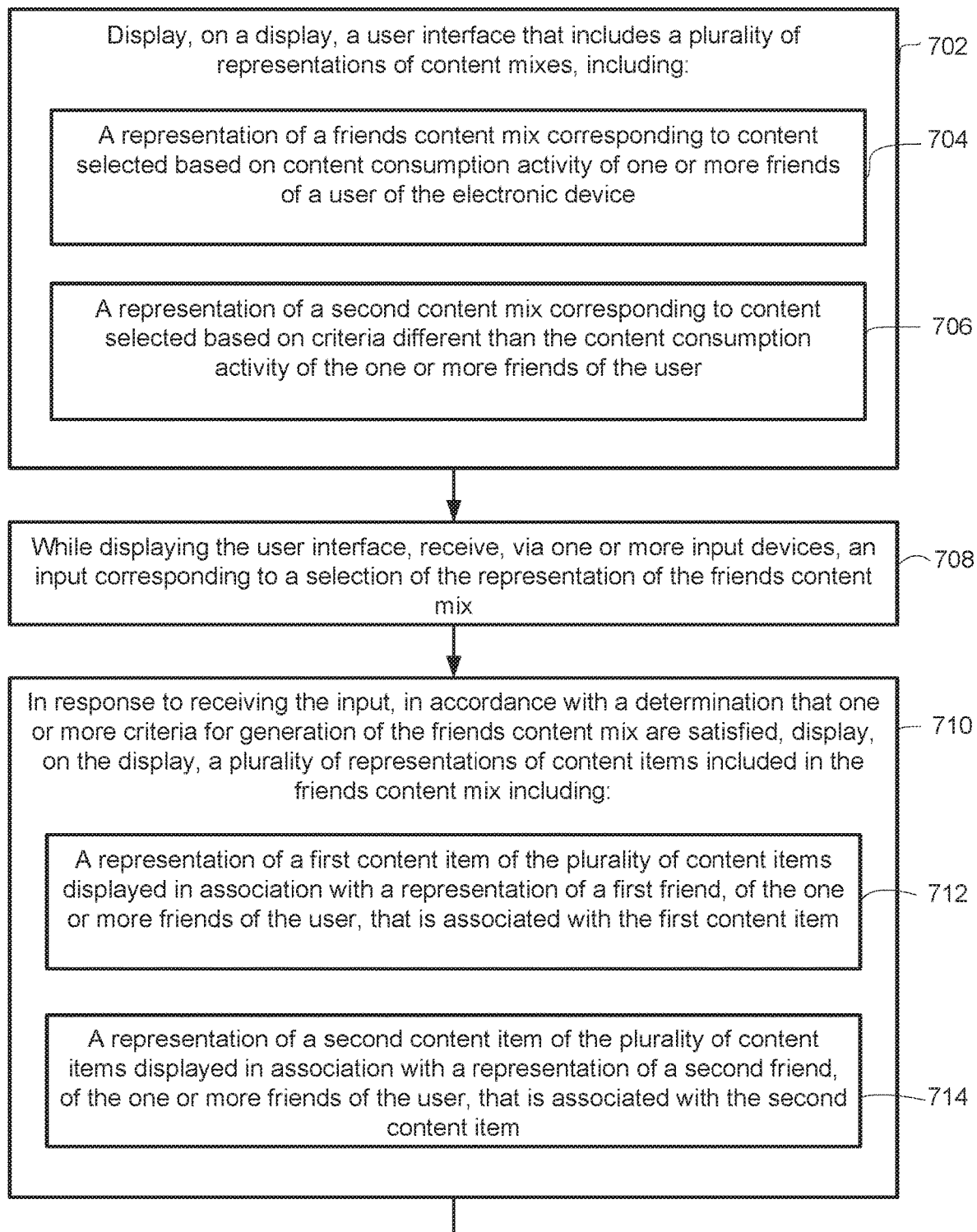
FIGS. 7A-7M are flow diagrams illustrating a method of presenting information about, and facilitating consumption of, content in a content delivery application, including
Figure 7B:
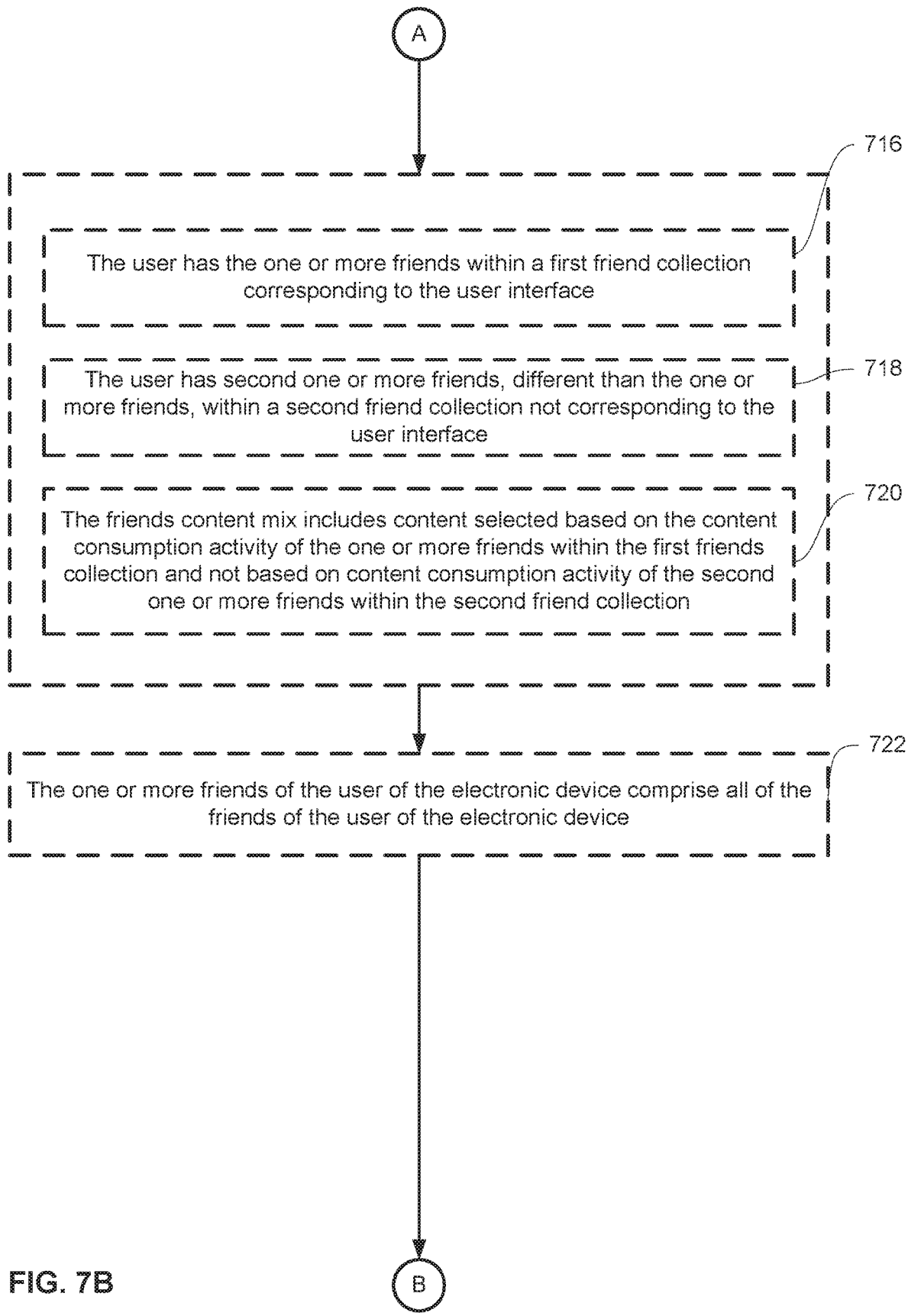
Figure 7C:
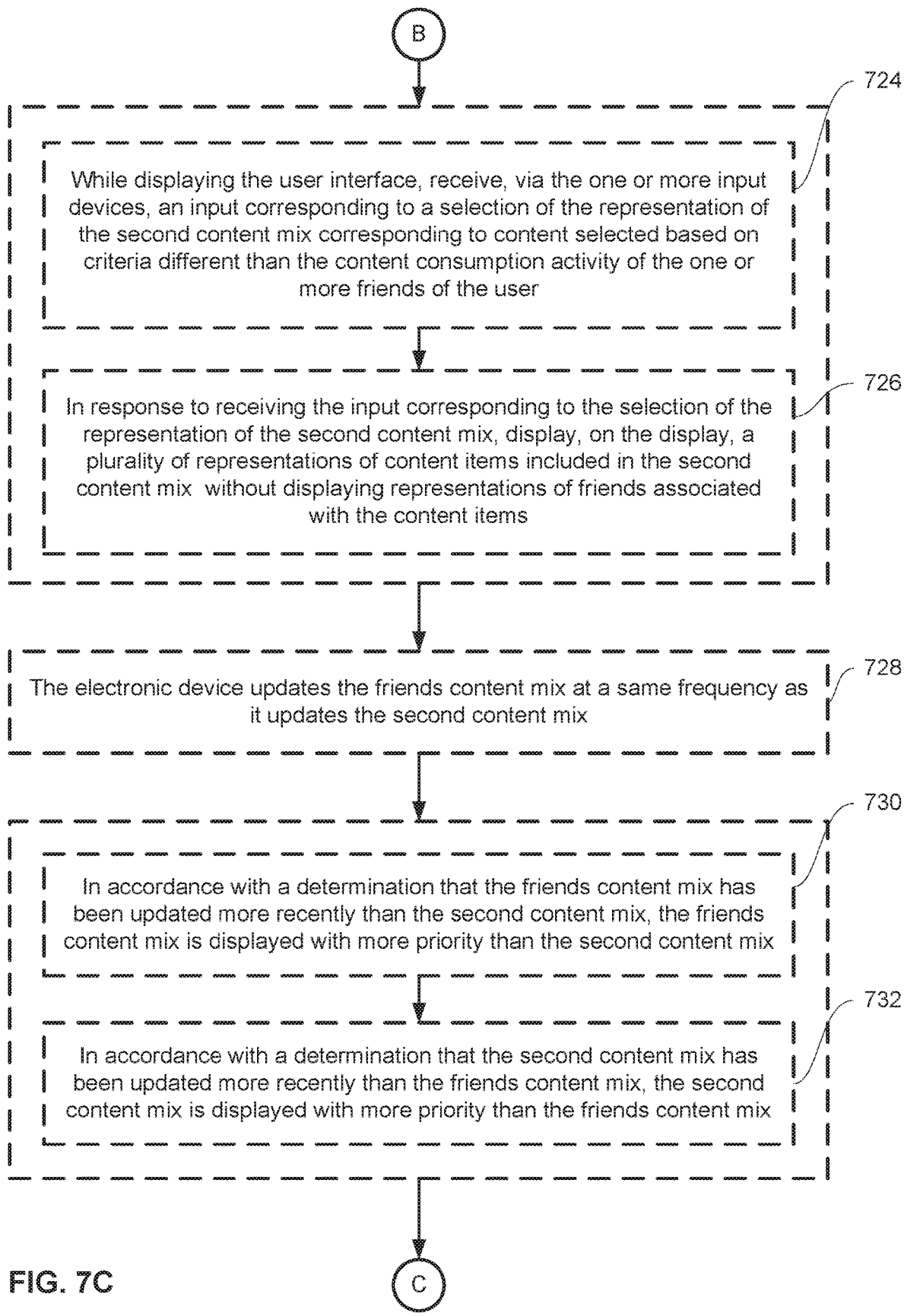
Figure 7D:
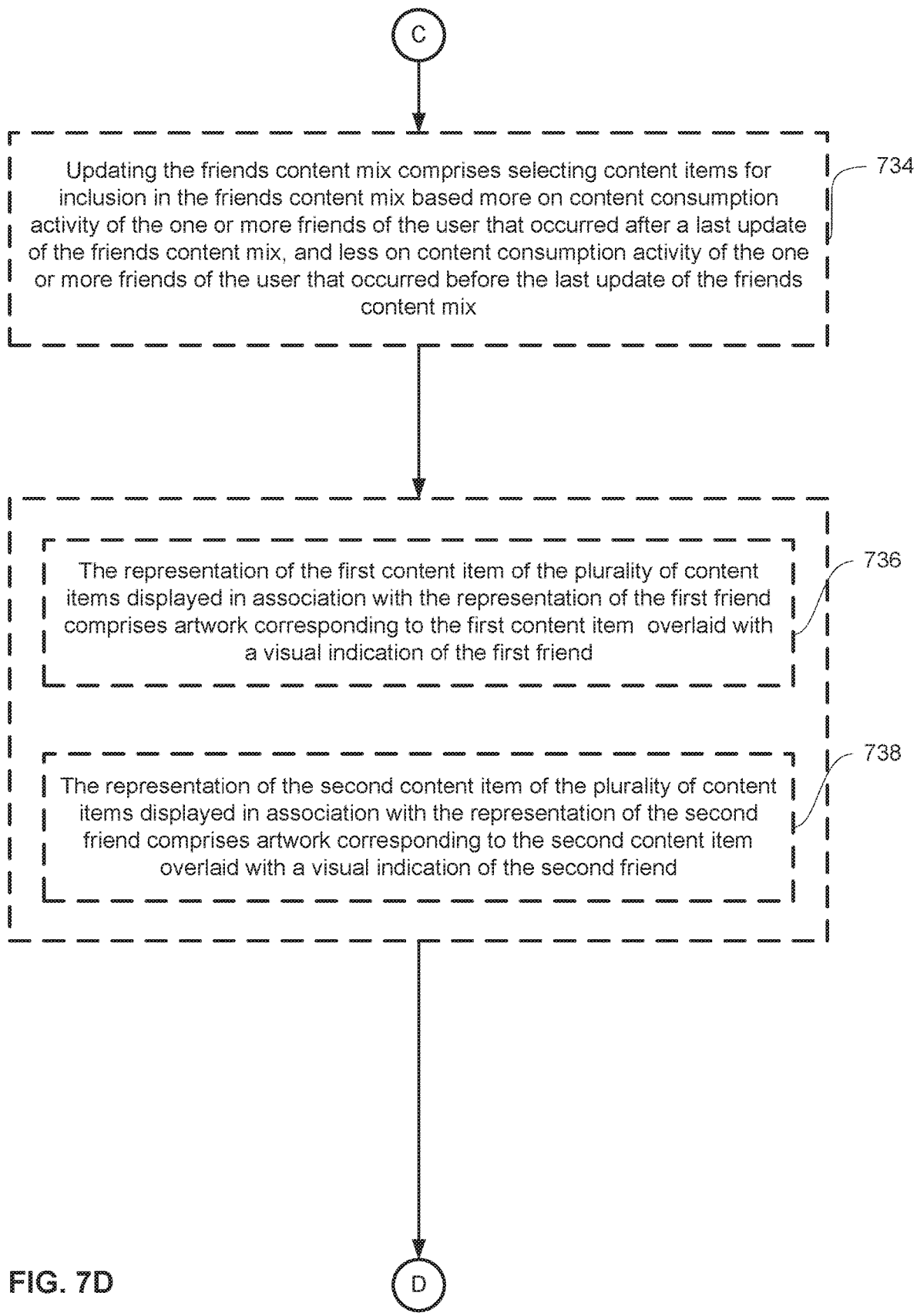
Figure 7E:
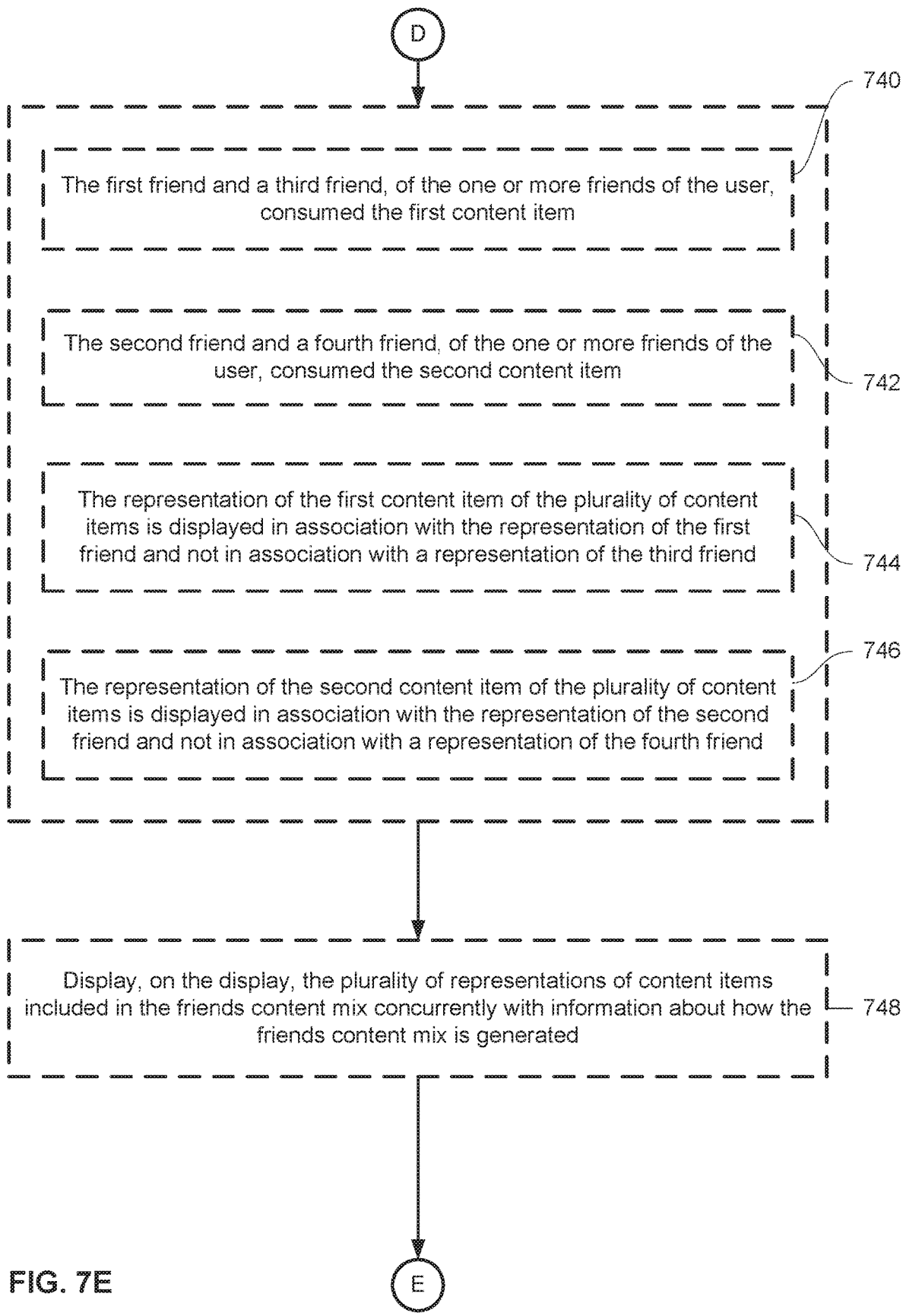
Figure 7F:
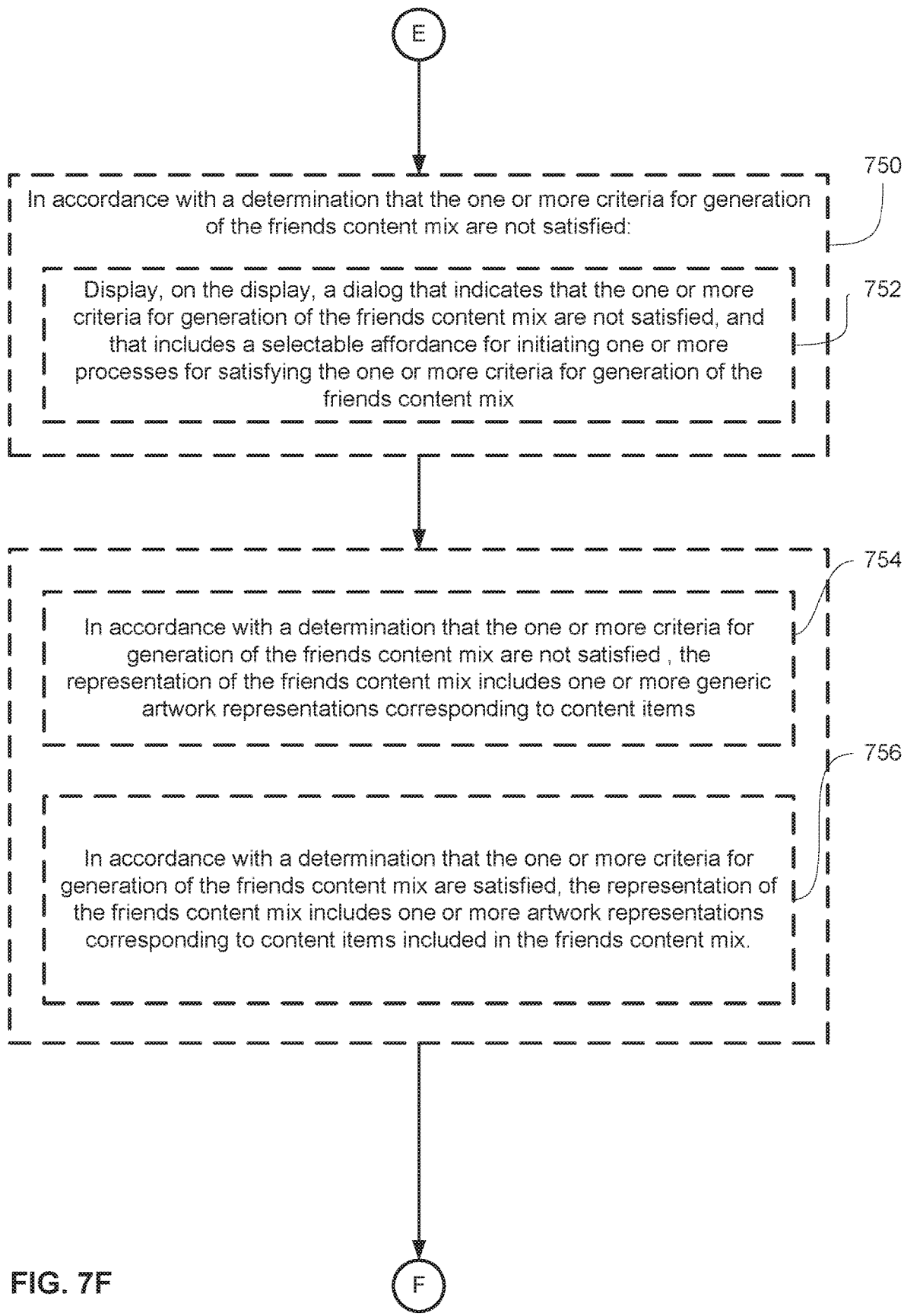
Figure 7G:
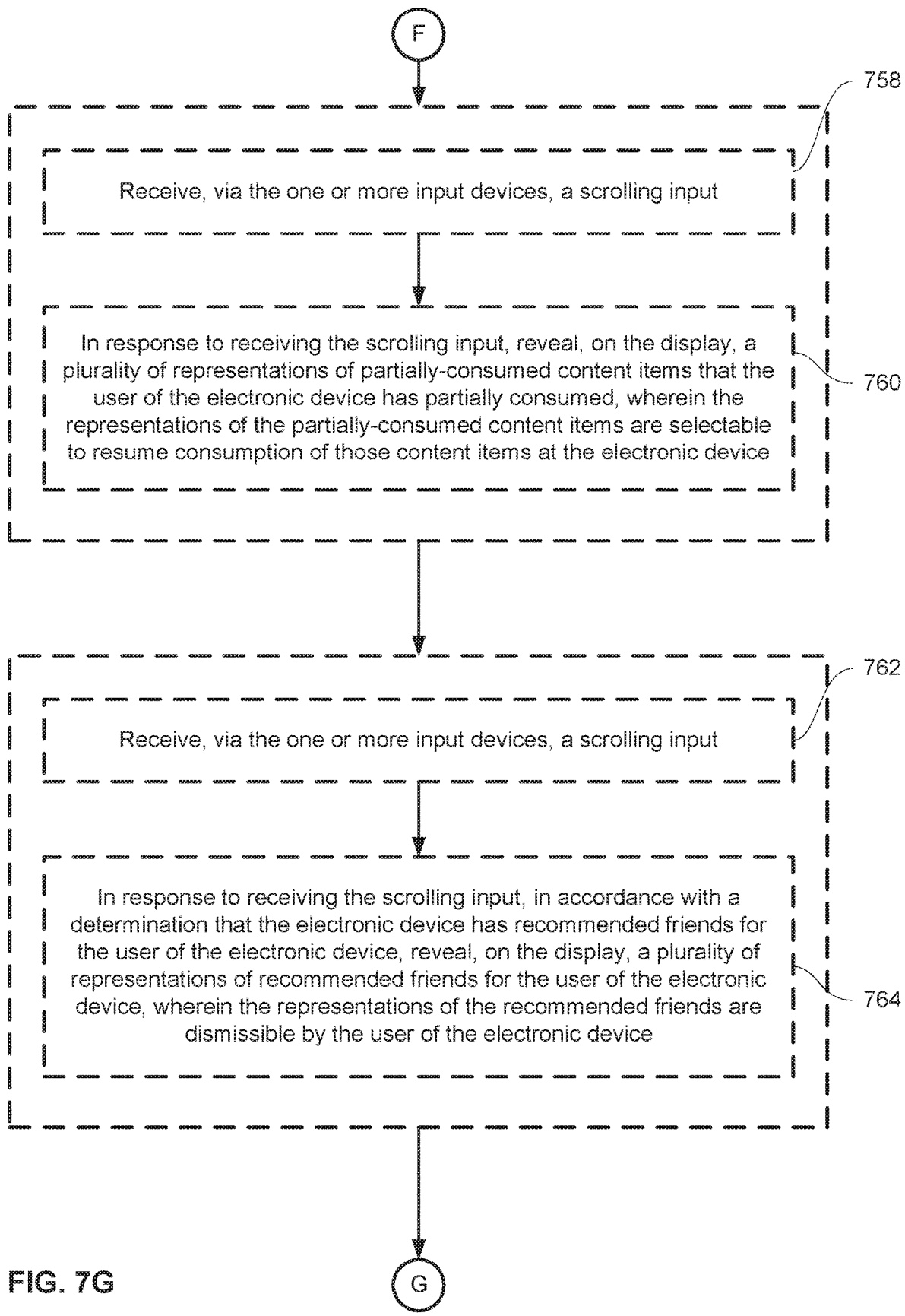
Figure 7H:
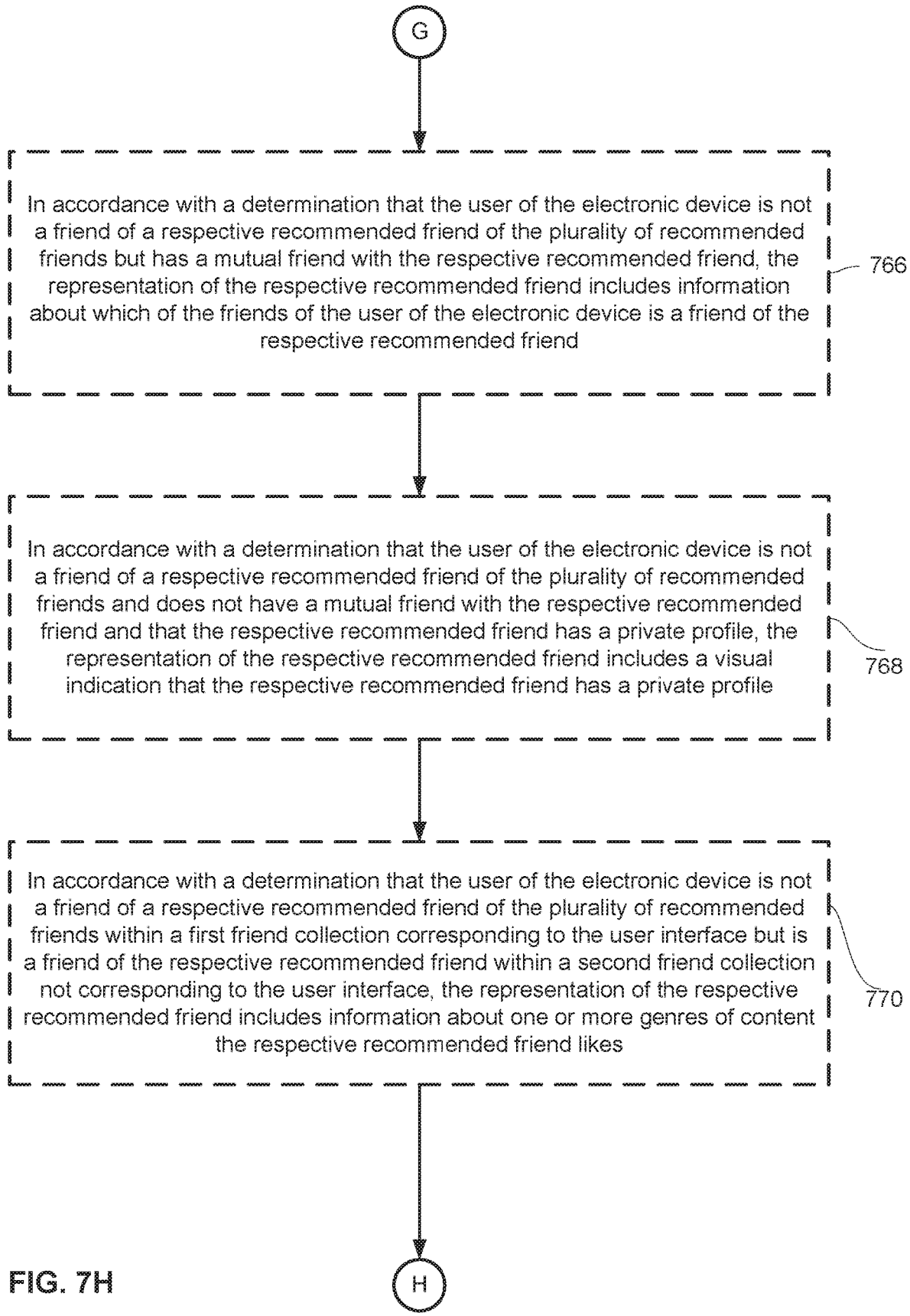
Figure 7I:
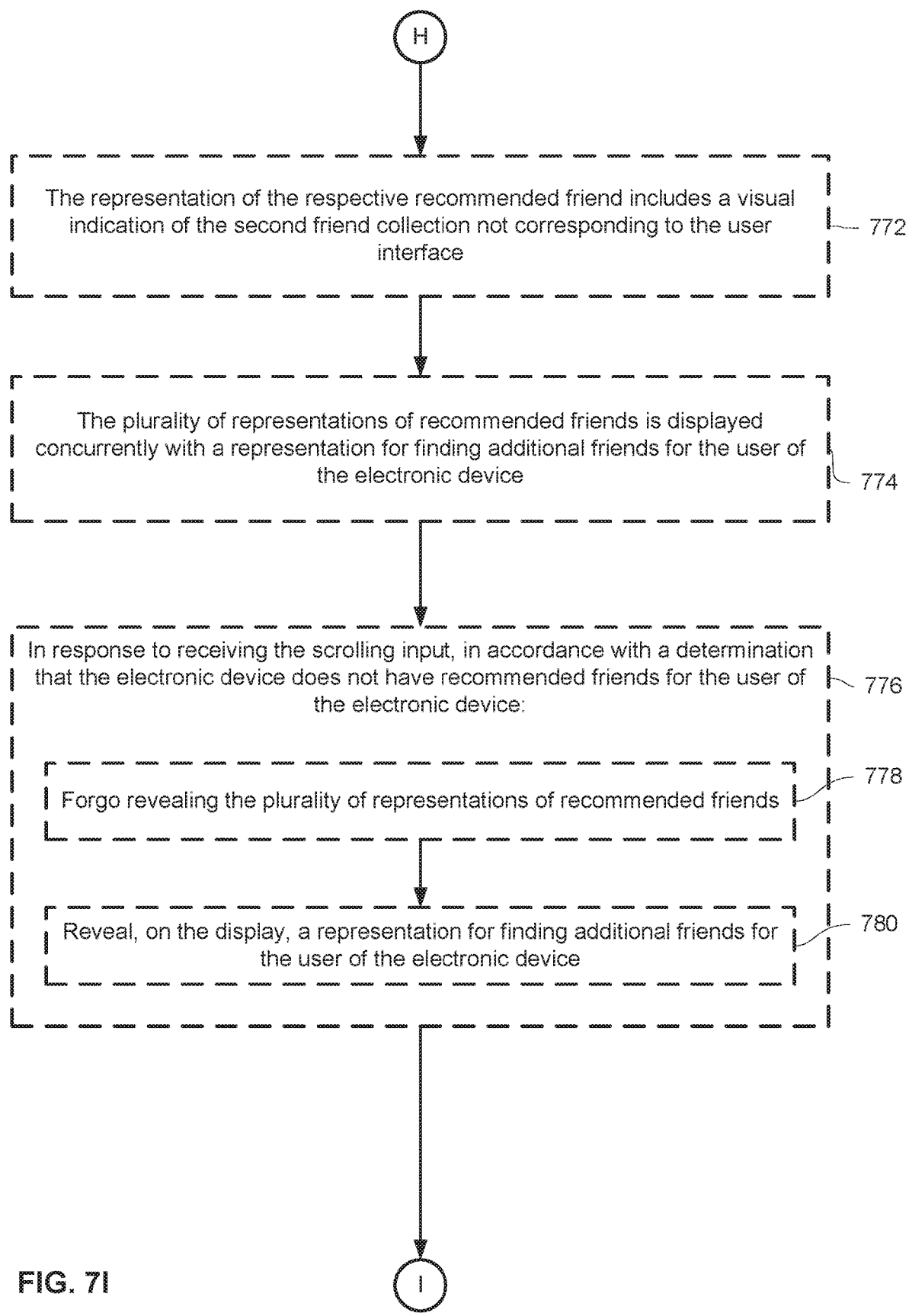
Figure 7J:
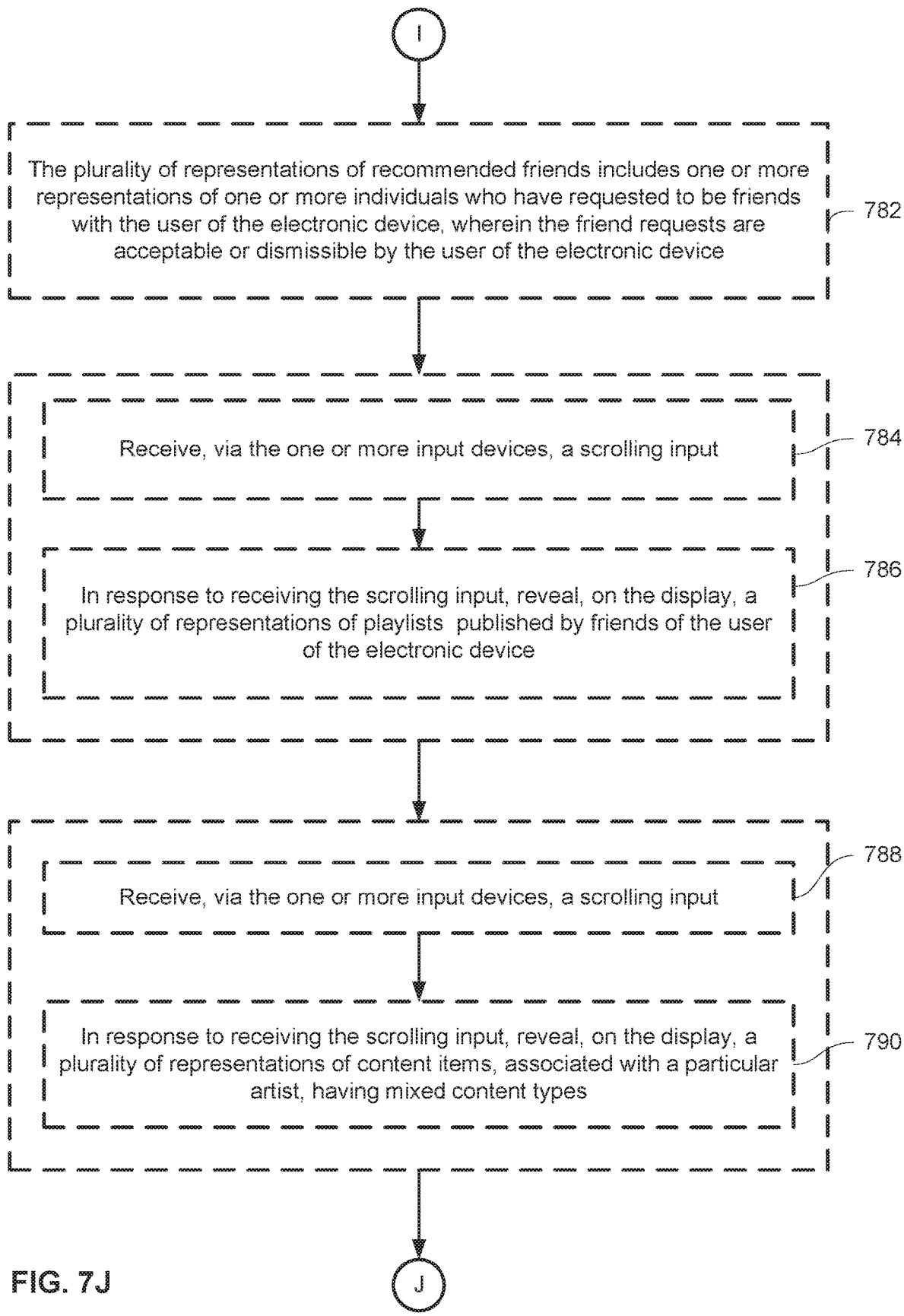
Figure 7K:
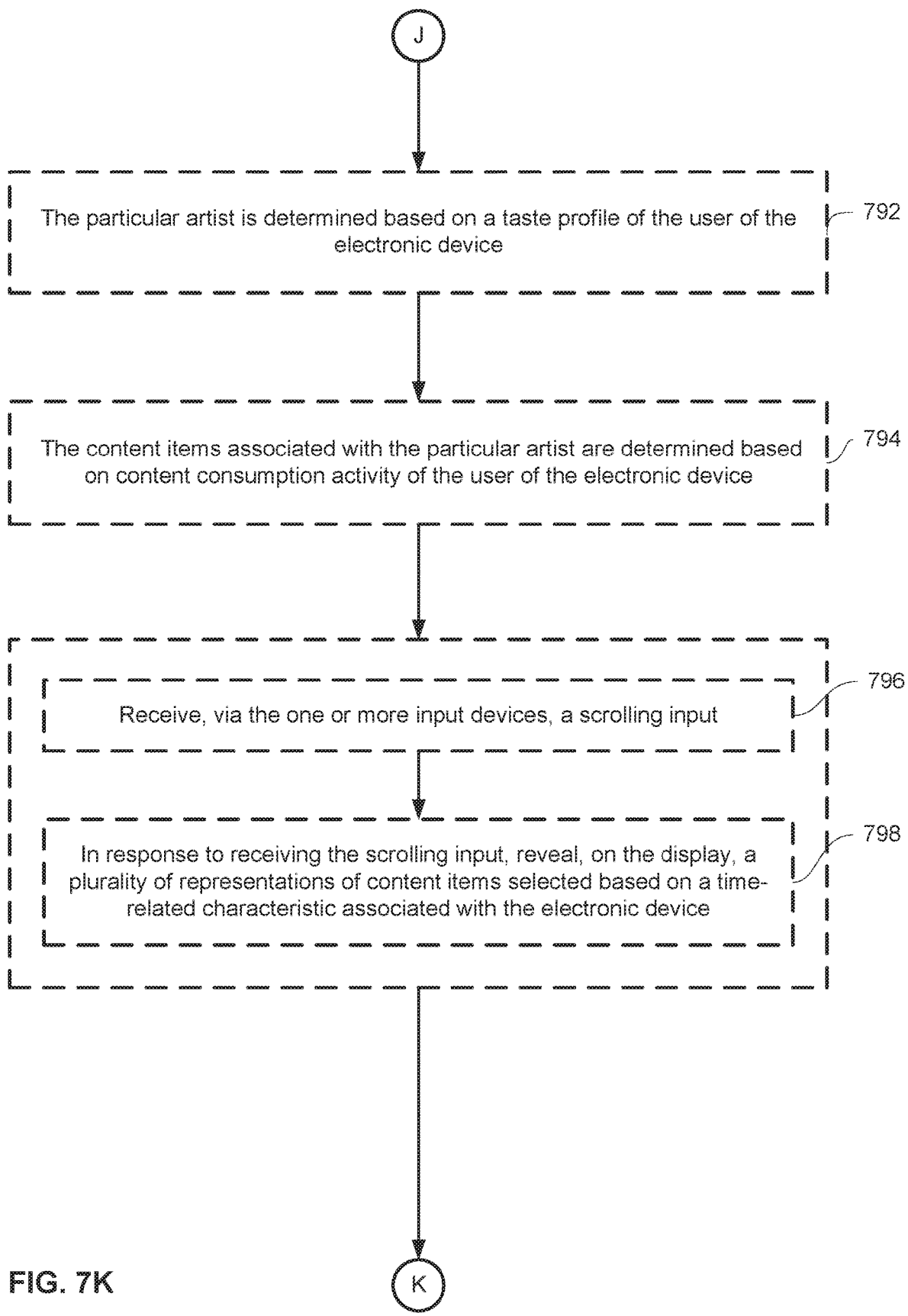
Figure 7L:
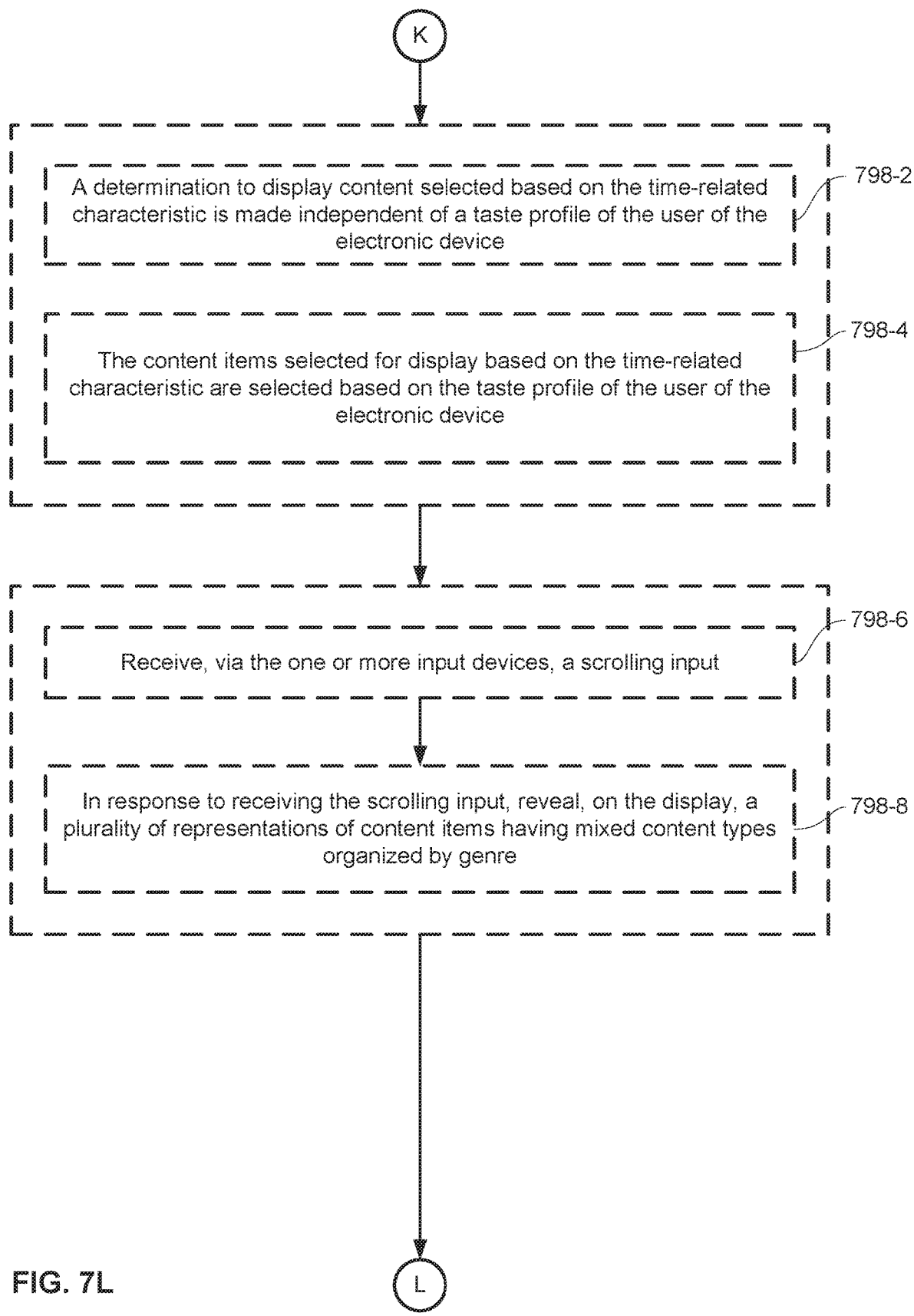
Figure 7M:
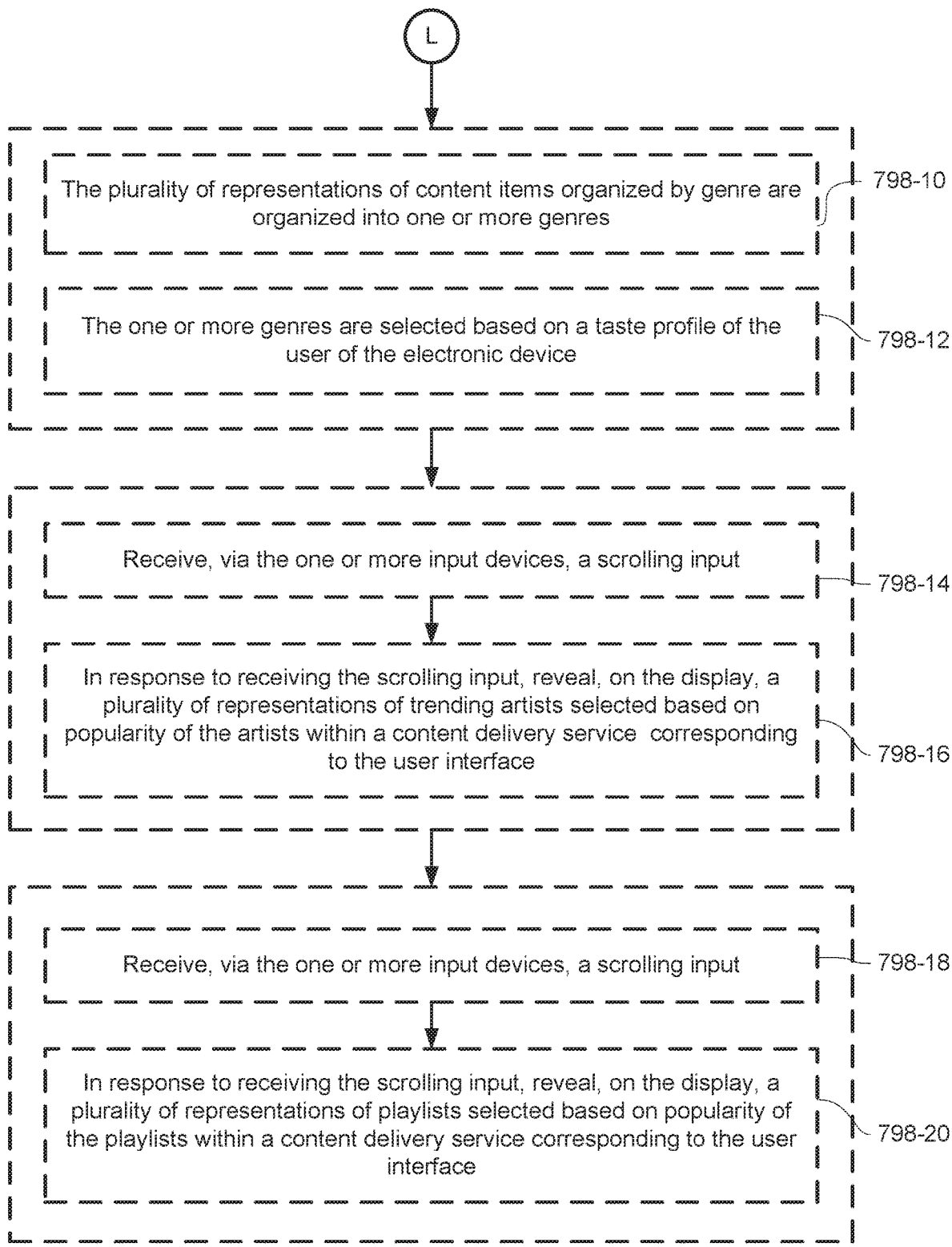

FIGS. 6A-6X illustrate exemplary ways in which an electronic device presents information about, and facilitates consumption of, content in a content delivery application, including utilizing content consumption activities of the user's friends to do so, in accordance with some embodiments of the disclosure. The embodiments in these figures are used to illustrate the processes described below, including the processes described with reference to FIGS. 7A-7M.

FIG. 6A illustrates exemplary device 500 with touch screen 504, such as described with reference to FIGS. 5A-5H. Touch screen 504 optionally displays one or more user interfaces that include various content. In the example illustrated in FIG. 6A, touch screen 504 displays a content (e.g., music, playlists, podcasts, videos, interviews, radio stations, etc.) delivery application that is running on device 500. In FIG. 6A, the content delivery application displays a content browsing user interface 602, which includes a navigation bar along the bottom of the user interface. The navigation bar facilitates navigation through the content delivery application, and includes a "Library" element 614a (selectable to browse content that the user of the electronic device has purchased, rented, or otherwise has access to and/or has flagged for inclusion in the user's content library), a "For You" element 614b (selectable to browse content recommended to the user by the content delivery application), a "Browse" element 614c (selectable to browse all content available in the content delivery application), a "Radio" element 614d (selectable to browse radio stations (e.g., internet radio stations, editorial radio stations, algorithmic radio stations, etc.) available in the content delivery application), and a "Search" element 614e (selectable to view a search interface for searching the content available in the content delivery application).

In FIG. 6A, the "For You" element 614a is currently selected (indicated by selection indicator 618), and as a result, user interface 602 displays various information relating to content that the content delivery application is recommending to the user of device 500. For example, user interface 602 includes content mix representations 604a and 604b (which are optionally horizontally scrollable to reveal another content mix in user interface 602). As shown in FIG. 6A, representation 604a corresponds to a friends content mix that includes content (e.g., songs, videos, etc.) selected based on the content consumption activity of the user's friends in the content delivery application; in contrast, representation 604b corresponds to a favorites content mix that includes content (e.g., songs, videos, etc.) selected based on the taste profile of the user of the electronic device (e.g., songs that the user of the electronic device has shown affinity towards, genres of music the user has shown affinity to, or more generally any information relating to the user's content consumption activity that indicates the user's taste in content). Additional or alternative content mixes are contemplated as described with reference to process 700, below. It is noted that one or more of the sections of user interface 602 (e.g., the content mix section described above and below, the Continue Playing Section 606 described below, the Friends are Listening To section 610 described below, etc.) are horizontally scrollable to reveal additional content device 500 has included in those sections, but that are initially not visible in user interface 602. This horizontal scrolling capability will not be repeated in the discussion of every section or brevity.

In some embodiments, the different content mixes shown in user interface 602 are updated at the same frequency but on different days of the week. For example, as shown in FIG. 6A, the friends content mix is updated every Tuesday, and the favorites content mix is updated every Monday (both are, thus, updated weekly). Further, the content mixes are optionally displayed in an order based on when they were last updated. For example, as shown in FIG. 6A, the friends content mix was most-recently updated (today), and thus representation 604a is shown first in user interface 602, and the favorites content mix was updated less-recently (yesterday), and thus representation 604b is shown second in user interface 602. Other representations of other content mixes are optionally also shown in the above-described order. Finally, in some embodiments, the representations of the content mixes include a selectable "play" affordance (as shown in FIG. 6A in representation 604a) that, when selected, causes device 500 to begin playing content from the corresponding content mix, as will be described in more detail later.

In FIG. 6A, representations 604a and 604b are selectable to display the content included in their respective content mixes. For example, in FIG. 6B, a tap of contact 603 on representation 604a (corresponding to the friends content mix) is detected by device 500. In response, device 500 updates user interface 602 to display the features of FIG. 6C. In particular, device 500 displays user interface 602 that includes the title 632 of the friends content mix, artwork 620 corresponding to the friends content mix, description 624 that includes information about how the friends content mix is generated, and play and shuffle affordances that are selectable to begin playing the content mix from the beginning in the displayed order of the content items in the friends content mix (in the case of the play affordance) and begin playing the content mix in a shuffled order (in the case of the shuffle affordance), respectively.

In some embodiments, the friends content mix is a mix of content determined based on the content consumption activities of the user's friends (in some embodiments, all of the user's friends, and not merely a subset of the user's friends) within the content delivery application, and not other applications or social networks in which the user of the electronic device may have friends, as described in more detail with reference to process 700. This characteristic of the friends content mix is expressed in description 624 in FIG. 6C, which may or may not actually be displayed in user interface 602. Further, in some embodiments, the content consumption activity of the user's friends that is relevant to the generation of the friends content mix is such content consumption activity over the last time period of update (e.g., over the last week, if the mix is updated weekly)—the content consumption activity of the user's friends that is older than that is optionally less relevant (or completely irrelevant) to the generation of the friends content mix. This characteristic of the friends content mix is also expressed in description 624 in FIG. 6C, which also may or may not actually be displayed in user interface 602.

User interface 602 of FIG. 6C also includes representations of different content items included in the friends content mix, each of which is displayed in association with an indication of the friend of the user that is associated with that content item. For example, user interface 602 includes representations of songs A and B. The representation of song A includes artwork 626a for song A, the title of song A, the artist for song A, and selectable affordance 630a to add song A to the user's content library. Similarly, the representation of song B includes artwork 626b for song B, the title of song B, the artist for song B, and selectable affordance 630b to add song B to the user's content library. In addition to the above, the representations of songs A and B also include an indication or a representation of a friend of the user who is associated with each of songs A and song B. For example, the representation of song A includes a picture of friend A overlaying the bottom-right portion of artwork 626a for song A (e.g., because friend A has listened to song A this past week, which is optionally the reason song A is included in the friends content mix, as indicated by indictor 628a that may or may not be included in user interface 602), and the representation of song B includes the initials of friend B 624b (e.g., because the device 500 does not have access to a picture of friend B) overlaying the bottom-right portion of artwork 624b (e.g., because friend B has listened to song B this past week, which is optionally the reason song B is included in the friends content mix, as indicated by indictor 628b that may or may not be included in user interface 602). As such, user interface 602 conveys which of the user's friends' content consumption activity has resulted in the inclusion of a particular content item in the friends content mix.

In some circumstances, a given content item is consumed by more than one of the user's friends. For example, in FIG. 6C, friends A and B may have both listened to song A during the relevant time period, while only friend B may have listened to song B during the relevant time period. In such circumstances, device 500 optionally still only includes a single indication of a friend associated with a content item in user interface 602, as shown in FIG. 6C where the representation of song A includes picture 624a for friend A, but does not include an indication or representation for friend B. Any number of algorithms for determining which friend to include in a representation of a content item may be used. For example, device 500 optionally displays the representation of a friend who consumed that given content item the most during the relevant time period (e.g., includes picture 624a of friend A in the representation of song A, because friend A listened to song A more than did friend B during the relevant time period). As another example, device 500 optionally displays the representation of a friend in such a way as to increase the diversity of friends represented in the friends content mix (e.g., includes picture 624a of friend A in the representation of song A, because friend B is already represented in the friends content mix in association with song B, and friend A is not). Additional or alternative manners of selecting a single friend for which to display an indication or representation in association with a content item in the friends content mix are also contemplated.

As previously discussed, representations 604a and 604b for various content mixes are optionally selectable to display the content items in those content mixes. In FIG. 6D, a tap of contact 603 on representation 604b corresponding to the favorites mix is detected by device 500. In response, device 500 displays various information and user interface elements in FIG. 6E, analogous to those displayed for the friends mix in FIG. 6C. However, one difference is that the representations of song B and song C in FIG. 6E do not include any representations of any friends of the user of the electronic device that may or may not be associated with songs B and C, as corresponding songs did in FIG. 6C in the friends content mix. As such, content items in the friends content mix are optionally displayed differently than content items in other content mixes, such as the favorites content mix of FIG. 6E.

User interface 602 corresponding to the "For You" element in the navigation bar optionally includes content in addition to representations 604a and 604b that correspond to the friends and favorites content mixes, respectively. Referring again to FIG. 6A, user interface 602 additionally includes Continue Playing section 606, which includes representations 608 (e.g., 608a, 608b, 608c, etc.) of various content items that the user of the electronic device has partially consumed (e.g., partially watched, partially listened to, etc.). The content items corresponding to representations 608 displayed in Continue Playing section 606 are optionally of mixed content types, such as songs, albums, podcasts, playlists, etc. as shown in FIG. 6A. Further, representations 608 in FIG. 6A include progress indicators that indicate the user's progress through the corresponding content items. For example, representation 608a includes a progress indicator (progress bar at the bottom of representation 608a) that indicates that the user of the electronic device has listened to approximately 80% of song A, representation 608b includes a progress indicator (progress bar at the bottom of representation 608b) that indicates that the user of the electronic device has listened to approximately 40% of album B, etc. Additionally, in some embodiments, representations 608 are selectable to resume playback of the corresponding content item on device 500. For example, if the user selects representation 608a, device 500 optionally resumes playback of song A from where the user last left-off; if the user selects representation 608b, device 500 optionally resumes playback of album B from where the user last left-off; etc. Continue Playing section 606 is below representations 604a and 604b in user interface 602, as shown in FIG. 6A. In some embodiments, Continue Playing section 606 and/or representations 608 are not initially visible in the user interface 602, and user input scrolling through user interface 602 (e.g., vertical scrolling) causes Continue Playing section 606 and/or representations 608 to become revealed in user interface 602.

The user of device 500 is optionally able to scroll through user interface 602 (e.g., vertically scroll through user interface 602) to display additional content in user interface 602. For example, in FIGS. 6F-6G, device 500 detects an initial touchdown of contact 603 and an upward swipe of contact 603, which causes device 500 to scroll down through user interface 602 to reveal additional portions of user interface 602, as shown in FIG. 6G. For example, the vertical scrolling fully reveals in user interface 602 Friends are Listening To section 610, which includes representations 612 (e.g., 612a, 612b, etc.) of various content items that friends of the user of the electronic device are consuming (e.g., listening to, watching, etc.). The content items corresponding to representations 612 displayed in Friends are Listening To section 610 are optionally of mixed content types, such as songs, radio stations, albums, podcasts, playlists, etc. as shown in FIG. 6G. Further, representations 612 in FIG. 6G include visual indications of the user's friends that indicate which of the user's friends are consuming the corresponding content item. For example, representation 612a includes an overlay of a picture of friend A, because friend A has been listening to song E, and representation 612b includes an overlay of the initials of friend B (because device 500 optionally does not have access to a picture of friend B), because friends B has been listening to radio station F. Additionally, in some embodiments, representations 612 are selectable to playback the corresponding content item on device 500. For example, if the user selects representation 612a, device 500 optionally begins playback of song E; if the user selects representation 612b, device 500 optionally begins playback of radio station F; etc. Friends are Listening To section 610 is below Continue Playing section 606 in user interface 602, as shown in FIG. 6G. In some embodiments, Friends are Listening To section 610 and/or representations 612 are not initially visible in the user interface 602, and user input scrolling through user interface 602 (e.g., vertical scrolling) causes Friends are Listening To section 610 and/or representations 612 to become revealed in user interface 602.

Also shown in FIG. 6G is Recommended Friends section 650, which includes representations 654 (e.g., 654a, 654b, etc.) of individuals that device 500 is recommending as friends to the user of the electronic device. As described in more detail with reference to process 700, below, the recommended friends are optionally recommended friends for the content delivery application, and not recommended friends for outside of the content delivery application (e.g., other social networks, the contacts list on device 500, etc.). Representations 654 in FIG. 6G include a picture of the recommended friend if device 500 has access to the picture of the recommended friend (e.g., picture 652a of recommended friend Y), and include the initials of the recommended friend if device 500 does not have access to the picture of the recommended friend (e.g., initials 652b of recommended friend Z). Further, representations 654 include respective selectable affordances for following/befriending the recommended friend (e.g., affordance 658), and also include selectable affordances for dismissing the recommended friend if the user of the electronic device does not want to become friends with that individual (e.g., the "x" elements in the upper-right of representations 654).

Representations 654 also include various information 656 relating to the recommended friends to which the representations correspond. For example, information 656 optionally includes the name of the recommended friend (e.g., "Person Y" in representation 654a, and "Person Z" in representation 654b). In some embodiments, information 656 includes different content depending on one or more characteristics of the recommended friend and/or one or more characteristics of how the user of the electronic is (or is not) connected with the recommended friend. For example, if the user of the electronic device is a second degree contact with the recommended friend within the content delivery application and has a mutual friend with the recommended friend (e.g., the user is friends with another user within the content delivery application who is friends with the recommended friend, but the user is not directly a friend of the recommended friend in either the content delivery application or another friend collection, such as a social network), representations 654 include information about which of the user's friends is friends with (or is following) the recommended friend, whether the recommended friend has a public profile (e.g., a designation within the content delivery application that the relevant individual does want their profile, such as content taste information, to be accessible by non-friends in the content delivery application) or a private profile in the content delivery application (e.g., a designation within the content delivery application that the relevant individual does not want their profile, such as content taste information, to be accessible by non-friends in the content delivery application), as reflected in FIG. 6G with reference to individuals Y and Z. Specifically, representation 654a includes "Followed by Friend A" to indicate that recommended friend Y is friends with friend A, who is a friend of the user of the electronic device. Similarly, representation 654b includes "Followed by Friend B" to indicate that recommended friend Z is friends with friend B, who is a friend of the user of the electronic device. It should be noted that the "($2^{nd}$ deg. Mutual)" designations in representations 654 are included for ease of description, and may or may not be displayed in user interface 602.

FIG. 6H illustrates alternative scenarios in which the user of device 500 does not have a mutual friend, in the content delivery application, with the individuals recommended by device 500. In such circumstances, what is included in information 656 (e.g., 656c, 656d, etc.) in representations 654 (e.g., 654c, 654d) depends on whether the recommended friend has a public or a private profile in the content delivery application. For example, in FIG. 6H, the user of device 500 does not have a mutual friend, in the content delivery application, with person F, and person F has a private profile in the content delivery application. As such, representation 654d includes a "Private" designation that is displayed in user interface 602 (as opposed to "Followed by X", as in FIG. 6G). As another example, the user of device 500 does not have a mutual friend, in the content delivery application, with person E, but person E has a public profile in the content delivery application. As such, representation 654c does not include the "Private" designation. It should be noted that the "($2^{nd}$ deg. Non-Mutual)" and similar designations in representations 654 are included for ease of description, and may or may not be displayed in user interface 602.

FIG. 6I illustrates an alternative scenario in which the user of device 500 is not a friend of the recommended friend in the content delivery application, but is a friend of the recommended friend in another friend collection (e.g., in a social network, the contacts list on device 500, or any other friend collection other than the friend collection associated with the content delivery application). For example, in FIG. 6I, the user of device 500 is friends with person G in social network N, but not in the content delivery application. As such, within representation 654e in user interface 602, the picture of person G 652e (or the initials of person G if device 500 does not have access to the picture of person G) is overlaid with a visual indication 666 of social network N (the friend collection within which the user of device 500 is friends with person G). In some embodiments, indication 666 is an icon corresponding to social network N, an image corresponding to social network N, or any other visual indication and/or identifying information corresponding to social network N. Additionally, information 656e includes information about what genre(s) of music person G likes, as indicated by "Likes Rap & Jazz" in FIG. 6I.

Recommended Friends section 650 also optionally includes information about people who have requested to become friends with the user of device 500 (if any). For example, in FIG. 6I, Recommended Friends section 650 includes representation 654f corresponding to person H that includes picture 652f of person H, information 656f, which indicates the name of person H and that person H wants to become friends with the user of device 500, and a selectable approval affordance 674, which when selected accepts the friend request from person H. It should be noted that the "($1^{st}$ deg.)" and "($2^{nd}$ deg.)" designations in representations 654 are included for ease of description, and may or may not be displayed in user interface 602.

In some embodiments, at the end of the representations of recommended friends and/or friend requests, device 500 displays one or more elements for finding more friends within the content delivery application. For example, in FIG. 6J, device 500 detects contact 603 and movement of contact 603 from right to left on touch screen 504 (e.g., a left-swipe) within Recommended Friends section 650. As a result, device 500 scrolls representations 654 to the left and reveals element 670a in user interface 602. Element 670a in FIG. 6J is an element for finding more friends in the content delivery application, and includes information 678a that indicates as much. Element 670a also includes selectable affordance 680a, which when selected initiates a process for finding or suggesting more friends to the user of device 500 (e.g., by searching the contact list of device 500, and suggesting that the user of device 500 send friends requests to those people in the contact list that the user is not yet friends with in the content delivery application).

In some embodiments, in addition to displaying element 670a for finding friends within the content delivery application generally, device 500 displays one or more representations for finding friends from specific social networks or friend collections. For example, in FIG. 6K, after element 670a, device 500 displays elements 672a and 672b, which are for finding friends for the content delivery application from social network 1 and social network 2, respectively. Element 672a includes selectable affordance 682a, which when selected optionally causes the content delivery application to connect to the user's profile in social network 1, and optionally initiates a process for adding one or more friends of the user in social network 1 as friends of the user in the content delivery application. Similarly, element 672b includes selectable affordance 682b, which when selected optionally causes the content delivery application to connect to the user's profile in social network 2, and optionally initiates a process for adding one or more friends of the user in social network 2 as friends of the user in the content delivery application.

As mentioned above, in some embodiments, device 500 displays elements 670a, 672a and 672b at the end of the recommended friends and/or friend requests (if any) displayed in Recommended Friends section 650. In some embodiments, if device 500 has no recommended friends for the user and if there are no friend requests to display, device 500 merely displays elements 670a, 672a and 672b in Recommended Friends section 650, without displaying any recommended friends or friend requests in Recommended Friends section 650.

User interface 602 optionally includes additional content below Recommended Friends section 650. For example, in FIGS. 6L-6M, device 500 detects an initial touchdown of contact 603 and an upward swipe of contact 603, which causes device 500 to scroll down through user interface 602 to reveal additional portions of user interface 602, as shown in FIG. 6M. For example, the vertical scrolling reveals in user interface 602 Playlists from Friends section 685, which includes representations 684 (e.g., 684a, 684b, etc.) of various playlists (e.g., collections of content, such as songs, videos, podcasts, etc.) that friends of the user of device 500, in the content delivery application, have created and published for access by their friends in the content delivery application. Representations 684 optionally indicate the names of the playlists, artwork corresponding to the playlists, and the friends who published the playlists. For example, representation 684*a* indicates that playlist B was published by friend B (e.g., by including a visual overlay of a picture of friend B, or the initials of friend B if a picture of friend B is not accessible by device 500), and representation 684*b* indicates that playlist C was published by friend C (e.g., by including a visual overlay of a picture of friend C, or the initials of friend C if a picture of friend C is not accessible by device 500). Representations 684*b* are optionally selectable to initiate playback of the content within the corresponding playlists and/or to add the corresponding playlists to a library of the user of device 500. Further, device 500 displays representations 684 in an order based on when the corresponding playlists were published by the friends of the user. For example, playlist B was published today, so is displayed first in Playlists from Friends section 685, and playlist C was published yesterday, so is displayed second in Playlists from Friends section 685. Playlists published before playlist C are optionally displayed after representation 684*b* in Playlists from Friends section 685. In some embodiments, Playlists from Friends section 685 and/or representations 684 are not initially visible in the user interface 602, and user input scrolling through user interface 602 (e.g., vertical scrolling) causes Playlists from Friends section 685 and/or representations 684 to become revealed in user interface 602.

User interface 602 optionally includes additional content below Playlists from Friends section 685. For example, in FIG. 6N, device 500 detects an initial touchdown of contact 603 and an upward swipe of contact 603, which causes device 500 to scroll through user interface 602 to reveal additional portions of user interface 602, as shown in FIG. 6N. For example, the vertical scrolling reveals in user interface 602 More from Artist section 688, which includes representations 686 (e.g., 686*a*, 686*b*, etc.) of various content of mixed content types (e.g., songs, interviews, videos, albums, podcasts, etc.) that are associated with a particular artist (e.g., are performed by the artist, include the artist, etc.). In FIG. 6N, section 688 is focused on artist A. In some embodiments, device 500 selects artist A to focus on in section 688 based on the content taste profile of the user of device 500 (e.g., the user generally likes music created by artist A, the user generally likes music similar to music from artist A, etc.). Further, the actual content selected by device 500 for inclusion in More from Artist A section 688 is optionally determined based on the content consumption activity of the user of device 500. For example, device 500 optionally only includes content in More from Artist A section 688 that the user of device 500 has not yet consumed, as indicated in FIG. 6N. In some embodiments, representations 686 are selectable to initiate playback of the corresponding content and/or to add the corresponding content to a library of the user of device 500. It should be noted that the "(Not listened to before)" and "(Based on your taste profile)" designations in More from Artist A section 688 are included for ease of description, and may or may not be displayed in user interface 602. In some embodiments, More from Artist A section 688 and/or representations 686 are not initially visible in the user interface 602, and user input scrolling through user interface 602 (e.g., vertical scrolling) causes More from Artist A section 688 and/or representations 686 to become revealed in user interface 602.

User interface 602 optionally includes additional content below More from Artist A section 688. For example, in FIG. 6O, device 500 detects an initial touchdown of contact 603 and an upward swipe of contact 603, which causes device 500 to scroll through user interface 602 to reveal additional portions of user interface 602, as shown in FIG. 6O. For example, the vertical scrolling reveals in user interface 602 What to Listen to Now section 694, which includes representations 696 (e.g., 696*a*, 696*b*, etc.) of various content (e.g., songs, interviews, videos, albums, podcasts, playlists, etc.) that device 500 recommends to the user based on various time-based characteristics at device 500, for example the time of year, the current day of the week, a recent news event, etc. For example, in FIG. 6O, it is optionally currently a Friday in December. As a result, device 500 has included in What to Listen to Now section 694 representation 696*a*, corresponding to a playlist of content that is recommended for consumption leading into the weekend (e.g., "Weekend Winddown"), and representation 696*b*, corresponding to a playlist of content recommended for consumption around the Christmas holiday (in December) (e.g., "Christmas Songs"). In some embodiments, representations 696 are selectable to initiate playback of the corresponding content and/or to add the corresponding content to a library of the user of device 500. The trigger for displaying content related to a certain day of the week, a certain season of the year, or a certain news event, etc. is optionally not based on the taste profile of the user of device 500 (e.g., device 500 determines to display content ahead of the weekend because today is Friday, irrespective of the taste profile of the user); however, the content that is actually included in What to Listen to Now section 694 is optionally determined based on the taste profile of the user (e.g., device 500 recommends weekend rap music rather than weekend rock music if the user likes rap and dislikes rock). It should be noted that the "(Not triggered based on your taste profile but content chosen based on your taste profile)" designation in What to Listen to Now section 694 is included for ease of description, and may or may not be displayed in user interface 602. In some embodiments, What to Listen to Now section 694 and/or representations 696 are not initially visible in the user interface 602, and user input scrolling through user interface 602 (e.g., vertical scrolling) causes What to Listen to Now section 694 and/or representations 696 to become revealed in user interface 602.

User interface 602 optionally includes additional content below What to Listen to Now section 694. For example, in FIG. 6P, device 500 detects an initial touchdown of contact 603 and an upward swipe of contact 603, which causes device 500 to scroll through user interface 602 to reveal additional portions of user interface 602, as shown in FIG. 6P. For example, the vertical scrolling reveals in user interface 602 two shelves of Genre sections including Genre A section 698 and Genre B section 698-8. The Genre A section and Genre B section, respectively, include representations 698-2 (e.g., 698-2*a*, 698-2*b*, etc.) and representations 698-4 (e.g., 698-4*a*, 698-4*b*, etc.) of various content types (e.g., songs, interviews, videos, albums, podcasts, playlists, radio stations, editorial radio stations, episodes of beats 1 show, algorithmic radio stations etc.) organized by Genre that device 500 recommends to the user based on the taste profile of the user at device 500 (e.g., the genres of content liked by the user at the moment). For example, in FIG. 6P, the user likes to listen to content belonging to Genre A and Genre B. As a result, device 500 has focused Genre section 698 on Genre A, and included in Genre section 698 representation 698-2*a*, corresponding to a playlist of content that belongs to Genre A, and representation 698-2*b*, corresponding to a radio station playing content that belongs to Genre A. FIG. 6P also shows that device 500 has focused section 698-8 on Genre B, and included in Genre section 698-8 representation 698-4*a*, corresponding to a playlist of content that belongs to Genre B, and representation 698-4*b*, corresponding to an editorial radio station playing content that belongs to Genre B. FIG. 6P shows two shelves of Genre-organized content as an example. In some embodiments, there are more or fewer than two shelves of content organized by Genre. In some embodiments, representations 698-2 and 698-4 are selectable to initiate playback of the corresponding content and/or to add the corresponding content to a library of the user of device 500. It should be noted that the "(genre selected based on your taste profile at the moment)" designations in Genre A section 698 and Genre B section 698-8 is included for ease of description, and may or may not be displayed in user interface 602. In some embodiments, Genre A section 698 and Genre B section 698-8 and/or representations 698-2 and 698-4 are not initially visible in the user interface 602, and user input scrolling through user interface 602 (e.g., vertical scrolling) causes Genre A section 698 and Genre B section 698-8 and/or representations 698-2 and 698-4 to become revealed in user interface 602.

User interface 602 optionally includes additional content below Genre A section 698 and Genre B section 698-8. For example, in FIG. 6Q, device 500 detects an initial touchdown of contact 603 and an upward swipe of contact 603, which causes device 500 to scroll through user interface 602 to reveal additional portions of user interface 602, as shown in FIG. 6Q For example, the vertical scrolling reveals in user interface 602 Trending Artists section 698-14, which includes representations 698-12 (e.g., 698-12a, 698-12b, etc.) of trending artists that device 500 recommends to the user based on popularity of the artists within a content delivery service (e.g., music application) corresponding to the user interface (e.g., and not based on a taste profile of the user of the electronic device—not based on artists, songs, etc. the user likes in the music application). For example, in FIG. 6Q, artists P and Q are popular within the music application. As a result, device 500 has included in Trending Artists section 698-14 representation 698-12a, corresponding to Artist P, and representation 698-12b, corresponding to Artist Q. In some embodiments, representations 698-12 are selectable to display content items (e.g., mixed-type content items, such as songs, albums, playlists, videos, interviews, etc.) associated with the corresponding trending artist. This optionally enables the user to initiate playback of the corresponding content and/or to add the corresponding content to a library of the user of device 500. The selection of trending artists is optionally based on artists that are most popular within the content delivery application and not based on the taste profile of the user of device 500 (e.g., device 500 determines to display content from artist P, irrespective of the taste profile of the user). It should be noted that the "(not based on your taste profile but popular artists in the Music Service)" designation in Trending Artists section 698-14 is included for ease of description, and may or may not be displayed in user interface 602. In some embodiments, Trending Artists section 698-14 and/or representations 698-12 are not initially visible in the user interface 602, and user input scrolling through user interface 602 (e.g., vertical scrolling) causes Trending Artists section 698-14 and/or representations 698-12 to become revealed in user interface 602.

User interface 602 optionally includes additional content below Trending Artists section 698-14. For example, in FIG. 6R, device 500 detects an initial touchdown of contact 603 and an upward swipe of contact 603, which causes device 500 to scroll down through user interface 602 to reveal additional portions of user interface 602, as shown in FIG. 6R. For example, the vertical scrolling reveals in user interface 602 Popular Playlists section 698-20, which includes representations 698-18 (e.g., 698-18a, 698-18b, etc.) of popular playlists that device 500 recommends to the user based on popularity of the playlists within a content delivery service (e.g., music application) corresponding to the user interface (e.g., and not based on a taste profile of the user of the electronic device—not based on artists, songs, etc. the user likes in the music application). For example, in FIG. 6R, playlists P and Q are popular within the music application. As a result, device 500 has included in Popular Playlists section 698-20 representation 698-18a, corresponding to Playlist P, and representation 698-18b, corresponding to Playlist Q. In some embodiments, representations 698-18 are selectable to display the contents of the playlists (e.g., selectable to display a list of songs included in the playlist). This optionally enables the user to initiate playback of the content in the playlists and/or to add the content in the playlists to a library of the user of device 500. The selection of popular playlists is optionally based on playlists that are most popular within the content delivery application and not based on the taste profile of the user of device 500 (e.g., device 500 determines to display Playlist P, irrespective of the taste profile of the user). It should be noted that the "(not based on your taste profile but popular playlists in the Music Service)" designation in Popular Playlists section 698-20 is included for ease of description, and may or may not be displayed in user interface 602. In some embodiments, Popular Playlists section 698-20 and/or representations 698-18 are not initially visible in the user interface 602, and user input scrolling through user interface 602 (e.g., vertical scrolling) causes Popular Playlists section 698-20 and/or representations 698-18 to become revealed in user interface 602.

As previously discussed with respect to FIG. 6A, representations 604a and 604b are selectable to display the content included in their respective content mixes. For example, in FIG. 6B, a tap of contact 603 on representation 604a (corresponding to the friends content mix) is detected by device 500 to display the features of FIG. 6C. However, in some embodiments, if one or more criteria for generation of the friends content mix are not satisfied (e.g., the user has less than the threshold number of friends required to generate the friends content mix), the features of FIG. 6C are not displayed but a dialog is displayed that indicates that the one or more criteria for generation of the friends content mix are not satisfied. The dialog optionally includes a selectable affordance for initiating one or more processes for satisfying the one or more criteria for generation of the friends content mix. For example, in FIG. 6S, a tap of contact 603 on representation 604a (corresponding to the friends content mix; however, in a situation where the user of device 500 has insufficient friends to generate the friends content mix, as indicated by "Insufficient Friends") is detected by device 500. In response, device 500 updates user interface 602 to display the features of FIG. 6T. In particular, device 500 displays user interface 602 that includes a Unlock Friends Mix half-sheet or platter 698-26 that slides up from the bottom of the display (e.g., halfway up the display, a third of the way of the display, etc.) and overlays the content in the user interface 602. In some embodiments, the Unlock Friends Mix half-sheet 698-26 includes instructions on how to unlock the friends content mix. The Unlock Friends Mix half-sheet 698-26 optionally also includes a selectable affordance "Find More Friends" 698-28 to initiate a process to unlock the friends content mix (e.g., initiate a process by which the user is able to send friend requests to one or more individuals). Upon acceptance of those friend requests, the user optionally has sufficient friends to unlock the friends content mix. In some embodiments, the electronic device forgoes displaying the list of content items in the friends content mix upon selection of the friends mix representation when the friends content mix criteria are not satisfied, and instead displays the above-described Unlock Friends Mix half-sheet 698-26. It should be noted that the "Insufficient Friends" designation in representation 604a (corresponding to the friends content mix) and "Information about how to unlock the Friends Content Mix" designation in Unlock Friends Mix half-sheet 698-26 are included for ease of description, and may or may not be displayed in user interface 602.

In some embodiments, if the one or more criteria for generation of the friends content mix are not satisfied (e.g., the user has less than the threshold number of friends required to generate the friends content mix), the representation of the friends content mix includes one or more generic artwork representations corresponding to content items. For example, in FIG. 6U, because the user has insufficient friends and the friends content mix does not exist, the representation 604a (corresponding to the friends content mix with insufficient friends) optionally includes representations 698-30 (e.g., 698-30a, 698-30b, etc.) of generic artwork for generic content (e.g., generic songs, albums, podcasts, etc.), as actual artwork for content included in the friends mix does not exist because the friends mix does not exist. In some embodiments, the generic representations 698-30 are of different shapes and sizes, and are optionally in greater or fewer number than what is shown in FIG. 6U. For example, the representation 698-30a optionally has a square shape and is smaller in size than the representation 698-30b, which optionally has a rectangular shape.

In contrast to the above, in some embodiments if the one or more criteria for generation of the friends content mix are satisfied (e.g., the user has more than a threshold number of friends required to generate a friends content mix), the representation of the friends content mix includes one or more artwork representations corresponding to actual content items included in the friends content mix. For example, in FIG. 6V, because the user has sufficient friends and the friends content mix does exist, the representation 604a (corresponding to the friends content mix with sufficient friends) detected by device 500 optionally displays representations 698-32 (e.g., 698-32a, 698-32b, etc.) of the actual artwork for content (e.g., songs, albums, podcasts, playlists, videos, etc.) included in the friends mix. For example, the representation 698-32a is the actual artwork for Song A and the representation 698-32b is the actual artwork for Song B included in the friends mix. In some embodiments, the representations 698-32 of the friends content mix are of different shapes and sizes, and are optionally in greater or fewer number than what is shown in FIG. 6V. For example, the representation 698-32a optionally has a square shape and is smaller in size than the representation 698-32b, which optionally has a rectangular shape. It should be noted that the "Sufficient Friends" designation in representation 604a (corresponding to the friends content mix) is included for ease of description, and may or may not be displayed in user interface 602.

As previously discussed with respect to FIG. 6A, representations 604a and 604b are optionally selectable to display the content included in their corresponding content mixes as shown in FIGS. 6C and 6E. Additionally, as previously discussed, representations 604a and 604b optionally include respective play affordances, which when selected cause device 500 to begin playback of the corresponding content mix. For example, in FIG. 6W, the representation 604a includes play affordance 698-34. In some embodiments, device 500, upon detecting a tap of the play affordance, optionally begins playing the content in the friends content mix without displaying a list of content included in the friends content mix (as shown and described with respect to FIG. 6C), while remaining in the user interface from which the play affordance was selected. For example, in FIG. 6W, a tap of contact 603 on play affordance 698-34 included in representation 604a (corresponding to the friends content mix) is detected by device 500. In response, as shown in FIG. 6X, device 500 begins playing the content in the friends content mix as shown in platter 698-36 while remaining in the user interface shown in FIG. 6W. For example, platter 698-36 shows that device 500 is playing Song X from the friends content mix, and platter 698-36 is overlaid over the content of user interface 602. The platter 698-36 optionally includes one or more playback control elements to control playback of the content (e.g., a pause icon, a fast-forward icon, etc.) and information about the content item being played (e.g., the name of the content, artwork for the content, etc.). Selection of the play affordance in representation 604b (for the favorites content mix) optionally results in analogous behavior to that described above.

FIGS. 7A-7M are flow diagrams illustrating a method of presenting information about, and facilitating consumption of, content in a content delivery application, including utilizing content consumption activities of a user's friends to do so, in accordance with some embodiments of the disclosure. The method 700 is optionally performed at an electronic device such as device 100, device 300 or device 500 as described above with reference to FIGS. 1A-1B, 2-3, 4A-4B and 5A-5H. Some operations in method 700 are, optionally, combined and/or the order of some operations is, optionally, changed.

As described below, the method 700 provides ways of presenting information about, and facilitating consumption of, content in a content delivery application, including utilizing content consumption activities of the user's friends to do so. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a smart watch, a tablet computer, etc., such as device 500) in communication with a display (e.g., a television, a display of the electronic device, a touch screen of the electronic device, such as touch screen 504) and one or more input devices (e.g., a touch screen of the electronic device, such as touch screen 504, a remote control of the set-top box), displays (702), on the display, a user interface, such as in FIG. 6A (e.g., a user interface of an application (e.g., a music playback application) on the electronic device from which a user is able to browse content, including content mixes). The content mixes optionally include one or more of a favorites mix (e.g., a mix of songs/content that are highly rated by the user-in other words, created based on the user's content taste profile), a chill mix (e.g., a mix of songs/content that is determined editorially by a music service associated with the music application, and not the user itself, though in some embodiments the chill mix is tailored to the user of the electronic device (e.g., the content in the chill mix is filtered based on the user's content taste profile)), etc. and/or are generated based on song preferences of the user's friends in the application, etc.

The user interface optionally includes a plurality of representations of content mixes (e.g., cards, boxes, or other user interface elements) that optionally include one or more images or artwork associated with the content in the content mixes, and are optionally selectable to display information about the content in the content mixes, such as in FIG. 6V. The representations optionally include only the title of the content mix without any artwork or optionally include artwork of the songs/content in the content mixes. In some embodiments, the user interface elements associated with the content mixes include respective play affordances, which when selected, cause the electronic device to play the corresponding content mix while remaining in the user interface from which the play affordance was selected, such as in FIG. 6A (e.g., without navigating to another user interface, such as when the user interface elements, outside of the play affordances, are selected).

The plurality of representations of content mixes optionally include a representation of a friends content mix corresponding to content selected based on content consumption activity of one or more friends of a user of the electronic device (704), such as in FIG. 6A (e.g., a representation on the electronic device selectable to browse songs selected based on songs the user's friends and/or contacts in the application actually listen to, not based on the user's own music listening activity or taste profile). In some embodiments, the friends/contacts of the user on which the friends content mix is based are friends/contacts of the user in the application, separate from friends/contacts the user has in other applications (e.g., the user's contact list in an address book application on the electronic device). In some embodiments, the content of the friends mix is selected based on the content consumption activity of the user's friends, and not on the taste profile of the user (e.g., the friends content mix includes content irrespective of whether the user is likely to like that content based on the user's taste profile). In other embodiments, the content of the friends mix is selected based on the content consumption activity of the user's friends and is also tailored/filtered based on the taste profile of the user (e.g., the friends content mix is filtered to not include content that the user is likely to dislike based on the user's taste profile).

In some embodiments, the plurality of representations of content mixes includes a representation of a second content mix corresponding to content selected based on criteria different than the content consumption activity of the one or more friends of the user (706), such as in FIG. 6A (e.g., a representation on the electronic device optionally selectable to browse songs selected based on the user's own music listening activity or taste profile and not based on songs the user's friends and/or contacts in the application actually listen to).

While displaying the user interface, the electronic device optionally receives (708), via the one or more input devices, an input corresponding to a selection of the representation of the friends content mix, such as in FIG. 6B (e.g., a tap on a touch screen of the electronic device on the representation of the friends content mix, a touch input with an intensity greater than an intensity threshold on the touch screen of the electronic device on the representation of the friends content mix, a click input detected on a remote control device in communication with the electronic device while the representation of the friends content mix has a current focus in the user interface). In some embodiments, this selection input is selection of the representation of the friends content mix, outside of the play affordance included in the representation of the friends content mix. If the selection is of the play affordance in the friends content mix (or similarly the other content mixes), the electronic device optionally begins playing the content in the friends content mix without displaying a list of content included in the friends content mix as described below, while remaining in the user interface from which the play affordance was selected.

In some embodiments, in response to receiving the input, in accordance with a determination that one or more criteria for generation of the friends content mix are satisfied (e.g., the user has more than a threshold number of friends required to generate a friends content mix), the electronic device optionally displays (710) a plurality of representations of content items included in the friends content mix, such as in FIG. 6C (e.g., representations on the electronic device of the content items selected for the friends content mix that optionally include one or more of songs, podcasts, albums etc. selected from the user's friends' listening activities). In some embodiments, if the user has fewer than the threshold number of friends, the electronic device does not/is not able to generate the friends content mix.

In some embodiments, the plurality of representations of content items included in the friends content mix includes a representation of a first content item of the plurality of content items displayed in association with a representation of a first friend, of the one or more friends of the user, that is associated with the first content item (712), such as in FIG. 6C (e.g., displaying a first song, podcast etc. from the friends mix along with displaying a representation of a friend of the user who listened/listens to that first song, podcast etc., and based on whose listening activity that first song, podcast, etc. was selected for inclusion in the friends content mix). For example, the representation of the content item is optionally album artwork for a song, the title of the song, etc., and the representation of the first friend is optionally a picture of the first friend, the initials of the first friend if the electronic device does not have access to a picture of the first friend, etc.

In some embodiments, the plurality of representations of content items included in the friends content mix includes a representation of a second content item of the plurality of content items displayed in association with a representation of a second friend, of the one or more friends of the user, that is associated with the second content item (714), such as in FIG. 6C (e.g., displaying a second song, podcast etc. from the friends mix along with displaying a representation of a friend of the user who listened/listens to that second song, podcast etc., and based on whose listening activity that second song, podcast, etc. was selected for inclusion in the friends content mix). For example, the representation of the content item is optionally album artwork for a song, the title of the song, etc., and the representation of the second friend is optionally a picture of the second friend, the initials of the second friend if the electronic device does not have access to a picture of the second friend, etc. The above-described manner of allowing a user to display representation of friends content mix along with other content mixes and allowing the user to, from the same user interface, select to display the content items of the friends mix along with indications of the friends associated with the content in the friends mix allows the electronic device to simplify the presentation of information to the user and interactions with the user (e.g., by giving the user easy access to content listened to by friends, and providing easily accessible information about what friends are associated with what content items), which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, the user has the one or more friends within a first friend collection corresponding to the user interface (716). In some embodiments, the user has second one or more friends, different than the one or more friends, within a second friend collection not corresponding to the user interface (718). In some embodiments, the friends content mix includes content selected based on the content consumption activity of the one or more friends within the first friends collection and not based on content consumption activity of the second one or more friends within the second friend collection (720), such as in FIG. 6C. For example, the user of the electronic device optionally has friends in different networks, such as friends within a music application on the electronic device that displays the user interface/ etc. that includes the friends content mix described above, and friends within a separate application or network, such as a separate social network or a contacts application on the electronic device, separate from the music application. In some embodiments, the friends content mix is generated based on content consumption activity of the friends of the user within the music application, and not based on any friends the user may have outside of the music application. The above-described manner of generating the friends content mix based on friends of the user in the music application, and not based on other friends of the user, allows the electronic device to tailor the content presented to the user based on friends of the user that are likely most relevant to the user's content consumption, which enhances the operability of the device and makes the user-device interface more efficient (e.g., by allowing the user to view the most relevant content with fewer inputs), which, additionally, reduces power usage and improves battery life of the device by enabling the user to use the device more quickly and efficiently.

In some embodiments, the one or more friends of the user of the electronic device comprise all of the friends of the user of the electronic device (722), such as in FIG. 6C. In some embodiments, generation of the friends content mix is based on the content consumption activity of all of the friends of the user (e.g., all of the friends of the user within the music application), and not merely the content consumption activity of a subset of the friends of the user of the electronic device. The above-described manner of generating the friends content mix based on all of the friends of the user allows the electronic device to automatically expose the user to a wide range of content, which enhances the operability of the device and makes the user-device interface more efficient (e.g., by allowing the user to view more content with fewer inputs), which, additionally, reduces power usage and improves battery life of the device by enabling the user to use the device more quickly and efficiently.

In some embodiments, while displaying the user interface, the electronic device receives (724), via the one or more input devices, an input corresponding to a selection of the representation of the second content mix corresponding to content selected based on criteria different than the content consumption activity of the one or more friends of the user, such as in FIG. 6D (e.g., a tap on a touch screen of the electronic device on the representation, a touch input with an intensity greater than an intensity threshold on the touch screen of the electronic device on the representation, a click input detected on a remote control device in communication with the electronic device while the representation has a current focus in the user interface). In some embodiments, this selection input is selection of the representation, outside of the play affordance included in the representation. If the selection is of the play affordance in the second content mix, the electronic device optionally begins playing the content in the second content mix without displaying a list of content included in the second content mix as described below, while remaining in the user interface from which the play affordance was selected.

In some embodiment, in response to receiving the input corresponding to the selection of the representation of the second content mix, the electronic device displays (726), on the display, a plurality of representations of content items included in the second content mix (e.g., representations on the electronic device of the content items included in the second content mix that optionally include one or more of songs, podcasts, albums etc.) without displaying representations of friends associated with the content items, such as in FIG. 6E. The content items in the second content mix are optionally displayed without any indication of a friend with which the content items are associated, because the content items in the second content mix are optionally not selected based on friends of the user, in contrast to the content items in the friends content mix. The above-described manner of displaying the content items in the second content mix without indications of any friends associated with the content items allows the electronic device to efficiently convey to the user that the content items were not selected based on listening activity of the friends of the user, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, the electronic device updates the friends content mix at a same frequency as it updates the second content mix (728), such as in FIG. 6A. In some embodiments, the content mixes are updated daily, weekly, bi-weekly or monthly, but are optionally updated on different days (e.g., the friends content mix is updated every Monday, the second content mix is updated every Tuesday, etc.). In the case of the friends content mix, updating the friends content mix optionally includes analyzing the content consumption activity of the friends of the user since the last update, and selecting content for inclusion in the friends content mix based on that updated content consumption activity. The above-described manner of updating the friends content mix at the same frequency as the second (and optionally any other) content mixes allows the electronic device to operate in a uniform and predictable manner, which enhances the operability of the device and makes the user-device interface more efficient (e.g., by allowing the user to interact with the electronic device in a consistent manner, making fewer errors in such interactions), which, additionally, reduces power usage and improves battery life of the device by enabling the user to use the device more quickly and efficiently.

In some embodiments, in accordance with a determination that the friends content mix has been updated more recently than the second content mix, the friends content mix is displayed with more priority than the second content mix (730), such as in FIG. 6A (e.g., the friends content mix is displayed ahead of the second content mix in the collection of content mixes). In some embodiments, in accordance with a determination that the second content mix has been updated more recently than the friends content mix, the second content mix is displayed with more priority than the friends content mix (732) (e.g., the second content mix is displayed ahead of the friends content mix in the collection of content mixes). Thus, in some embodiments, the content mixes in the user interface are displayed in an order based on the recency with which they were last updated, with the most-recently updated content mix displayed first in a row of content mixes, and the least-recently updated content mix displayed last in the row of content mixes. The above-described manner of displaying the content mixes based on when they were last updated allows the electronic device to efficiently emphasize information that is likely more relevant to the user, which enhances the operability of the device and makes the user-device interface more efficient (e.g., by allowing the user to view more relevant information with fewer inputs), which, additionally, reduces power usage and improves battery life of the device by enabling the user to use the device more quickly and efficiently.

In some embodiments, updating the friends content mix comprises selecting content items for inclusion in the friends content mix based more on content consumption activity of the one or more friends of the user that occurred after a last update of the friends content mix, and less on content consumption activity of the one or more friends of the user that occurred before the last update of the friends content mix (734), such as in FIG. 6C. In some embodiments, the listening activity of the user's friends within the past period of updating the friends content mix (e.g., within the last week, if the friends content mix is updated weekly) is most relevant, and listening activity older than that is less relevant (e.g. becomes less relevant over time). In some embodiments, the listening activity of the user's friends older than the past period is not relevant at all to the generation of the friends content mix (e.g., the friends content mix is generated based only on the user's friends' listening activity for the past week, and not based on such listening activity older than that). The above-described manner of basing content selection more on recent listening activity of the user's friends allows the electronic device to provide more relevant/up-to-date content selection to the user of the electronic device, which enhances the operability of the device and makes the user-device interface more efficient (e.g., by allowing the user to view more recent information with fewer inputs), which, additionally, reduces power usage and improves battery life of the device by enabling the user to use the device more quickly and efficiently.

In some embodiments, the representation of the first content item of the plurality of content items displayed in association with the representation of the first friend comprises artwork corresponding to the first content item (e.g., album artwork, song artwork, a frame from a video where the content item is video, generic artwork corresponding to the first content item, etc.) overlaid with a visual indication of the first friend (736), such as in FIG. 6C (e.g., a picture of the first friend, initials of the first friend if a picture of the first friend is not available on the electronic device). In some embodiments, the representation of the second content item of the plurality of content items displayed in association with the representation of the second friend comprises artwork corresponding to the second content item (e.g., album artwork, song artwork, a frame from a video where the content item is video, generic artwork corresponding to the first content item, etc.) overlaid with a visual indication of the second friend (738), such as in FIG. 6C (e.g., a picture of the second friend, initials of the second friend if a picture of the second friend is not available on the electronic device). In some embodiments, the visual indications of the friends are overlaid over the bottom-right portions of the artwork corresponding to the content items, and in some embodiments the visual indications of the friends are circular while the artwork corresponding to the content items are square-shaped, such as in FIG. 6C. The above-described manner of representing content items with artwork and representing associated friends with visual indications overlaid on the artwork allows the electronic device to efficiently display content item and friends information to the user, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, the first friend and a third friend, of the one or more friends of the user, consumed the first content item (740) (e.g., at least two friends of the user listened to the first content item). In some embodiments, the second friend and a fourth friend, of the one or more friends of the user, consumed the second content item (742) (e.g., at least two friends of the user listened to the second content item, optionally the same friends as who listened to the first content item, partially the same friends as who listened to the first content item, or different friends than who listened to the first content item). The representation of the first content item of the plurality of content items is optionally displayed in association with the representation of the first friend and not in association with a representation of the third friend (744), such as in FIG. 6C. The representation of the second content item of the plurality of content items is optionally displayed in association with the representation of the second friend and not in association with a representation of the fourth friend (746), such as in FIG. 6C. Thus, in some embodiments, the content items in the friend mix are only displayed with a representation of a single friend of the user, even if multiple friends of the user consumed/listened to/watched/etc. the content items. In some embodiments, the one friend of many who are candidates to be displayed with a given content item (e.g., because they have all listened to that content item) is selected to increase the diversity of friends displayed in the list of content items (e.g., selecting friend A instead of friend B for content item A, because friend B is already selected for content item B). In some embodiments, the one friend of many who are candidates to be displayed with a given content item is selected to be the friend who listened to/consumed that given content item the most. The above-described manner of selecting a single friend to display in association with each content item allows the electronic device to efficiently display friend-information to the user, which enhances the operability of the device and makes the user-device interface more efficient (e.g., by allowing the user to view the most relevant content with fewer distractions), which, additionally, reduces power usage and improves battery life of the device by enabling the user to use the device more quickly and efficiently.

In some embodiments, the electronic device displays (748), on the display, the plurality of representations of content items included in the friends content mix concurrently with information about how the friends content mix is generated, such as in FIG. 6C. For example, the friends content mix is optionally displayed along with an explanation that the songs included in the friends content mix are included based on the listening activities of the user's friends, how frequently the friends content mix is updated (e.g., weekly), on what day the friends content mix is updated (e.g., on a specified day, such as Monday), etc., such as in FIGS. 6A and 6C. The above-described manner of displaying information about the generation of the friends content mix allows the electronic device to display information to the user about what the user is viewing, which enhances the operability of the device and makes the user-device interface more efficient (e.g., by allowing the user to interact with the electronic device using fewer inputs), which, additionally, reduces power usage and improves battery life of the device by enabling the user to use the device more quickly and efficiently.

In some embodiments, in accordance with a determination that the one or more criteria for generation of the friends content mix are not satisfied (750) (e.g., the user has less than the threshold number of friends required to generate the friends content mix), the electronic device displays (752), on the display, a dialog that indicates that the one or more criteria for generation of the friends content mix are not satisfied, and that includes a selectable affordance for initiating one or more processes for satisfying the one or more criteria for generation of the friends content mix, such as in FIGS. 6S and 6T. For example, in some embodiments the electronic device displays a half-sheet or platter that slides up from the bottom of the display (e.g., halfway up the display, a third of the way of the display, etc.) and overlays the content in the user interface, where the half-sheet includes instructions on how to unlock the friends content mix, such as in FIG. 6T. The half-sheet optionally also includes a selectable affordance to initiate a process to unlock the friends content mix, such as an affordance to "Find More Friends" that, when selected, initiates a process by which the user is able to send friend requests to one or more individuals. Upon acceptance of those friend requests, the user optionally has sufficient friends to unlock the friends content mix. In some embodiments, the electronic device forgoes displaying the list of content items in the friends content mix upon selection of the friends mix representation when the friends content mix criteria are not satisfied, and instead displays the above-described half-sheet. The above-described manner of automatically presenting the user with information and an affordance for satisfying the friends content mix criteria allows the electronic device to facilitate satisfaction of the friends content mix criteria, which enhances the operability of the device and makes the user-device interface more efficient (e.g., by allowing the user to satisfy the friends content mix criteria with fewer inputs), which, additionally, reduces power usage and improves battery life of the device by enabling the user to use the device more quickly and efficiently.

In some embodiments, in accordance with a determination that the one or more criteria for generation of the friends content mix are not satisfied (e.g., the user has less than the threshold number of friends required to generate the friends content mix.), the representation of the friends content mix includes one or more generic artwork representations corresponding to content items (754), such as in FIG. 6U. For example, because the friends content mix does not exist, the electronic device optionally displays the representation of the friends content mix with generic artwork for generic songs, as actual artwork for songs included in the friends mix does not exist because the friends mix does not exist.

In some embodiments, in accordance with a determination that the one or more criteria for generation of the friends content mix are satisfied (e.g., the user has more than a threshold number of friends required to generate a friends content mix.), the representation of the friends content mix includes one or more artwork representations corresponding to content items included in the friends content mix (756), such as in FIG. 6V. For example, the representation of the friends content mix includes album art for the songs included in the friends content mix. The above-described manner of presenting actual/generic content artwork in the friends content mix allows the electronic device to provide consistent presentation of information to the user regardless of whether the friends mix criteria are satisfied, which enhances the operability of the device and makes the user-device interface more efficient (e.g., by allowing the user to interact with the electronic device in a consistent manner, making fewer errors in such interactions), which, additionally, reduces power usage and improves battery life of the device by enabling the user to use the device more quickly and efficiently.

The electronic device optionally receives (758), via the one or more input devices, a scrolling input (e.g., an upward, vertical swipe input for scrolling down in the user interface). In some embodiments, in response to receiving the scrolling input, the electronic device reveals (760), on the display, a plurality of representations of partially-consumed content items that the user of the electronic device has partially consumed, such as in FIG. 6A (e.g., songs, movies, videos, podcasts, albums, playlists, etc. that the user has listened to but not through to completion). In some embodiments, the partially-consumed content items are mixed content types such that some of the items are songs, some are movies, some are videos, etc. In some embodiments, the partially-consumed content items are below the content mixes in the user interface.

In some embodiments, the partially-consumed content items were not displayed in the user interface before the scrolling input was detected, and become displayed in response to the scrolling input, and the representations of the partially-consumed content items are selectable to resume consumption of those content items at the electronic device. For example, selection of one of the representations optionally picks up playback of that content item from where the user last left off in that content item. In some embodiments, the representations of the partially-consumed content items include respective visual indications of the progress of the user through those content items, such as a progress bar or a percentage indicator. The above-described manner of displaying selectable representations of partially-consumed content items allows the electronic device to provide an efficient manner of resuming playback of a content item, which enhances the operability of the device and makes the user-device interface more efficient (e.g., by allowing the user to resume content item playback using fewer inputs), which, additionally, reduces power usage and improves battery life of the device by enabling the user to use the device more quickly and efficiently.

In some embodiments, the electronic device receives (762), via the one or more input devices, a scrolling input (e.g., an upward, vertical swipe input for scrolling down in the user interface). In response to receiving the scrolling input, in accordance with a determination that the electronic device has recommended friends for the user of the electronic device, the electronic device optionally reveals (764), on the display, a plurality of representations of recommended friends for the user of the electronic device, such as in FIG. 6G. In some embodiments, the representations of the recommended friends are below the partially-consumed content items in the user interface. In some embodiments, the representations of the recommended friends were not displayed in the user interface before the scrolling input was detected, and become displayed in response to the scrolling input), wherein the representations of the recommended friends are dismissible by the user of the electronic device. For example, the representations each include a selectable affordance, which when selected, dismisses the representations of the recommended friend without requesting that the recommended friends become a friend of the user. In some embodiments, even if the user dismisses a given friend recommendation, the electronic device re-recommends that friend to the user sometime in the future depending on the algorithm that is used to recommend friends to the user.

In some embodiments, the recommended friends are recommended to the user based on the user's taste profile in content, and how closely the user's taste profile matches the taste profiles of other individuals—the other individuals with whom the user's taste profile matches relatively well are optionally presented by the electronic device as the recommended friends. The representations of the recommended friends optionally include identifying information about the individuals (e.g., picture, name), as will be described below, and a selectable affordance for the user to request to become friends with that individual. The above-described manner of displaying recommended friends to the user allows the electronic device to provide an efficient way for the user to find new friends, which enhances the operability of the device and makes the user-device interface more efficient (e.g., by allowing the user to find friends using fewer inputs), which, additionally, reduces power usage and improves battery life of the device by enabling the user to use the device more quickly and efficiently.

In some embodiments, in accordance with a determination that the user of the electronic device is not a friend of a respective recommended friend (e.g., not a friend in the music application or other friend/contact networks, such as the contacts lists on the user's electronic device, or a social network) of the plurality of recommended friends but has a mutual friend (e.g., within the music application, not in other friend or contact networks) with the respective recommended friend, the representation of the respective recommended friend includes information about which of the friends of the user of the electronic device is a friend of the respective recommended friend (766), such as in FIG. 6G. For example, the representation of the respective recommended friend includes the names of which of the user's friends is following the recommended friend, such as representation 654 in FIG. 6G. In some embodiments, the electronic device only displays one (or another predefined number of) such name in the representation of the respective recommended friend. In such embodiments, if two or more friends of the user are friends with the respective recommended friend, the electronic device displays the name of one of the friends, and displays "and X others" to capture the number of other friends of the user that are also friends with the respective recommended friend. In some embodiment, the electronic device displays the above information about the respective recommended friend irrespective of whether the respective recommended friend has a public or private profile set in the music application when the user of the electronic device has a mutual friend with the respective recommended friend. The above-described manner of displaying mutual friends of a recommended friend allows the electronic device to efficiently provide the user with connectivity information with the recommended friend, which enhances the operability of the device and makes the user-device interface more efficient (e.g., by allowing the user to view more information using fewer inputs), which, additionally, reduces power usage and improves battery life of the device by enabling the user to use the device more quickly and efficiently.

In some embodiments, in accordance with a determination that the user of the electronic device is not a friend of a respective recommended friend of the plurality of recommended friends (e.g., not a friend in the music application or other friend/contact networks, such as the contacts lists on the user's electronic device, or a social network) and does not have a mutual friend (e.g., within the music application, not in other friend or contact networks) with the respective recommended friend and that the respective recommended friend has a private profile (e.g., a designation within the music application that the respective recommended friend does not want their profile, such as music taste information, to be accessible by non-friends), the representation of the respective recommended friend includes a visual indication that the respective recommended friend has a private profile (768), such as representation 654*d* in FIG. 6H (e.g., the representation indicates "private" under the name of the recommended friend, and does not include the information about which of the friends of the user of the electronic device is a friend of the recommended friend).

In some embodiments, if the respective recommended friend has a public profile (e.g., a designation within the music application that the respective recommended friend does want their profile, such as music taste information, to be accessible by non-friends), the electronic device optionally does not display the visual indication that the respective recommended friend has a private profile in the representation of the recommended friend, such as representation 654*c* in FIG. 6H. The above-described manner of displaying a private profile designation for a recommended friend allows the electronic device to efficiently provide the user with profile-status information for a recommended friend, which enhances the operability of the device and makes the user-device interface more efficient (e.g., by allowing the user to view more information using fewer inputs), which, additionally, reduces power usage and improves battery life of the device by enabling the user to use the device more quickly and efficiently.

In some embodiments, in accordance with a determination that the user of the electronic device is not a friend of a respective recommended friend of the plurality of recommended friends within a first friend collection corresponding to the user interface (e.g., not a friend in the music application) but is a friend of the respective recommended friend within a second friend collection not corresponding to the user interface (e.g., is a friend in the contacts list for the electronic device, is a friend in a social network, etc.), the representation of the respective recommended friend includes information about one or more genres of content the respective recommended friend likes (770), such as representation 654*e* in FIG. 6I. For example, if the respective recommended friend likes rap, rock and jazz music, the representation of the respective recommended friend optionally lists "Rap, Rock and Jazz" under the name of the respective recommended friend. The representation of the respective recommended friend optionally does not include information about which of the friends of the user of the electronic device is a friend of the recommended friend. The above-described manner of displaying genre preferences for a recommended friend allows the electronic device to efficiently provide the user with music-related information for a recommended friend, which enhances the operability of the device and makes the user-device interface more efficient (e.g., by allowing the user to view more information using fewer inputs and providing the user with information needed to determine whether the user should become friends with the recommended friend in the music application based on their respective music tastes), which, additionally, reduces power usage and improves battery life of the device by enabling the user to use the device more quickly and efficiently.

In some embodiments, the representation of the respective recommended friend includes a visual indication of the second friend collection not corresponding to the user interface (772), such as representation 666 in FIG. 6I (e.g., a logo of the social network within which the user of the electronic device is friends with the respective recommended friend). In some embodiments, the visual indication of the second friend collection is overlaid on the recommended friend's picture in the representation of the recommended friend, such as in FIG. 6I. The above-described manner of displaying an indication of the friend network within which the user is friends with the recommended friend allows the electronic device to efficiently provide connectivity information about the recommended friend, which enhances the operability of the device and makes the user-device interface more efficient (e.g., by allowing the user to view more information using fewer inputs and providing the user with information needed to determine whether the user should become friends with the recommended friend in the music application), which, additionally, reduces power usage and improves battery life of the device by enabling the user to use the device more quickly and efficiently.

In some embodiments, the plurality of representations of recommended friends is displayed concurrently with a representation for finding additional friends for the user of the electronic device (774), such as in FIG. 6J. For example, at the end of the representation of recommended friends, the electronic device optionally displays an element for finding more friends for the user from other friend collections, other than the friend collection associated with the music application (e.g., from other social networks). The representation for finding additional friends for the user of the electronic device optionally includes a selectable affordance for initiating a process to identify and request to friend, within the music application, individuals that the user of the electronic is friends with in other social networks or other friend collections (e.g., the contacts list on the user's electronic device). The above-described manner of displaying a representation for finding additional friends allows the electronic device to efficiently find additional friends for the user, which enhances the operability of the device and makes the user-device interface more efficient (e.g., by allowing the user to find more friends within the music application using fewer inputs), which, additionally, reduces power usage and improves battery life of the device by enabling the user to use the device more quickly and efficiently.

In some embodiments, in response to receiving the scrolling input, in accordance with a determination that the electronic device does not have recommended friends for the user of the electronic device (776), the electronic device forgoes (778) revealing the plurality of representations of recommended friends, and reveals (780), on the display, a representation for finding additional friends for the user of the electronic device, such as in FIG. 6K. For example, the electronic device optionally displays an element for finding more friends for the user from other friend collections, other than the friend collection associated with the music application (e.g., from other social networks). The representation for finding additional friends for the user of the electronic device optionally includes a selectable affordance for initiating a process to identify and request to friend, within the music application, individuals that the user of the electronic is friends with in other social networks or other friend collections (e.g., the contacts list on the user's electronic device). The above-described manner of displaying a representation for finding additional friends allows the electronic device to efficiently find additional friends for the user, which enhances the operability of the device and makes the user-device interface more efficient (e.g., by allowing the user to find more friends within the music application using fewer inputs), which, additionally, reduces power usage and improves battery life of the device by enabling the user to use the device more quickly and efficiently.

In some embodiments, the plurality of representations of recommended friends includes one or more representations of one or more individuals who have requested to be friends with the user of the electronic device (e.g., within the music application), wherein the friend requests are acceptable or dismissible by the user of the electronic device (782), such as in FIG. 6I. For example, the representations of the friend requests each optionally include a selectable affordance for dismissing the friend request without becoming friends with the requestor, and each optionally include a selectable affordance for accepting the friend request. The friend requests optionally include information about the requestor, such as a picture of the requestor, the name of the requestor, information about the music tastes of the requestor (e.g., genres of music the requestor likes), information about mutual friends with the requestor (e.g., the names of mutual friends the user has with the requestor), etc. The above-described manner of displaying friend requests allows the electronic device to provide the user with efficient acceptance or dismissal of friend requests, which enhances the operability of the device and makes the user-device interface more efficient (e.g., by allowing the user to interact with the electronic device with fewer inputs), which, additionally, reduces power usage and improves battery life of the device by enabling the user to use the device more quickly and efficiently.

In some embodiments, the electronic device receives (784), via the one or more input devices, a scrolling input (e.g., an upward, vertical swipe input for scrolling down in the user interface). In response to receiving the scrolling input, the electronic device optionally reveals (786), on the display, a plurality of representations of playlists (e.g., playlists of content, such as songs, videos, etc.) published by friends of the user of the electronic device, such as in FIG. 6M. In some embodiments, the representations of the playlists from friends are below the recommended friends in the user interface. In some embodiments, the representations of the playlists from friends were not displayed in the user interface before the scrolling input was detected, and become displayed in response to the scrolling input. In some embodiments, the friends are friends of the user within the music application. In some embodiments, the playlists are playlists the friends of the user have "published" or made available for use by their friends within the music application. The playlists are optionally selectable to display the contents of the playlists.

The representations of the playlists optionally include art for the playlists (e.g., art selected by the friend who published the playlist), the name of the playlist and/or an indication of the friend who published the playlist (e.g., the name of the friend, a picture of the friend, etc.), such as in FIG. 6M. In some embodiments, the playlists are displayed in order of publication date, such that the most recently published playlists are shown first, followed by less-recently published playlists. The above-described manner of displaying playlists from friends allows the electronic device to efficiently provide the user with content from the user's friends, which enhances the operability of the device and makes the user-device interface more efficient (e.g., by allowing the user to add content to their content library with fewer inputs), which, additionally, reduces power usage and improves battery life of the device by enabling the user to use the device more quickly and efficiently.

In some embodiments, the electronic device receives (788), via the one or more input devices, a scrolling input (e.g., an upward, vertical swipe input for scrolling down in the user interface). In some embodiments, in response to receiving the scrolling input, the electronic device reveals (790), on the display, a plurality of representations of content items, associated with a particular artist, having mixed content types, such as in FIG. 6N (e.g., songs written by the artist, songs performed by the artist, movies in which the artist appears, videos made by the artists, podcasts associated with the artists, albums of the artists, playlists, interviews with the artist, etc.). In some embodiments, the representations of mixed content types associated with the particular artist are below the playlists from friends in the user interface. In some embodiments, the representations of mixed content types associated with the particular artist were not displayed in the user interface before the scrolling input was detected, and become displayed in response to the scrolling input. The above-described manner of displaying mixed content types from a particular artists allows the electronic device to efficiently provide the user with multiple types of content associated with a particular artist, which enhances the operability of the device and makes the user-device interface more efficient (e.g., by allowing the user to consume more content with fewer inputs), which, additionally, reduces power usage and improves battery life of the device by enabling the user to use the device more quickly and efficiently.

In some embodiments, the particular artist is determined based on a taste profile of the user of the electronic device (792), such as in FIG. 6N. In some embodiments, the electronic device determines the artist for which to display the additional content based on album(s), song(s), band(s), etc. that the user of the electronic device has recently shown an affinity towards (e.g., has recently played music from the artists, has recently played such music relatively frequently, etc.). For example, if the user of the electronic device has recently played a lot of Nirvana songs, the electronic device optionally displays a "More from Kurt Cobain" section with songs written by Kurt Cobain, songs performed by Kurt Cobain, movies in which Kurt Cobain appears, videos made by Kurt Cobain, podcasts associated with Kurt Cobain, albums of Kurt Cobain, playlists, interviews with Kurt Cobain, etc. The above-described manner of selecting the particular artists based on the taste profile of the user allows the electronic device to efficiently provide the user with content associated with a particular artist that the user is likely to enjoy, which enhances the operability of the device and makes the user-device interface more efficient (e.g., by allowing the user to consume more content with fewer inputs), which, additionally, reduces power usage and improves battery life of the device by enabling the user to use the device more quickly and efficiently.

In some embodiments, the content items associated with the particular artist are determined based on content consumption activity of the user of the electronic device (794). In some embodiments, the electronic device determines the content for the particular artist to display based on album(s), song(s), band(s), etc. that the user of the electronic device has recently listened to such that what the user has already listened to does not show up in the content listing, such as in FIG. 6N. The above-described manner of selecting the content to display based on the content consumption activity of the user allows the electronic device to provide the user with content they have not already consumed, which enhances the operability of the device and makes the user-device interface more efficient (e.g., by allowing the user to consume new-to-them content with fewer inputs), which, additionally, reduces power usage and improves battery life of the device by enabling the user to use the device more quickly and efficiently.

In some embodiments, the electronic device receives (796), via the one or more input devices, a scrolling input (e.g., an upward, vertical swipe input for scrolling down in the user interface). In some embodiments, in response to receiving the scrolling input, the electronic device reveals (798), on the display, a plurality of representations of content items (e.g., playlists, songs, albums) selected based on a time-related characteristic associated with the electronic device, such as in FIG. 6O. In some embodiments, the representations of the time-based content items are below the artist-specific content items in the user interface. In some embodiments, the representations of the time-based content items were not displayed in the user interface before the scrolling input was detected, and become displayed in response to the scrolling input. For example, the time-based content items are content items that the electronic device determines are relevant to the user of the electronic device based on what day of the week it is (e.g., a "Weekend Wind Down" playlist displayed on a Friday), based on the season (e.g., a Christmas playlist displayed in the month of December), based on current news events (e.g., music from a particular artists when that artist has just recently passed away), and/or based on some other characteristic having to do with the current time. The above-described manner of selecting the content to display based on a time-related characteristic allows the electronic device to provide the user with content that is likely relevant to the user based on a current time characteristic at the electronic device, which enhances the operability of the device and makes the user-device interface more efficient (e.g., by allowing the user to consume timely content with fewer inputs), which, additionally, reduces power usage and improves battery life of the device by enabling the user to use the device more quickly and efficiently.

A determination to display content selected based on the time-related characteristic is optionally made independent of a taste profile of the user of the electronic device (798-2). The content items selected for display based on the time-related characteristic are optionally selected based on the taste profile of the user of the electronic device (798-4), such as in FIG. 6O. For example, the trigger for displaying the time-relevant content items in the user interface is optionally not personalized to the user or triggered based on the taste profile of the user, such as in FIG. 6O (e.g., the electronic device determines to display Christmas music around Christmas, independent of the music tastes of the user, or the electronic device determines to display content related to a particular artist when that artist has recently passed away independent of the music tastes of the user). However, in some embodiments, the actual content items that are displayed once the above-trigger is triggered are selected based on the taste profile of the user (e.g., the electronic device displays classic Christmas music around Christmas, because the user has expressed an affinity towards classic songs, or the electronic device displays jazz music but not rock music from an artist who recently passed away (who has also created rock music), because the user has expressed an affinity towards jazz music and a dislike of rock music). The above-described manner of triggering the display of the above-content independent of the user's taste profile but selecting the actual content to display based on the user's taste profile allows the electronic device to provide the user with timely content that the user is likely to enjoy, which enhances the operability of the device and makes the user-device interface more efficient (e.g., by allowing the user to consume timely content the user is likely to enjoy with fewer inputs), which, additionally, reduces power usage and improves battery life of the device by enabling the user to use the device more quickly and efficiently.

In some embodiments, the electronic device receives (798-6), via the one or more input devices, a scrolling input (e.g., an upward, vertical swipe input for scrolling down in the user interface). In some embodiments, in response to receiving the scrolling input, the electronic device reveals (798-8), on the display, a plurality of representations of content items having mixed content types organized by genre, such as in FIG. 6P (e.g., songs, movies, videos, podcasts, albums, playlists, internet radio episodes, music videos, radio stations (editorial and/or algorithmic), etc. of a given genre, or separated by genre (e.g., different rows of content for different genres, such as rap, rock and jazz)). In some embodiments, the genre-organized content items are mixed content types such that some of the items are songs, some are movies, some are videos, etc. In some embodiments, the genre-organized content items are below the time-based content items in the user interface. In some embodiments, the genre-organized content items were not displayed in the user interface before the scrolling input was detected, and become displayed in response to the scrolling input. For example, the electronic device optionally displays different "shelves" (e.g., rows) of content, where each shelf corresponds to a different genre of content. The above-described manner of displaying genre-organized mixed content allows the electronic device to provide the user with an organized collection of mixed content from which to choose, which enhances the operability of the device and makes the user-device interface more efficient (e.g., by allowing the user to browse and/or consume mixed content with fewer inputs), which, additionally, reduces power usage and improves battery life of the device by enabling the user to use the device more quickly and efficiently.

In some embodiments, the plurality of representations of content items organized by genre is organized into one or more genres (798-10), such as in FIG. 6P. In some embodiments, the one or more genres are selected based on a taste profile of the user of the electronic device (798-12), such as in FIG. 6P. For example, the electronic device optionally selects genre(s) for which to display the mixed content types based on what genre(s) of content the user of the electronic device is likely to enjoy based on the content consumption activity and ratings of the user; in some embodiments, recently as opposed to longer ago. For example, if the user has recently expressed an affinity towards rock and rap music, the electronic device optionally displays two groups of mixed-type content, one group being rock content, and one group being rap content. The above-described manner of selecting genres to display based on the user's taste profile allows the electronic device to provide the user with mixed content that the user is more likely to enjoy, which enhances the operability of the device and makes the user-device interface more efficient (e.g., by allowing the user to browse and/or consume mixed content the user is likely to enjoy with fewer inputs), which, additionally, reduces power usage and improves battery life of the device by enabling the user to use the device more quickly and efficiently.

In some embodiments, the electronic device receives (798-14), via the one or more input devices, a scrolling input (e.g., an upward, vertical swipe input for scrolling down in the user interface). In some embodiments, in response to receiving the scrolling input, the electronic device reveals (798-16), on the display, a plurality of representations of trending artists selected based on popularity of the artists within a content delivery service (e.g., music application) corresponding to the user interface, such as in FIG. 6Q (e.g., and not based on a taste profile of the user of the electronic device—not based on artists, songs, etc. the user likes in the music application). In some embodiments, the representations of the trending artists are below the mixed content genre shelves in the user interface. In some embodiments, the representations of the trending artists were not displayed in the user interface before the scrolling input was detected, and become displayed in response to the scrolling input. The representations of the trending artists are optionally selectable to display content items (e.g., mixed-type content items, such as songs, albums, playlists, videos, interviews, etc.) associated with a respective trending artist. In some embodiments, the trending artists are the artists that are most popular within the music application. In some embodiments, the trending artists are not selected based on the taste profile of the user. The above-described manner of displaying the representations of trending artists allows the electronic device to efficiently provide the user with content from popular artists within the music application, which enhances the operability of the device and makes the user-device interface more efficient (e.g., by allowing the user to browse content with fewer inputs), which, additionally, reduces power usage and improves battery life of the device by enabling the user to use the device more quickly and efficiently.

In some embodiments, the electronic device receives (798-18), via the one or more input devices, a scrolling input (e.g., an upward, vertical swipe input for scrolling down in the user interface). In some embodiments, in response to receiving the scrolling input, the electronic device reveals (798-20), on the display, a plurality of representations of playlists (e.g., playlists of content, such as songs, videos, etc.) selected based on popularity of the playlists within a content delivery service (e.g., music application) corresponding to the user interface, such as in FIG. 6R (e.g., and not based on a taste profile of the user of the electronic device—not based on artists, songs, etc. the user likes in the music application). In some embodiments, the representations of the popular playlists are below the representations of the trending artists in the user interface. In some embodiments, the representations of the popular playlists were not displayed in the user interface before the scrolling input was detected, and become displayed in response to the scrolling input. In some embodiments, the popular playlists are the playlists that are most popular within the music application.

In some embodiments, the popular playlists are not selected based on the taste profile of the user, such as in FIG. 6R. The playlists are optionally selectable to display the contents of the playlists (e.g., selectable to display a list of songs included in the playlist). The representations of the playlist optionally include art for the playlist (e.g., art representing the songs contained in the playlist), the name of the playlist, etc. The above-described manner of displaying popular playlists allows the electronic device to efficiently provide the user with popular content within the music application, which enhances the operability of the device and makes the user-device interface more efficient (e.g., by allowing the user to browse content with fewer inputs), which, additionally, reduces power usage and improves battery life of the device by enabling the user to use the device more quickly and efficiently.

It should be understood that the particular order in which the operations in FIGS. 7A-7M have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7M are, optionally, implemented by components depicted in FIGS. 1A-1B. For example, displaying operations 702 and 710 and receiving operation 708 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide friend-associated data, or content taste data, for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
while one or more criteria for generation of a friends content mix are not satisfied and the friends content mix is not generated, wherein the one or more criteria require that the user has at least a threshold number of friends, and wherein the friends content mix is a collection of a plurality of content items selected based on content consumption activity of one or more friends of a user of the electronic device:
displaying, on the display, a selectable affordance for initiating one or more processes for satisfying the one or more criteria for generation of the friends content mix;
receiving, via the one or more input devices, an input corresponding to a selection of the selectable affordance for initiating the one or more processes for satisfying the one or more criteria for generation of the friends content mix; and
in response to receiving the input corresponding to the selection of the selectable affordance, initiating the one or more processes for satisfying the one or more criteria for generation of the friends content mix,
after initiating the one or more processes for satisfying the one or more criteria for generation of the friends content mix and in accordance with a determination that the one or more criteria for generation of the friends content mix are satisfied, concurrently displaying, on the display:
a representation of the friends content mix; and
a representation of a second content mix corresponding to content selected based on criteria different than the content consumption activity of the one or more friends of the user;
while displaying the representation of the friends content mix, receiving, via the one or more input devices, an input corresponding to a selection of the representation of the friends content mix; and
in response to receiving the input, displaying, on the display, the plurality of representations of content items included in the friends content mix including:
a representation of a first content item of the plurality of content items displayed in association with a representation of a first friend, of the one or more friends of the user, that is associated with the first content item; and
a representation of a second content item of the plurality of content items displayed in association with a representation of a second friend, of the one or more friends of the user, that is associated with the second content item.

2. The method of claim 1, wherein:
the user has the one or more friends within a first friend collection corresponding to the user interface,
the user has second one or more friends, different than the one or more friends, within a second friend collection not corresponding to the user interface, and
the friends content mix includes content selected based on the content consumption activity of the one or more friends within the first friend collection and not based on content consumption activity of the second one or more friends within the second friend collection.

3. The method of claim 1, further comprising:
while concurrently displaying the representation of the friends content mix and the representation of the second content mix, receiving, via the one or more input devices, an input corresponding to a selection of the representation of the second content mix corresponding to content selected based on criteria different than the content consumption activity of the one or more friends of the user; and
in response to receiving the input corresponding to the selection of the representation of the second content mix, displaying, on the display, a plurality of representations of content items included in the second content mix without displaying representations of friends associated with the content items.

4. The method of claim 1, wherein:
the representation of the first content item of the plurality of content items displayed in association with the representation of the first friend comprises artwork corresponding to the first content item overlaid with a visual indication of the first friend, and
the representation of the second content item of the plurality of content items displayed in association with the representation of the second friend comprises artwork corresponding to the second content item overlaid with a visual indication of the second friend.

5. The method of claim 1, wherein:
the first friend and a third friend, of the one or more friends of the user, consumed the first content item,
the second friend and a fourth friend, of the one or more friends of the user, consumed the second content item,
the representation of the first content item of the plurality of content items is displayed in association with the representation of the first friend and not in association with a representation of the third friend, and
the representation of the second content item of the plurality of content items is displayed in association with the representation of the second friend and not in association with a representation of the fourth friend.

6. The method of claim 1, wherein the one or more processes for satisfying the one or more criteria for generation of the friends content mix includes a process to send one or more friends requests to one or more individuals.

7. An electronic device, comprising:
one or more processors;
memory; and
one or more programs, wherein the one or more programs are stored in the memory and configured to be executed by the one or more processors, the one or more programs including instructions for:
while one or more criteria for generation of a friends content mix are not satisfied and the friends content mix is not generated, wherein the one or more criteria require that the user has at least a threshold number of friends, and wherein the friends content mix is a collection of a plurality of content items selected based on content consumption activity of one or more friends of a user of the electronic device:
displaying, on the display, a selectable affordance for initiating one or more processes for satisfying the one or more criteria for generation of the friends content mix;
receiving, via the one or more input devices, an input corresponding to a selection of the selectable affordance for initiating the one or more processes for satisfying the one or more criteria for generation of the friends content mix; and
in response to receiving the input corresponding to the selection of the selectable affordance, initiating the one or more processes for satisfying the one or more criteria for generation of the friends content mix;
after initiating the one or more processes for satisfying the one or more criteria for generation of the friends content mix and in accordance with a determination that the one or more criteria for generation of the friends content mix are satisfied:
concurrently displaying, on the display:
a representation of the friends content mix; and
a representation of a second content mix corresponding to content selected based on criteria different than the content consumption activity of the one or more friends of the user;
while displaying the representation of the friends content mix, receiving, via the one or more input devices, an input corresponding to a selection of the representation of the friends content mix; and
in response to receiving the input, displaying, on the display, the plurality of representations of content items included in the friends content mix including:
a representation of a first content item of the plurality of content items displayed in association with a representation of a first friend, of the one or more friends of the user, that is associated with the first content item; and
a representation of a second content item of the plurality of content items displayed in association with a representation of a second friend, of the one or more friends of the user, that is associated with the second content item.

8. The electronic device of claim 7, wherein:
the user has the one or more friends within a first friend collection corresponding to the user interface,
the user has second one or more friends, different than the one or more friends, within a second friend collection not corresponding to the user interface, and
the friends content mix includes content selected based on the content consumption activity of the one or more friends within the first friend collection and not based on content consumption activity of the second one or more friends within the second friend collection.

9. The electronic device of claim 7, wherein the one or more programs further include instructions for:
while concurrently displaying the representation of the friends content mix and the representation of the second content mix, receiving, via the one or more input devices, an input corresponding to a selection of the representation of the second content mix corresponding to content selected based on criteria different than the content consumption activity of the one or more friends of the user; and
in response to receiving the input corresponding to the selection of the representation of the second content mix, displaying, on the display, a plurality of representations of content items included in the second content mix without displaying representations of friends associated with the content items.

10. The electronic device of claim 7, wherein the electronic device updates the friends content mix at a same frequency as it updates the second content mix.

11. The electronic device of claim 10, wherein:
in accordance with a determination that the friends content mix has been updated more recently than the second content mix, the friends content mix is displayed with more priority than the second content mix, and
in accordance with a determination that the second content mix has been updated more recently than the friends content mix, the second content mix is displayed with more priority than the friends content mix.

12. The electronic device of claim 10, wherein updating the friends content mix comprises selecting content items for inclusion in the friends content mix based more on content consumption activity of the one or more friends of the user that occurred after a last update of the friends content mix, and less on content consumption activity of the one or more friends of the user that occurred before the last update of the friends content mix.

13. The electronic device of claim 7, wherein:
the representation of the first content item of the plurality of content items displayed in association with the representation of the first friend comprises artwork corresponding to the first content item overlaid with a visual indication of the first friend, and
the representation of the second content item of the plurality of content items displayed in association with the representation of the second friend comprises artwork corresponding to the second content item overlaid with a visual indication of the second friend.

14. The electronic device of claim 7, wherein:
the first friend and a third friend, of the one or more friends of the user, consumed the first content item,
the second friend and a fourth friend, of the one or more friends of the user, consumed the second content item,
the representation of the first content item of the plurality of content items is displayed in association with the representation of the first friend and not in association with a representation of the third friend, and
the representation of the second content item of the plurality of content items is displayed in association with the representation of the second friend and not in association with a representation of the fourth friend.

15. A non-transitory computer readable storage medium storing one or more programs, the one or more programs comprising instructions, which when executed by one or more processors of an electronic device, cause the electronic device to:

while one or more criteria for generation of a friends content mix are not satisfied and the friends content mix is not generated, wherein the one or more criteria require that the user has at least a threshold number of friends, and wherein the friends content mix is a collection of a plurality of content items selected based on content consumption activity of one or more friends of a user of the electronic device, wherein while the one or more criteria for the generation of the friends content mix are not satisfied, including the criterion that is satisfied when the user has at least the threshold number of friends, the friends content mix is not generated:
  displaying, on the display, a selectable affordance for initiating one or more processes for satisfying the one or more criteria for generation of the friends content mix;
  receive, via the one or more input devices, an input corresponding to a selection of the selectable affordance for initiating the one or more processes for satisfying the one or more criteria for generation of the friends content mix; and
  in response to receiving the input corresponding to the selection of the selectable affordance, initiate the one or more processes for satisfying the one or more criteria for generation of the friends content mix;
  after initiating the one or more processes for satisfying the one or more criteria for generation of the friends content mix and in accordance with a determination that the one or more criteria for generation of the friends content mix are satisfied, the one or more criteria including the criterion that is satisfied when the user has at least the threshold number of friends:
    concurrently displaying, on the display:
      a representation of the friends content mix; and
      a representation of a second content mix corresponding to content selected based on criteria different than the content consumption activity of the one or more friends of the user;
  while displaying the representation of the friends content mix, receive, via one or more input devices, an input corresponding to a selection of the representation of the friends content mix; and
  in response to receiving the input, display, on the display, the plurality of representations of content items included in the friends content mix including:
    a representation of a first content item of the plurality of content items displayed in association with a representation of a first friend, of the one or more friends of the user, that is associated with the first content item; and
    a representation of a second content item of the plurality of content items displayed in association with a representation of a second friend, of the one or more friends of the user, that is associated with the second content item.

16. The non-transitory computer readable storage medium of claim 15, wherein:
  the user has the one or more friends within a first friend collection corresponding to the user interface,
  the user has second one or more friends, different than the one or more friends, within a second friend collection not corresponding to the user interface, and
  the friends content mix includes content selected based on the content consumption activity of the one or more friends within the first friends collection and not based on content consumption activity of the second one or more friends within the second friend collection.

17. The non-transitory computer readable storage medium of claim 15, wherein the one or more programs further cause the electronic device to:
  while concurrently displaying the representation of the friends content mix and the representation of the second content mix, receive, via the one or more input devices, an input corresponding to a selection of the representation of the second content mix corresponding to content selected based on criteria different than the content consumption activity of the one or more friends of the user; and
  in response to receiving the input corresponding to the selection of the representation of the second content mix, display, on the display, a plurality of representations of content items included in the second content mix without displaying representations of friends associated with the content items.

18. The non-transitory computer readable storage medium of claim 15, wherein:
  the representation of the first content item of the plurality of content items displayed in association with the representation of the first friend comprises artwork corresponding to the first content item overlaid with a visual indication of the first friend, and
  the representation of the second content item of the plurality of content items displayed in association with the representation of the second friend comprises artwork corresponding to the second content item overlaid with a visual indication of the second friend.

19. The non-transitory computer readable storage medium of claim 15, wherein:
  the first friend and a third friend, of the one or more friends of the user, consumed the first content item,
  the second friend and a fourth friend, of the one or more friends of the user, consumed the second content item,
  the representation of the first content item of the plurality of content items is displayed in association with the representation of the first friend and not in association with a representation of the third friend, and
  the representation of the second content item of the plurality of content items is displayed in association with the representation of the second friend and not in association with a representation of the fourth friend.

20. The non-transitory computer readable storage medium of claim 15, wherein the one or more programs further cause the electronic device to:
  display, on the display, the plurality of representations of content items included in the friends content mix concurrently with information about how the friends content mix is generated.

21. The non-transitory computer readable storage medium of claim 15, wherein the one or more programs further cause the electronic device to:
  receive, via the one or more input devices, a scrolling input; and
  in response to receiving the scrolling input, reveal, on the display, a plurality of representations of partially-consumed content items that the user of the electronic device has partially consumed, wherein the representations of the partially-consumed content items are selectable to resume consumption of those content items at the electronic device.

22. The non-transitory computer readable storage medium of claim 15, wherein the one or more programs further cause the electronic device to:
  receive, via the one or more input devices, a scrolling input; and in response to receiving the scrolling input, in accordance with a determination that the electronic device has recommended friends for the user of the electronic device, reveal, on the display, a plurality of representations of recommended friends for the user of the electronic device, wherein the representations of the recommended friends are dismissible by the user of the electronic device.

23. The non-transitory computer readable storage medium of claim 22, wherein:
in accordance with a determination that the user of the electronic device is not a friend of a respective recommended friend of the plurality of recommended friends but has a mutual friend with the respective recommended friend, the representation of the respective recommended friend includes information about which of the friends of the user of the electronic device is a friend of the respective recommended friend.

24. The non-transitory computer readable storage medium of claim 22, wherein:
in accordance with a determination that the user of the electronic device is not a friend of a respective recommended friend of the plurality of recommended friends and does not have a mutual friend with the respective recommended friend and that the respective recommended friend has a private profile, the representation of the respective recommended friend includes a visual indication that the respective recommended friend has a private profile.

25. The non-transitory computer readable storage medium of claim 22, wherein:
in accordance with a determination that the user of the electronic device is not a friend of a respective recommended friend of the plurality of recommended friends within a first friend collection corresponding to the user interface but is a friend of the respective recommended friend within a second friend collection not corresponding to the user interface, the representation of the respective recommended friend includes information about one or more genres of content the respective recommended friend likes.

26. The non-transitory computer readable storage medium of claim 22, wherein:
the plurality of representations of recommended friends is displayed concurrently with a representation for finding additional friends for the user of the electronic device.

27. The non-transitory computer readable storage medium of claim 22, wherein the one or more programs further cause the electronic device to:
in response to receiving the scrolling input, in accordance with a determination that the electronic device does not have recommended friends for the user of the electronic device:
forgo revealing the plurality of representations of recommended friends; and
reveal, on the display, a representation for finding additional friends for the user of the electronic device.

28. The non-transitory computer readable storage medium of claim 15, wherein the one or more programs further cause the electronic device to:
receive, via the one or more input devices, a scrolling input; and
in response to receiving the scrolling input, reveal, on the display, a plurality of representations of playlists published by friends of the user of the electronic device.

29. The non-transitory computer readable storage medium of claim 15, wherein the one or more programs further cause the electronic device to:
receive, via the one or more input devices, a scrolling input; and
in response to receiving the scrolling input, reveal, on the display, a plurality of representations of content items, associated with a particular artist, having mixed content types.

30. The non-transitory computer readable storage medium of claim 15, wherein the one or more programs further cause the electronic device to:
receive, via the one or more input devices, a scrolling input; and
in response to receiving the scrolling input, reveal, on the display, a plurality of representations of content items selected based on a time-related characteristic associated with the electronic device.

31. The non-transitory computer readable storage medium of claim 30, wherein:
a determination to display content selected based on the time-related characteristic is made independent of a taste profile of the user of the electronic device, and
the content items selected for display based on the time-related characteristic are selected based on the taste profile of the user of the electronic device.

32. The non-transitory computer readable storage medium of claim 15, wherein the one or more programs further cause the electronic device to:
receive, via the one or more input devices, a scrolling input; and
in response to receiving the scrolling input, reveal, on the display, a plurality of representations of content items having mixed content types organized by genre.

33. The non-transitory computer readable storage medium of claim 15, wherein the one or more programs further cause the electronic device to:
receive, via the one or more input devices, a scrolling input; and
in response to receiving the scrolling input, reveal, on the display, a plurality of representations of trending artists selected based on popularity of the artists within a content delivery service corresponding to the user interface.

* * * * *